United States Patent
Chun et al.

(10) Patent No.: US 12,495,342 B2
(45) Date of Patent: Dec. 9, 2025

(54) NETWORK SLICE MOBILITY MANAGEMENT

(71) Applicant: Ofinno, LLC, Reston, VA (US)

(72) Inventors: SungDuck Chun, Fairfax, VA (US); Kyungmin Park, Vienna, VA (US); Esmael Hejazi Dinan, McLean, VA (US); Peyman Talebi Fard, Vienna, VA (US); Jian Xu, McLean, VA (US); Stanislav Filin, Chantilly, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/259,139

(22) Filed: Jul. 3, 2025

(65) Prior Publication Data

US 2025/0338190 A1  Oct. 30, 2025

Related U.S. Application Data

(63) Continuation of application No. PCT/US2024/010275, filed on Jan. 4, 2024.

(60) Provisional application No. 63/437,278, filed on Jan. 5, 2023.

(51) Int. Cl.
  *H04W 36/08* (2009.01)
  *H04W 60/00* (2009.01)

(52) U.S. Cl.
  CPC ......... *H04W 36/08* (2013.01); *H04W 60/00* (2013.01)

(58) Field of Classification Search
  CPC .............................. H04W 36/08; H04W 60/00
  See application file for complete search history.

(56) References Cited

U.S. PATENT DOCUMENTS

| | | | |
|---|---|---|---|
| 2022/0312370 A1 | 9/2022 | Choe et al. | |
| 2022/0361135 A1 | 11/2022 | Won et al. | |
| 2024/0107435 A1* | 3/2024 | Godin | H04W 48/16 |
| 2025/0159638 A1* | 5/2025 | Youn | H04W 48/04 |
| 2025/0220616 A1* | 7/2025 | Velev | H04W 60/04 |

OTHER PUBLICATIONS

3GPP TS 23.501 V17.6.0 (Sep. 2022); Technical Specification; 3rd Generation Partnership Project; Technical Specification Group Services and System Aspects; System architecture for the 5G System (5GS); Stage 2; (Release 17).
3GPP TS 23.502 V17.6.0 (Sep. 2022); Technical Specification; 3rd Generation Partnership Project; Technical Specification Group Services and System Aspects; Procedures for the 5G System (5GS); Stage 2; (Release 17).

(Continued)

*Primary Examiner* — Justin Y Lee
(74) *Attorney, Agent, or Firm* — Sachin Kandhari; Kavon Nasabzadeh; Jacob L. Mangan

(57) ABSTRACT

A second base station (BS) receives, in response to sending a path switch request message, a path switch acknowledge message comprising one or more identifiers of one or more partially allowed network slices for a wireless device, wherein the one or more partially allowed network slice are not supported in one or more tracking area (TAs) of a registration area (RA) of the wireless device. The second BS determines, based on a third BS supporting the one or more partially allowed network slices, a handover of the wireless device to the third BS, and sends, to the third BS, a handover request message comprising the one or more identifiers.

20 Claims, 31 Drawing Sheets

(56) References Cited

OTHER PUBLICATIONS

3GPP TS 23.503 V17.6.0 (Sep. 2022); Technical Specification; 3rd Generation Partnership Project; Technical Specification Group Services and System Aspects; Policy and charging control framework for the 5G System (5GS); Stage 2; (Release 17).
3GPP TR 23.700-41 V1.2.0 (Nov. 2022); Technical Report; 3rd Generation Partnership Project; Technical Specification Group Services and System Aspects; Study on enhancement of network slicing; Phase 3; (Release 18).
3GPP TS 24.501 V18.0.1 (Sep. 2022); Technical Specification; 3rd Generation Partnership Project; Technical Specification Group Core Network and Terminals; Non-Access-Stratum (NAS) protocol for 5G System (5GS); Stage 3; (Release 18).
3GPP TS 38.300 V17.2.0 (Sep. 2022); Technical Specification; 3rd Generation Partnership Project; Technical Specification Group Radio Access Network; NR; NR and NG-RAN Overall Description; Stage 2; (Release 17).
3GPP TS 38.413 V17.2.0 (Sep. 2022); Technical Specification; 3rd Generation Partnership Project; Technical Specification Group Radio Access Network; NG-RAN; NG Application Protocol (NGAP); (Release 17).
3GPP TS 38.423 V17.2.0 (Sep. 2022); Technical Specification; 3rd Generation Partnership Project; Technical Specification Group Radio Access Network; NG-RAN; Xn application protocol (XnAP); (Release 17).
R2-2008963; 3GPP TSG RAN WG2 Meeting #112-e; E-Conference, Nov. 2-13, 2020; Agenda item: 8.8.2; Source: Qualcomm Incorporated; Title: Further discussion on RAN slicing enhancement; WID/SID: FS_NR_slice—Release 17; Document for: Discussion and Decision.
R2-2010181; 3GPP TSG-RAN WG2 Meeting #112 electronic; Online, Nov. 2-13, 2020; Source: Huawei, HiSilicon; Title: Slice based Cell (re)selection under network control; Agenda Item: 8.3.2 Slice based cell reselection under network control; Document for: Discussion and decision.
R2-2010366; 3GPP TSG-RAN WG2 Meeting #112 electronic; Online, Nov. 2-13, 2020; Agenda Item: 8.8.1; Source: CMCC; Title: Email discussion on open issues for RAN slicing SI; Document for: Discussion and Decision.
R2-2100660; 3GPP TSG-RAN WG2 Meeting #113 electronic; Online, Jan. 25-Feb. 5, 2021; Agenda item: 8.8.2; Source: Spreadtrum Communications; Title: Discussion on the awareness of intended slice for MT service; WID/SID: FS_NR_Slice; Document for: Discussion and Decision.
R2-2100894; 3GPP TSG-RAN WG2 #113-e; E-meeting, Jan. 2021; Agenda Item: 8.8.2; Source: OPPO; Title: Consideration on slice-specific cell (re)selection; Document for: Discussion, Decision.
R2-2100964; 3GPP TSG-RAN WG2 Meeting #113 electronic; Online, Jan. 25-Feb. 5, 2021; Source: CATT; Title: Slice based Cell Reselection under Network Control; Agenda Item: 8.8.2; Document for: Discussion and Decision.
R2-2101294; 3GPP TSG-RAN WG2 #113e; Electronic meeting, Jan. 25, 2021-Feb. 5, 2021; Agenda Item: 8.3.2; Source: Ericsson; Title: Network Slice Support in Cells; Document for: Discussion, Decision.
R2-2101802; 3GPP TSG-RAN WG2 Meeting #113 electronic; Online, Jan. 25-Feb. 5, 2021; Agenda Item: 8.8.1; Source: CMCC; Title: Report of [Post112-e][253][RAN slicing] Prioritized solutions for RAN slicing; Document for: Discussion and Decision.
R2-2101974; 3GPP TSG-RAN WG2 Meeting #113 electronic; Online, Jan. 25-Feb. 5, 2021; Agenda Item: 8.8.2 Slice based cell reselection under network control; Source: Huawei (Email rapporteur); Title: Report of email 251 for slice-based cell (re)selection; WI code(s): FS_NR_slice; Document for: Discussion and Decision.
R3-204809; 3GPP TSG-RAN WG3 Meeting #109-e; Electronic, Aug. 17-28, 2020; Agenda item: 17.3; Source: Qualcomm Incorporated; Title: On need for UE Capability Check for RAN slicing; Document for: Discussion.
R3-204902; 3GPP TSG-RAN WG3 Meeting #109-e; Online, Aug. 17-28, 2020; Title: Discussion on slice re-mapping and fallback upon handover; Source: China Telecom; Agenda Item: 17.2; Document for: Discussion and decision.
R3-205030; 3GPP TSG-RAN WG3 #109-e; Aug. 17-Aug. 28, 2020, E-Meeting; Agenda Item: 17.2; Source: Ericsson; Title: Discussion on slice Re-mapping at mobility; Document for: Discussion, Decision.
R3-206435; 3GPP TSG-RAN3 #110-e; Nov. 2-Nov. 12, 2020; Online; Agenda Item: 17.3; Source: Ericsson; Title: Analysis of KI#7 on Fast Access To Network Slices; Document for: Discussion, Decision.
R3-212977; 3GPP TSG-RAN WG3 #112-e; May 17-May 27, 2021; Online; Agenda item: 17.3; Source: ZTE ( Moderator); Title: (TP for TR 38.832) RAN Slicing; Document for: Discussion and Approval.
S2-2208467; 3GPP SA WG2 Meeting #153E (e-meeting); Oct. 10-17, 2022, Elbonia; Source: Verizon; Title: KI#6, Sol #32: Update to allow the PCF initiate the move of a PDU session from one slice to another; Document for: Approval; Agenda Item: 9.14; Work Item / Release: FS_eNS_Ph3 / Rel-18.
S2-2208835; 3GPP TSG-WG SA2 Meeting #153E e-meeting; Elbonia, Oct. 10-17, 2022 (revision of S2-2206700); Source: Nokia, Nokia Shanghai Bell; Title: KI#3, Updated Solution 29: Editor's Note resolution and small optimization for MO interactions; Document for: Approval; Work Item / Release: FS_eNS_Ph3/ Rel-18.
S2-2209299; SA WG2 Meeting #153E (e-meeting); Oct. 10-14, 2022, Elbonia (revision of S2-220xxxx); Source: NEC, LGE, Lenovo, Nokia, Nokia shanghai Bell, Huawei, ZTE; Title: KI#2: Conclusions; Document for: Approval; Agenda Item: 9.14 Study on Network Slicing Phase 3; Work Item / Release: FS_eNS_Ph3 / Rel-18.
S2-2209300; 3GPP SA WG2 Meeting #153E; Elbonia, Oct. 10-17, 2022 (was S2-2208183); Source: Ericsson, Apple; Title: KI 2: Proposal for Conclusion on KI #2.; Document for: Discussion/Approval; Agenda Item: 9.14; Work Item / Release: FS_eNS_PH3.
S2-2209301; 3GPP TSG-WG SA2 Meeting #153E e-meeting; Elbonia, Oct. 10-17, 2022 (revision of S2-2208802r07 without evaluation text); Source: Nokia, Nokia Shanghai Bell, Docomo, NEC; Title: Way forward proposal for Conclusions and Evaluations; Document for: Approval.
S2-2209302; 3GPP TSG-WG SA2 Meeting #153E e-meeting; Elbonia, Oct. 10-17, 2022 (revision of S2-220xxxx); Source: Huawei, HiSilicon, Nokia, ZTE, Ericsson; Title: KI#4: Evaluation and Conclusion for KI#4; Document for: Approval; Agenda Item: 9.14; Work Item / Release: FS_eNS_Ph3/ Rel-18.
S2-2209303; 3GPP TSG-WG SA2 Meeting #153E e-meeting; Elbonia, Oct. 10-17, 2022 (revision of S2-2208411); Source: Huawei, HiSilicon; Title: Evaluation and conclusion for KI#5; Document for: Approval; Agenda Item: 9.14; Work Item / Release: FS_eNS_Ph3 / Rel-18.
S2-2209304; SA WG2 Meeting #153E; Oct. 10-17, 2022, E-meeting; Source: vivo; Title: Update to Sol#43; Document for: Approval; Agenda Item: 9.14; Work Item / Release: FS_eNS_ph3 / Rel-18.
S2-2209305; SA WG2 Meeting #153E e-meeting; Oct. 10-14, 2022, Elbonia (revision of S2-2209046); Source: China Mobile, Alibaba; Title: Resolving ENs of solution #40; Document for: Approval; Agenda Item: 9.14; Work Item / Release: FS_eNS_Ph3 / Rel-18.
S2-2209945; 3GPP SA WG2 Meeting #153E; Elbonia, Oct. 10-17, 2022 (was S2-2208871r13); Source: Samsung, NEC; Title: KI#6: Evaluation and conclusion; Document for: Approval; Agenda Item: 9.14; Work Item / Release: FS_eNS_Ph3.
S2-2211203; 3GPP TSG-WG SA2 Meeting #154; Toulouse, France, Nov. 14-18, 2022 (revision of S2-2210982); Source: ZTE, NEC; Title: Conclusion update on KI#1; Document for: Approval; Agenda Item: 9.14; Work Item / Release: FS_eNS_Ph3 / Rel-18.
S2-2211209; 3GPP SA WG2 Meeting #154; Nov. 14-18, 2022 (was S2-22011018); Source: Ericsson; Title: KI#4: Updated Final Conclusion; Document for: Approval; Agenda Item: 9.14; Work Item / Release: FS_eNS_Ph3.
S2-2211226; 3GPP TSG-WG SA2 Meeting #154 e-meeting; Toulouse, Nov. 14-18, 2022 (revision of S2-2211211); Source: Nokia, Nokia Shanghai Bell, Apple; Title: KI#6 Updated evaluations and conclusions; Document for: Approval; Agenda Item: 9.14; Work Item / Release: FS_eNS_Ph3/ Rel-18.

(56) References Cited

OTHER PUBLICATIONS

S2-2211227; 3GPP SA WG2 Meeting #154; Toulouse, France, Nov. 14-18, 2022 (was S2-2211206); Source: Ericsson, Huawei, NEC, Deutsche Telekom, Apple, Samsung; Title: KI#3: Conclusion for KI#3; Document for: Discussion/Approval; Agenda Item: 9.14.1; Work Item / Release: FS_eNS_PH3.

S2-2211229; 3GPP SA WG2 Meeting #154; Toulouse, France, Nov. 14-18, 2022; Source: Ericsson, Interdigital, NEC, Huawei, Samsung, LGE; Title: KI#5: Proposal for Conclusion; Document for: Discussion/Approval; Agenda Item: 9.14.1; Work Item / Release: FS_eNS_PH3.

International Search Report and Written Opinion of the International Searching Authority mailed May 10, 2024, in International Application No. PCT/US2024/010275.

S2-2204400; 3GPP TSG-WG SA2 Meeting #151 E e-meeting; Elbonia, May 16-20, 2022; Source: Nokia, Nokia Shanghai Bell; (revision of S2~220xxx); Title: KI#5: New Solution"On handling S-NSSAIs not supported in certain TAs of a RA during a registration"; Document for: Approval; Agenda Item: 9.14; Work Item/Release: FS_eNS_Ph3 / Rel-18.

* cited by examiner

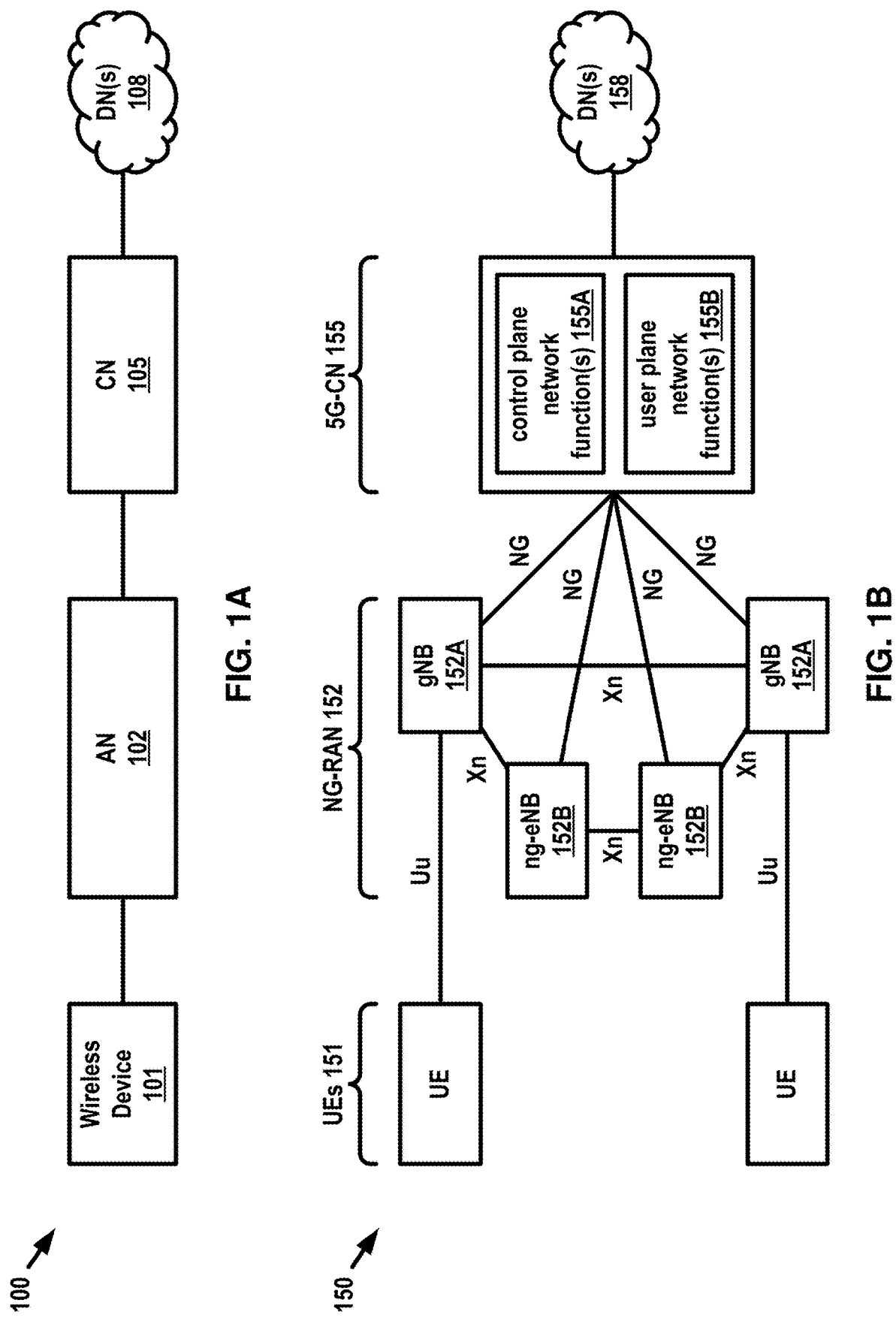

NETWORK SLICE MOBILITY MANAGEMENT

CROSS-REFERENCE TO RELATED APPLICATIONS

This application is a continuation of International Application No. PCT/US2024/010275, filed Jan. 4, 2024, which claims the benefit of U.S. Provisional Application No. 63/437,278, filed Jan. 5, 2023, all of which are hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example communication networks including an access network and a core network.

DETAILED DESCRIPTION

Figure 2A:
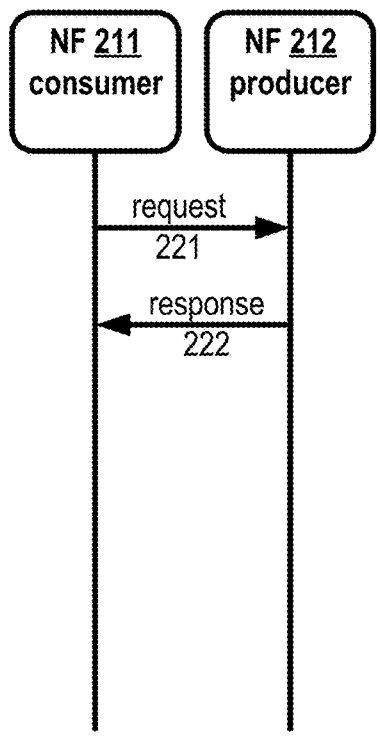
FIG. 2A, FIG. 2B, FIG. 2C, and FIG. 2D illustrate various examples of a framework for a service-based architecture within a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNS) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNS (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

Figure 2B:
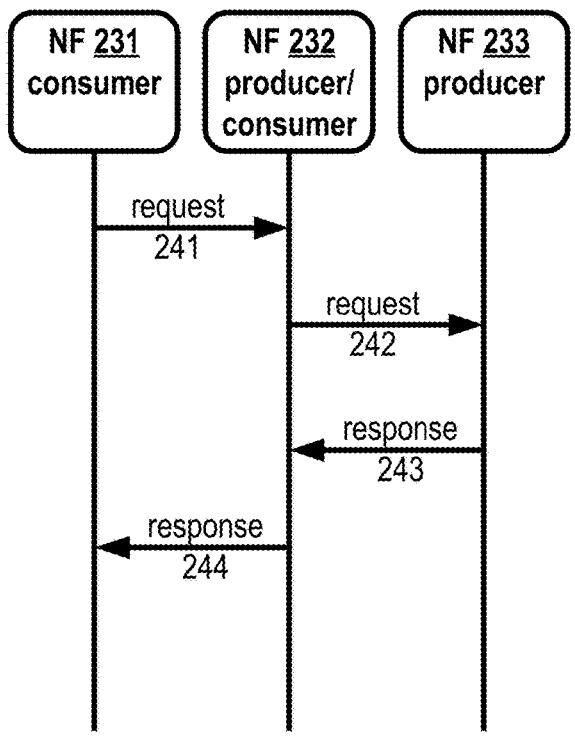

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figure 2C:
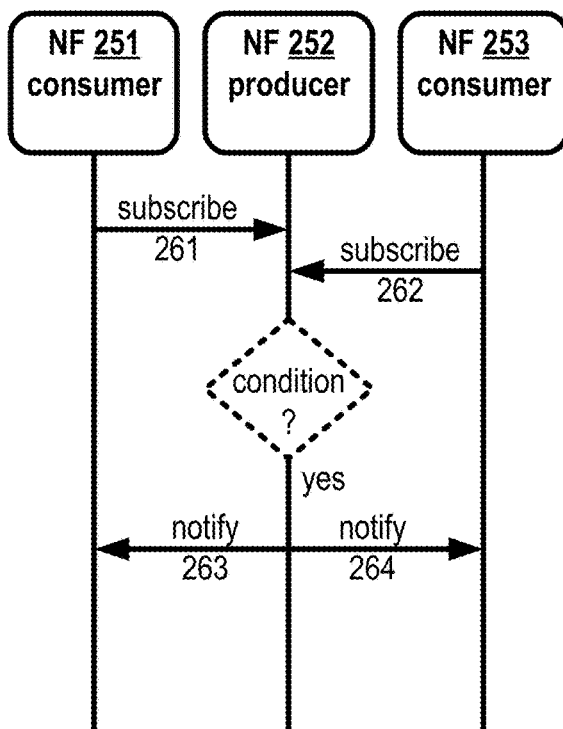

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

Figure 2D:
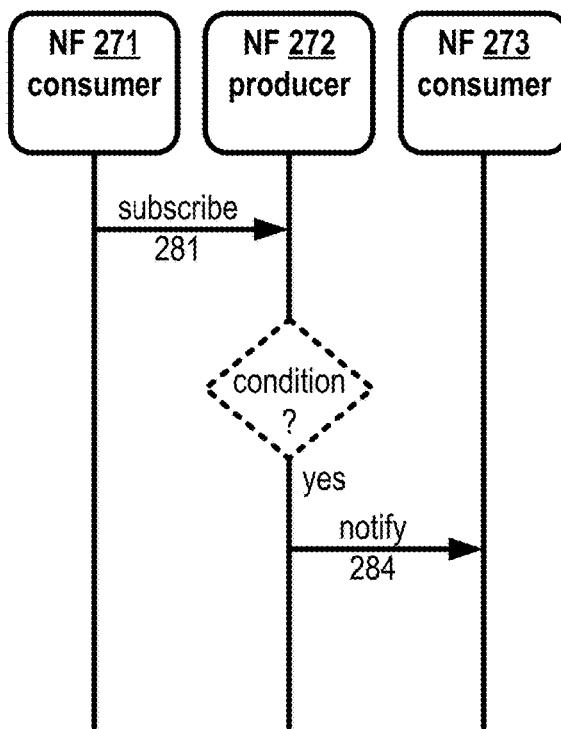

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
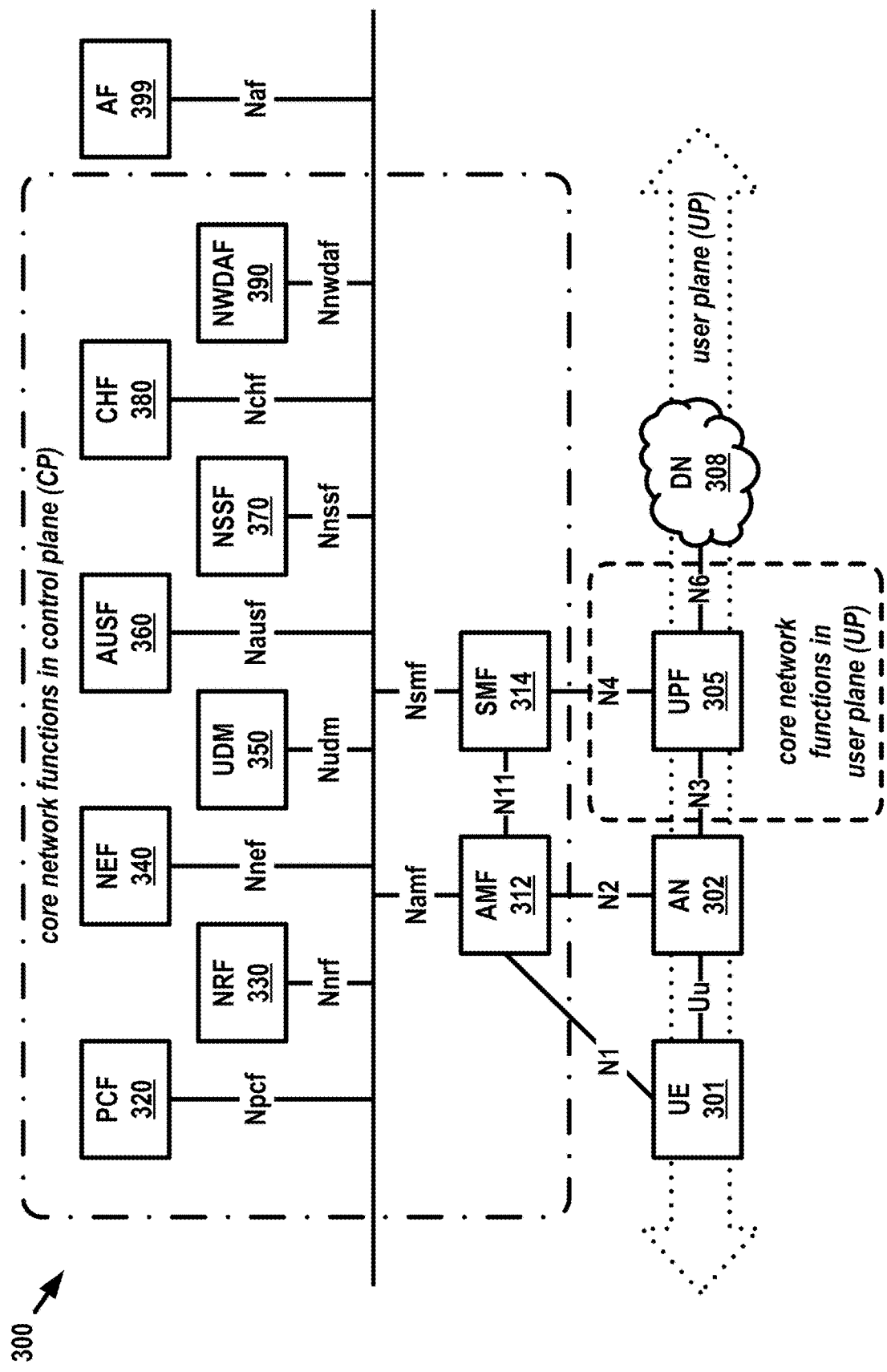
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QOS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
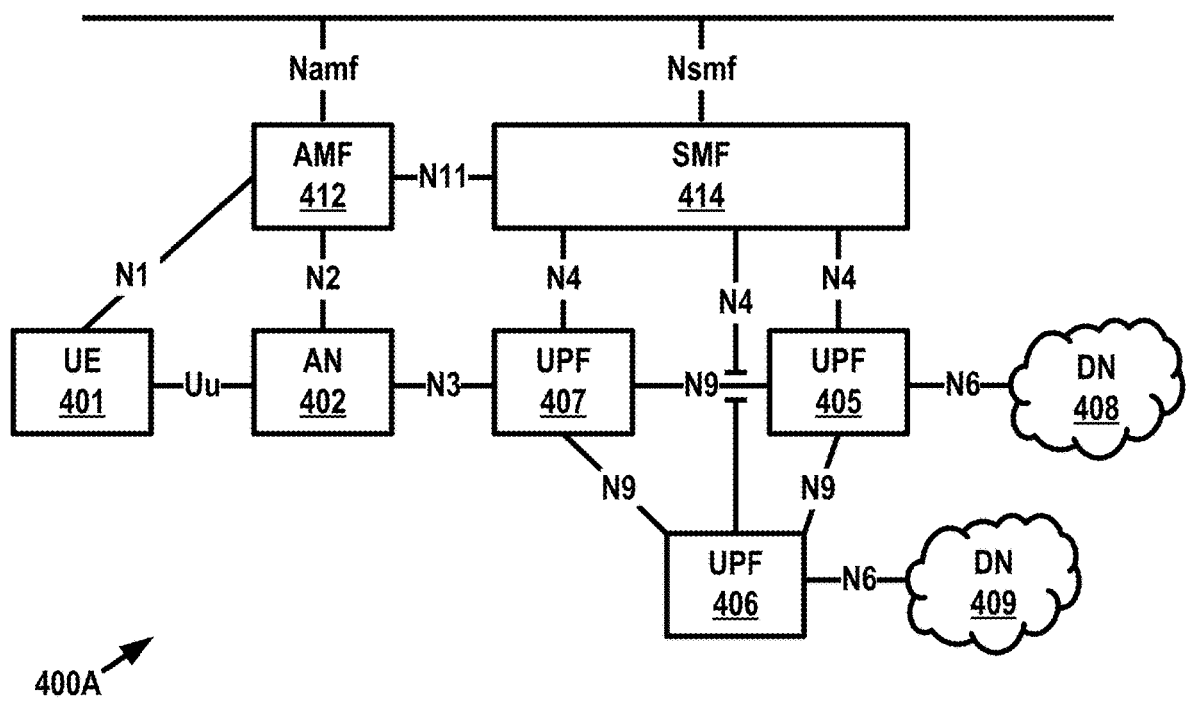
FIG. 4A and FIG. 4B illustrate example of core network architecture with multiple user plane functions and untrusted access.
Figure 4B:
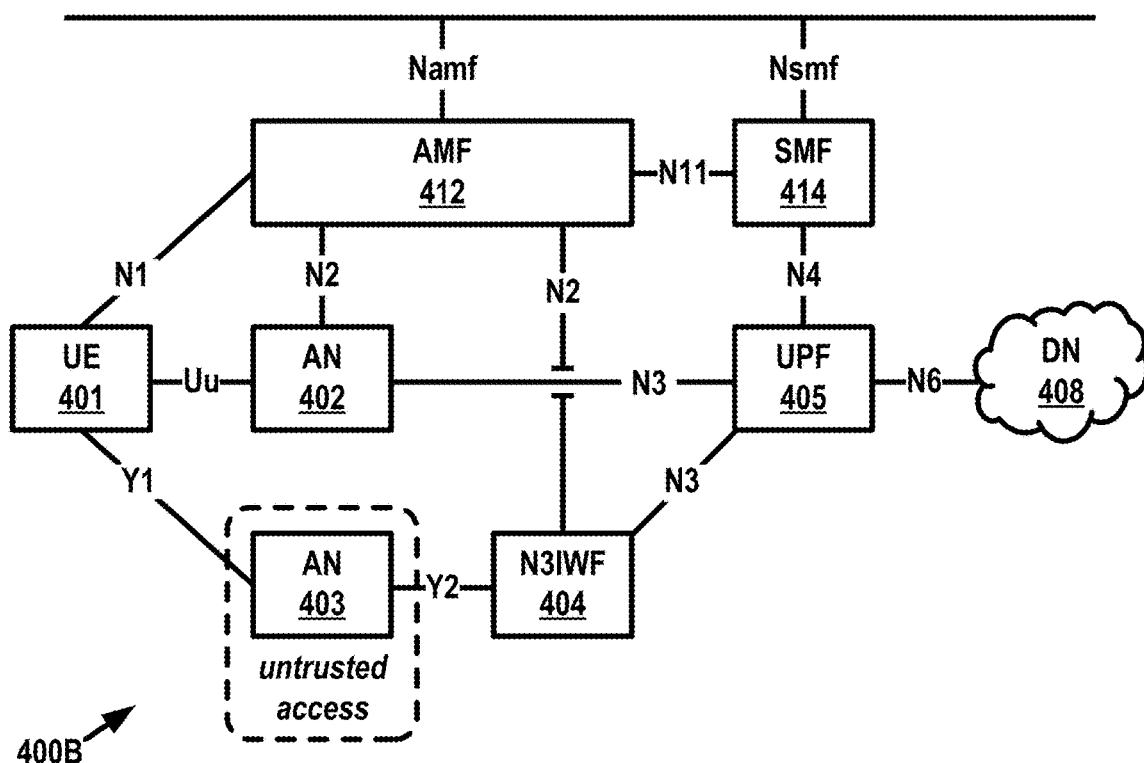
Figure 5:
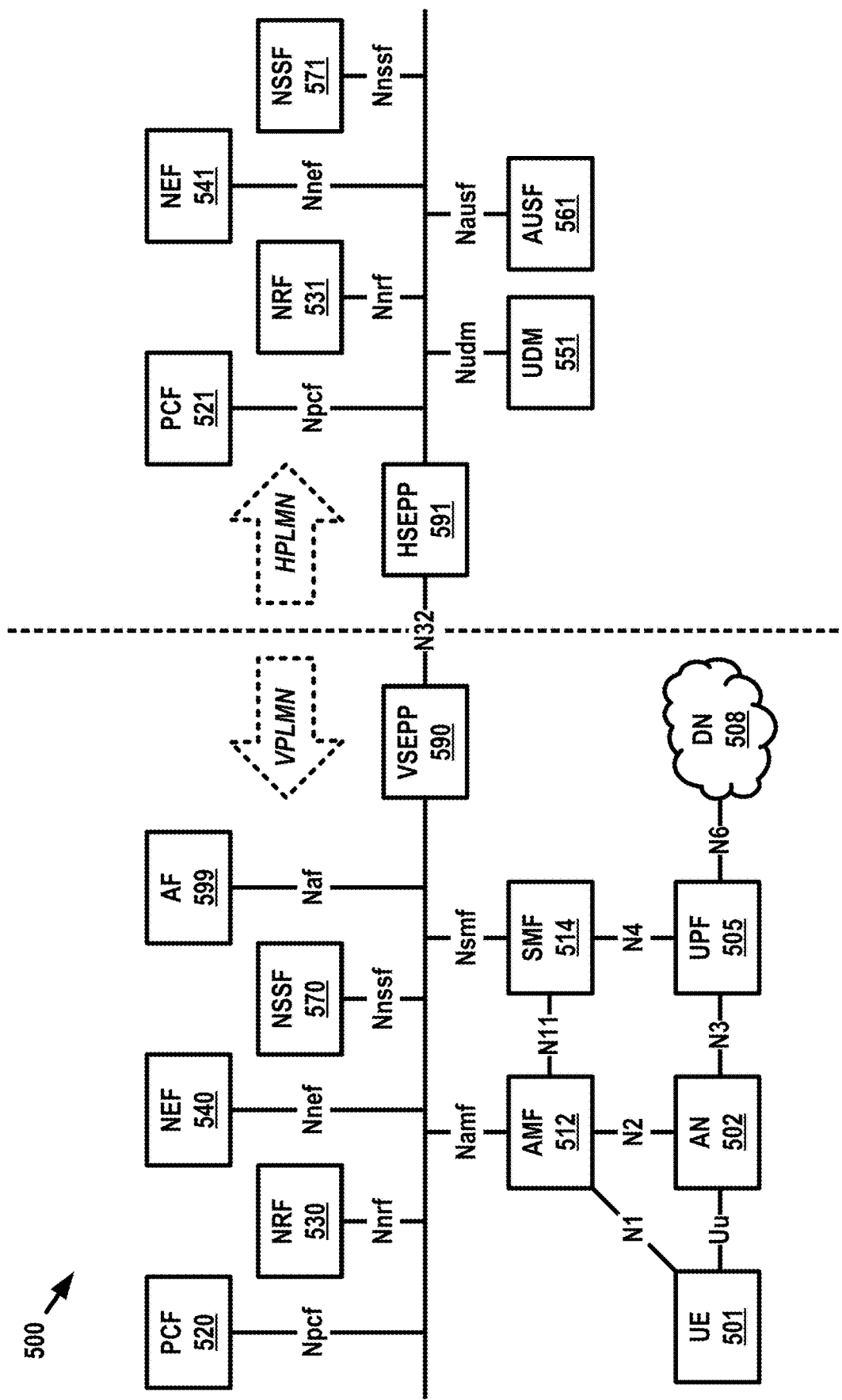
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNS (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
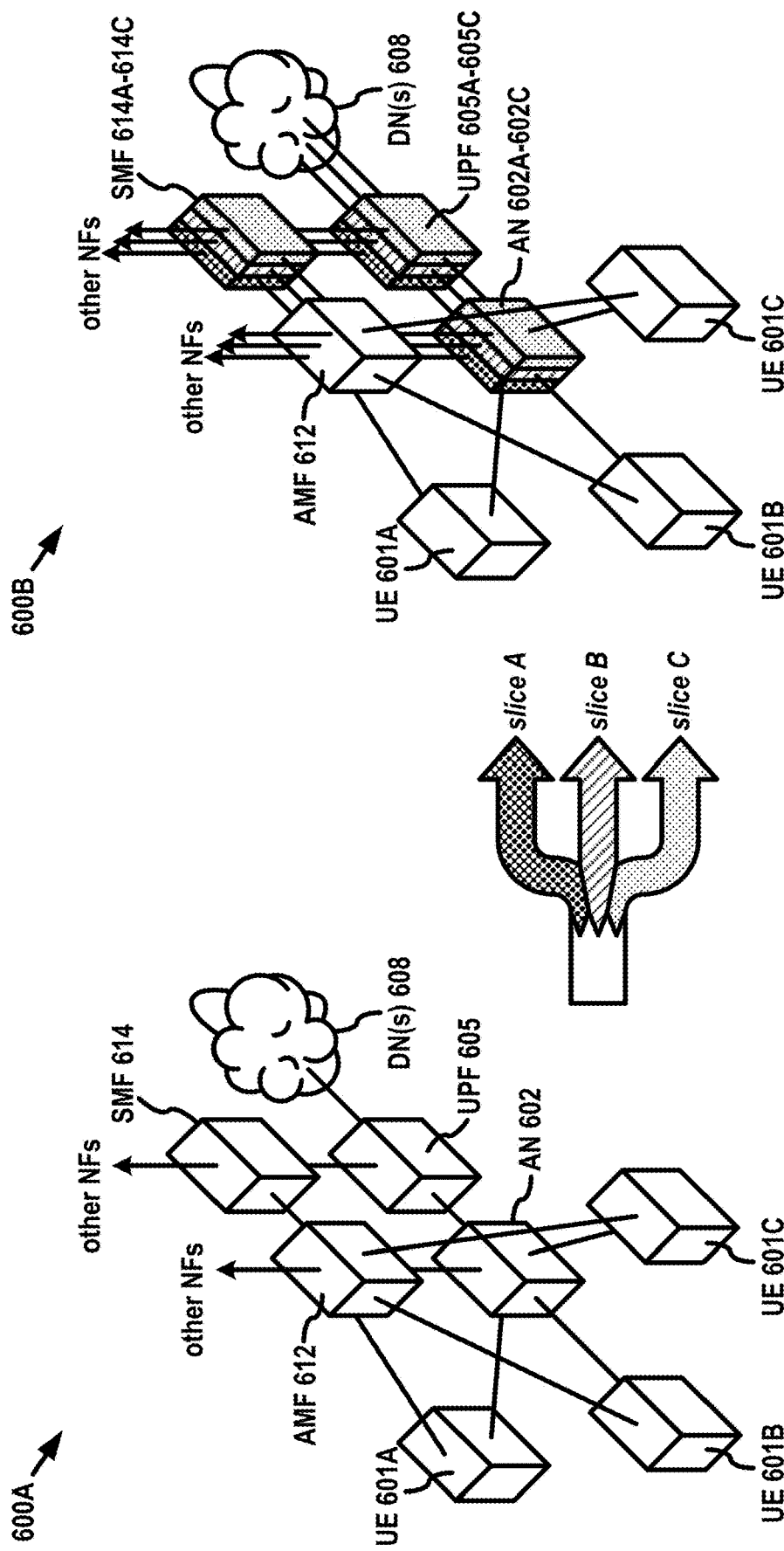
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figure 7C:
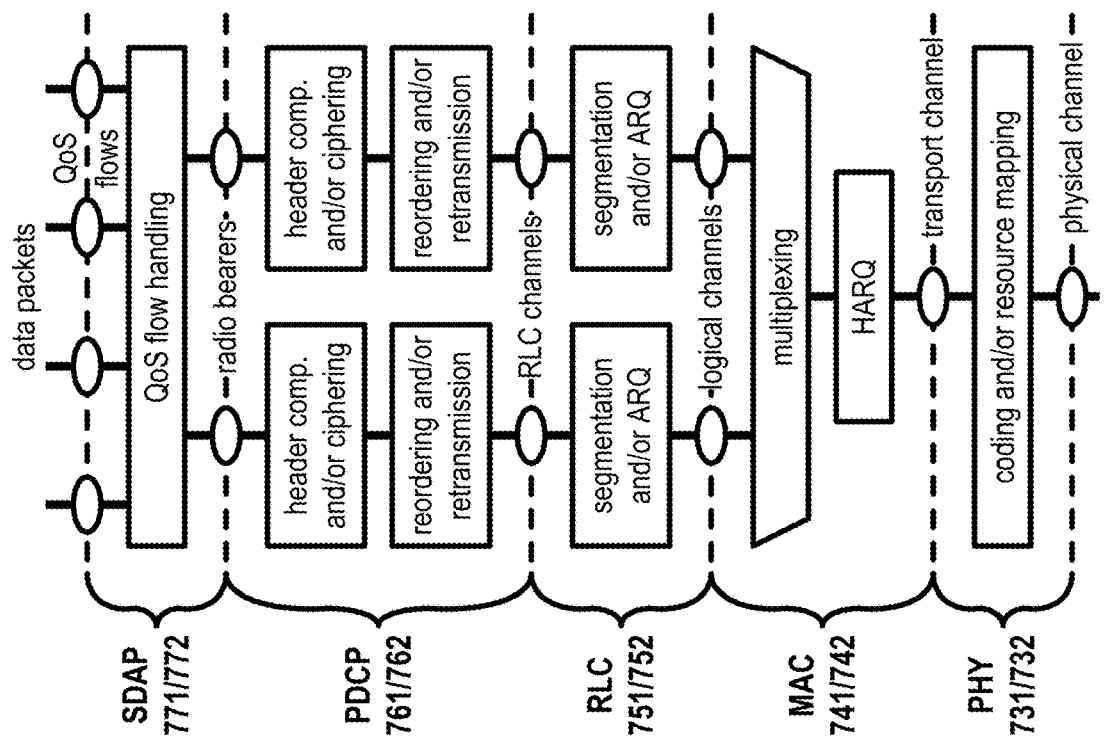
FIG. 7A, FIG. 7B, and FIG. 7C illustrate a user plane protocol stack, a control plane protocol stack, and services provided between protocol layers of the user plane protocol stack.
Figure 7A:
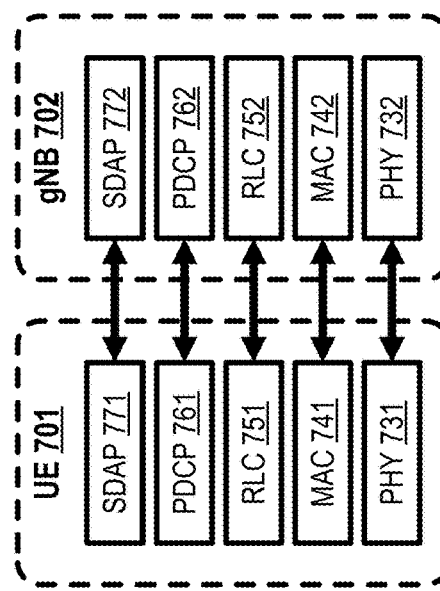
Figure 7B:
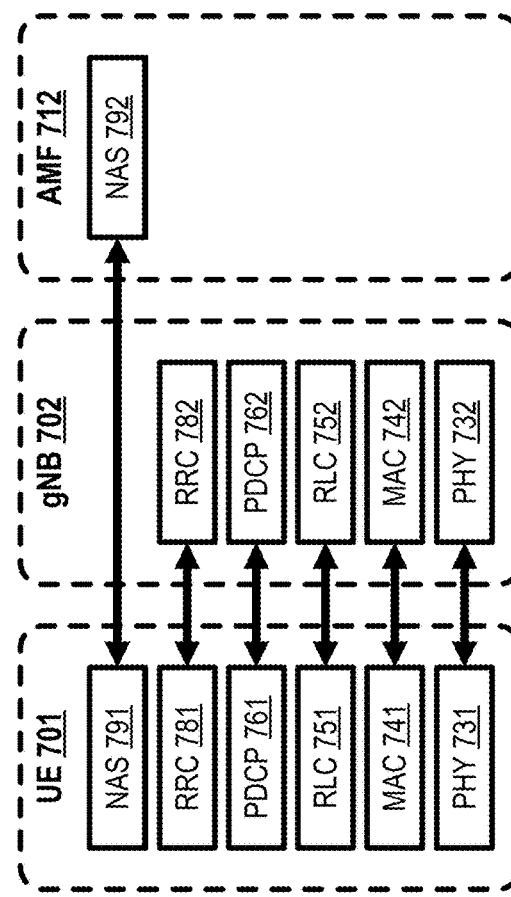

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QOS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
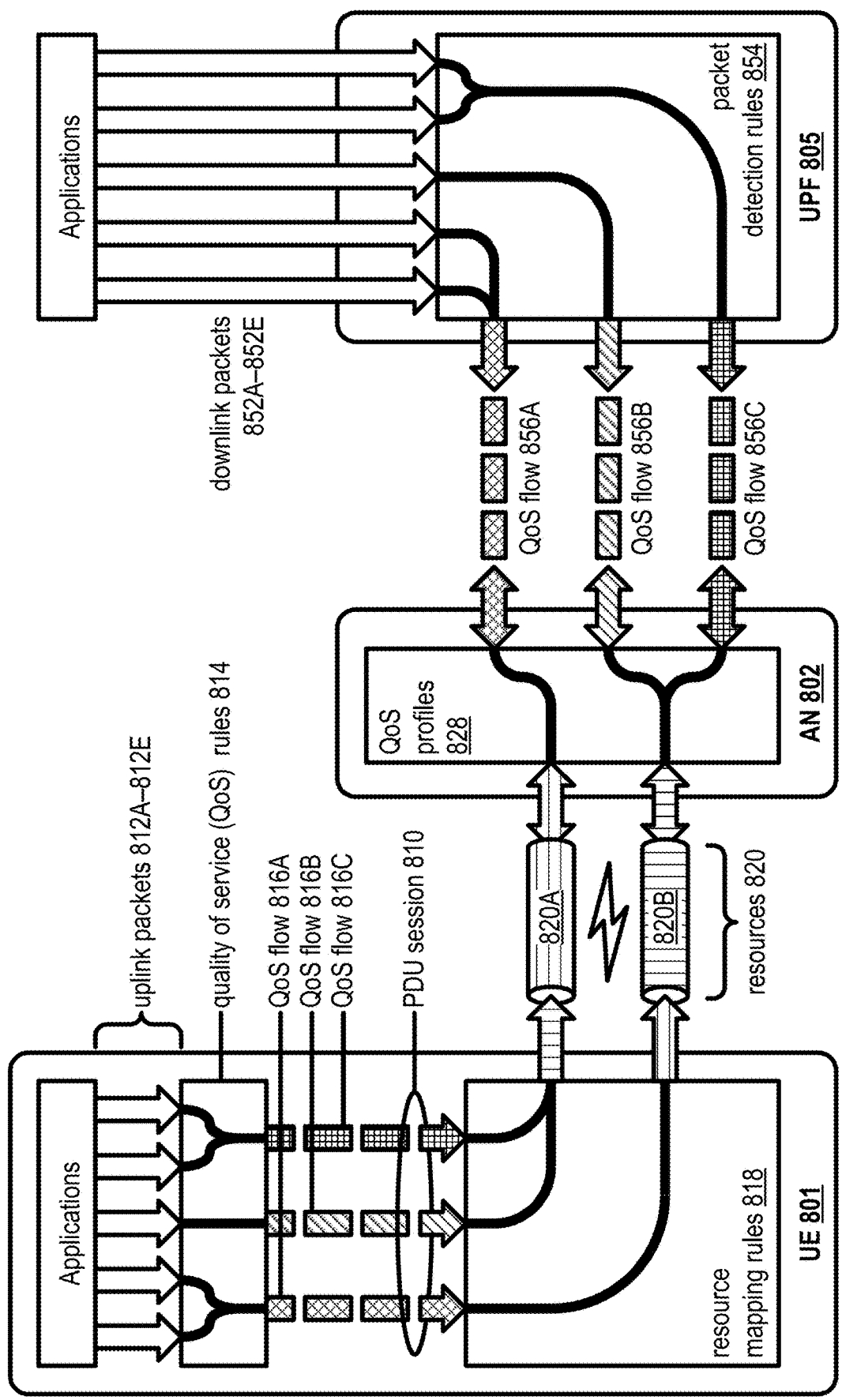
FIG. 8 illustrates an example of a quality of service model for data exchange.

FIG. 8 illustrates an example of a quality of service (QOS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QOS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
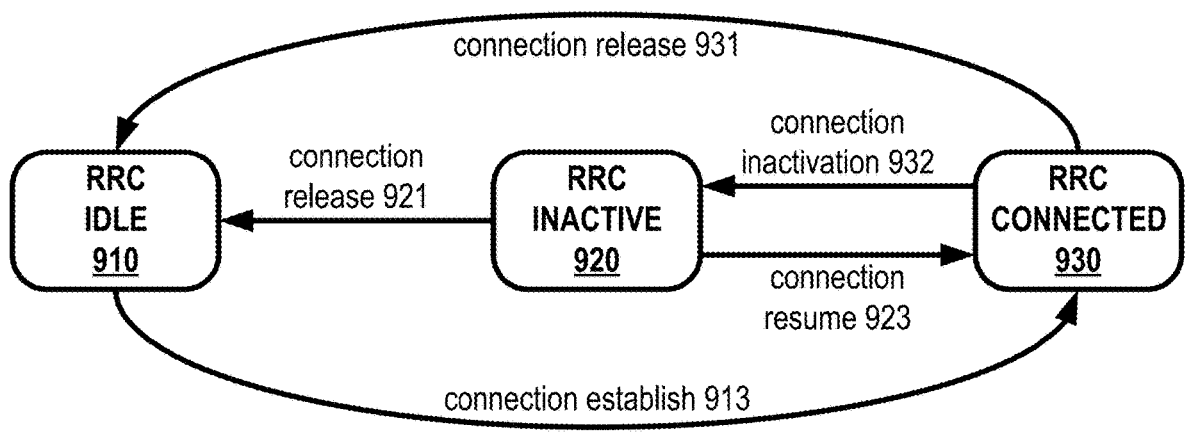
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
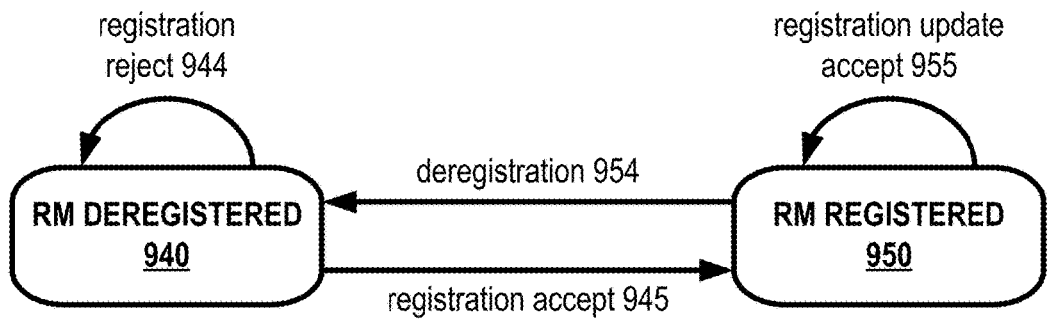

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, .e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
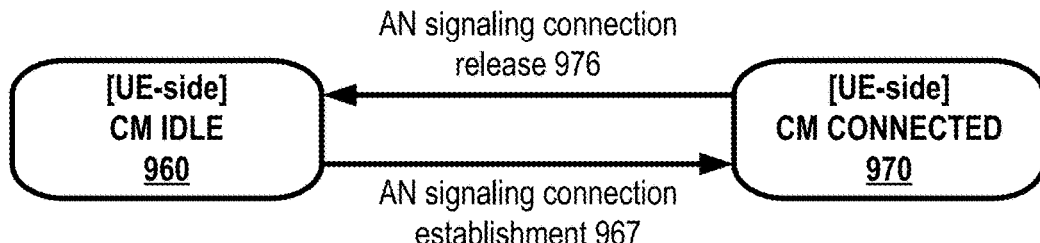

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
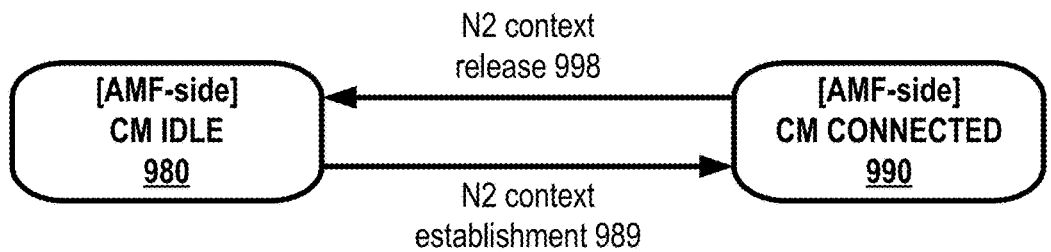

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
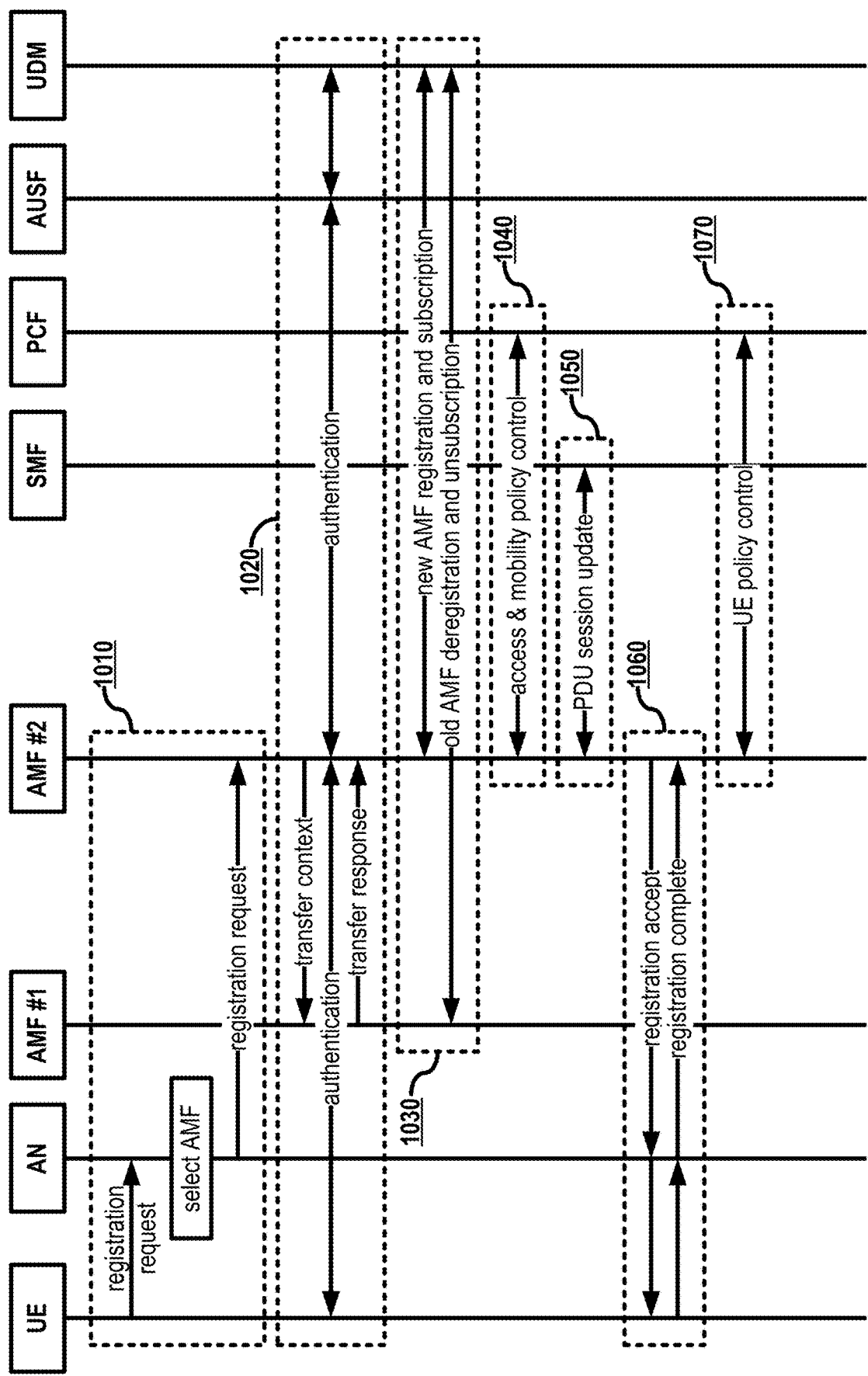
FIG. 10 illustrates an example of a registration procedure for a wireless device.
Figure 11:
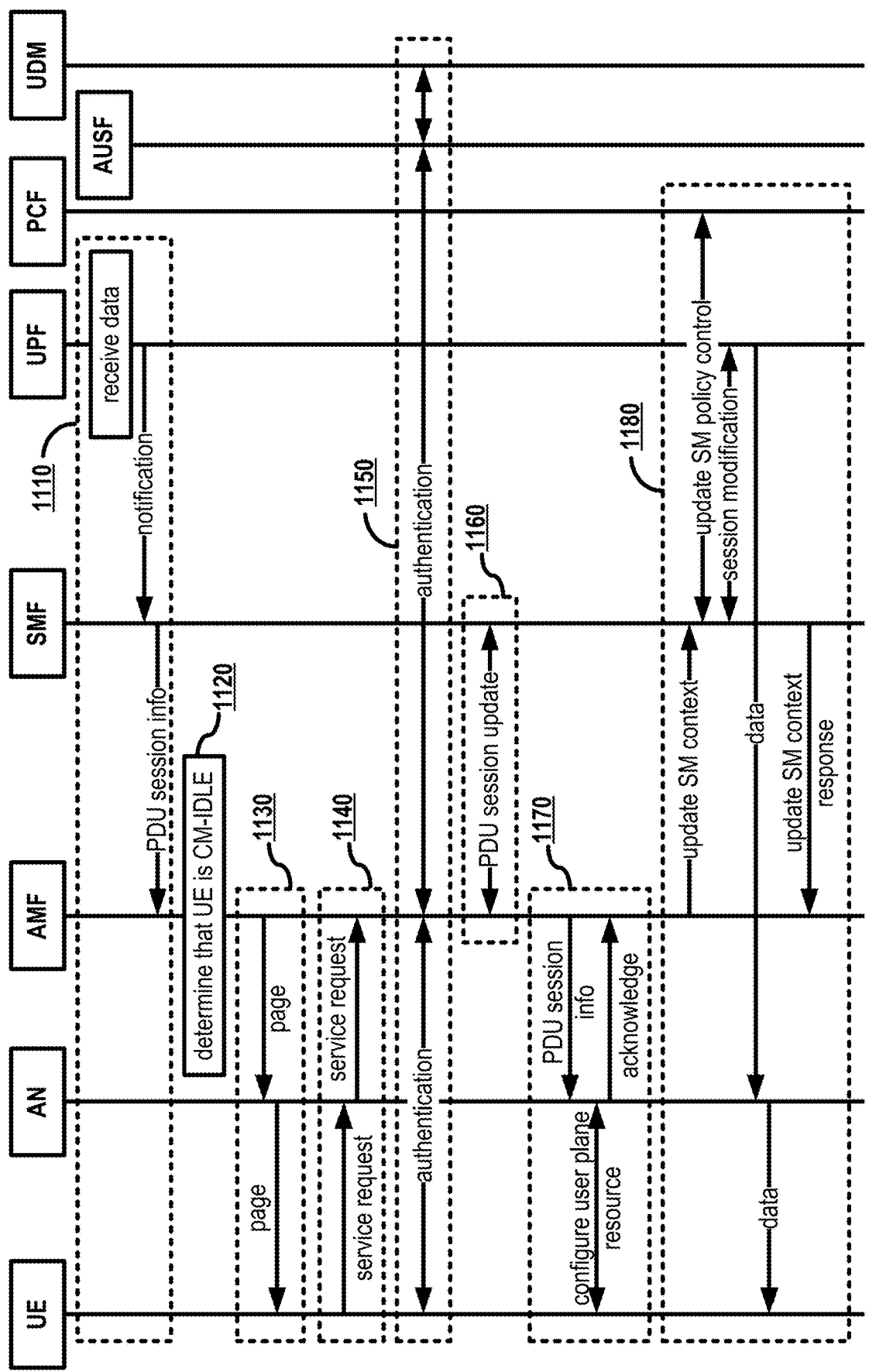
FIG. 11 illustrates an example of a service request procedure for a wireless device.
Figure 12:
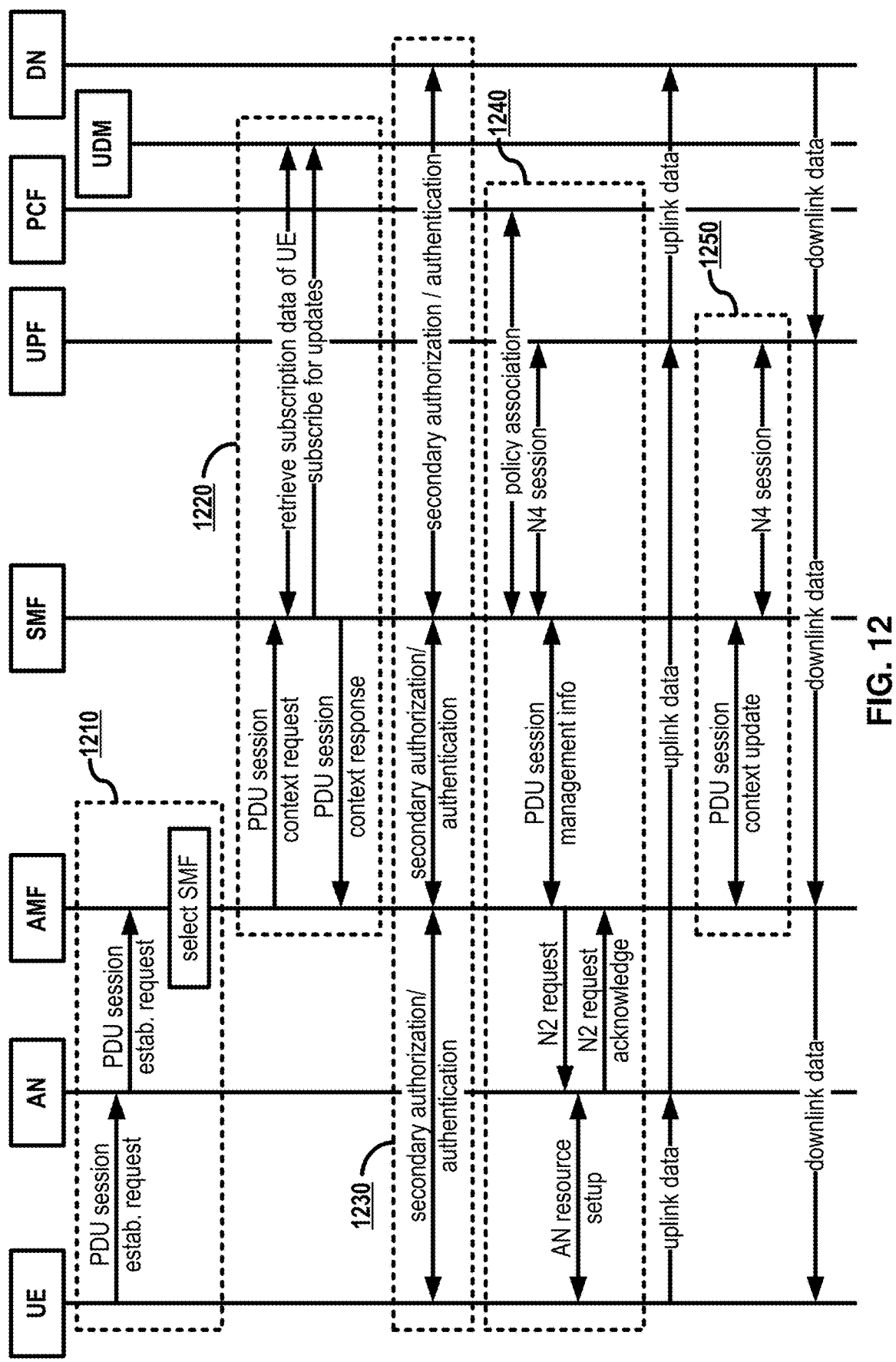
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSMContext Request and/or a Nsmf_PDUSession_UpdateSMContext Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_PDUSession_CreateSMContext Response and/or a Nsmf_PDUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/ or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QOS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_PDUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
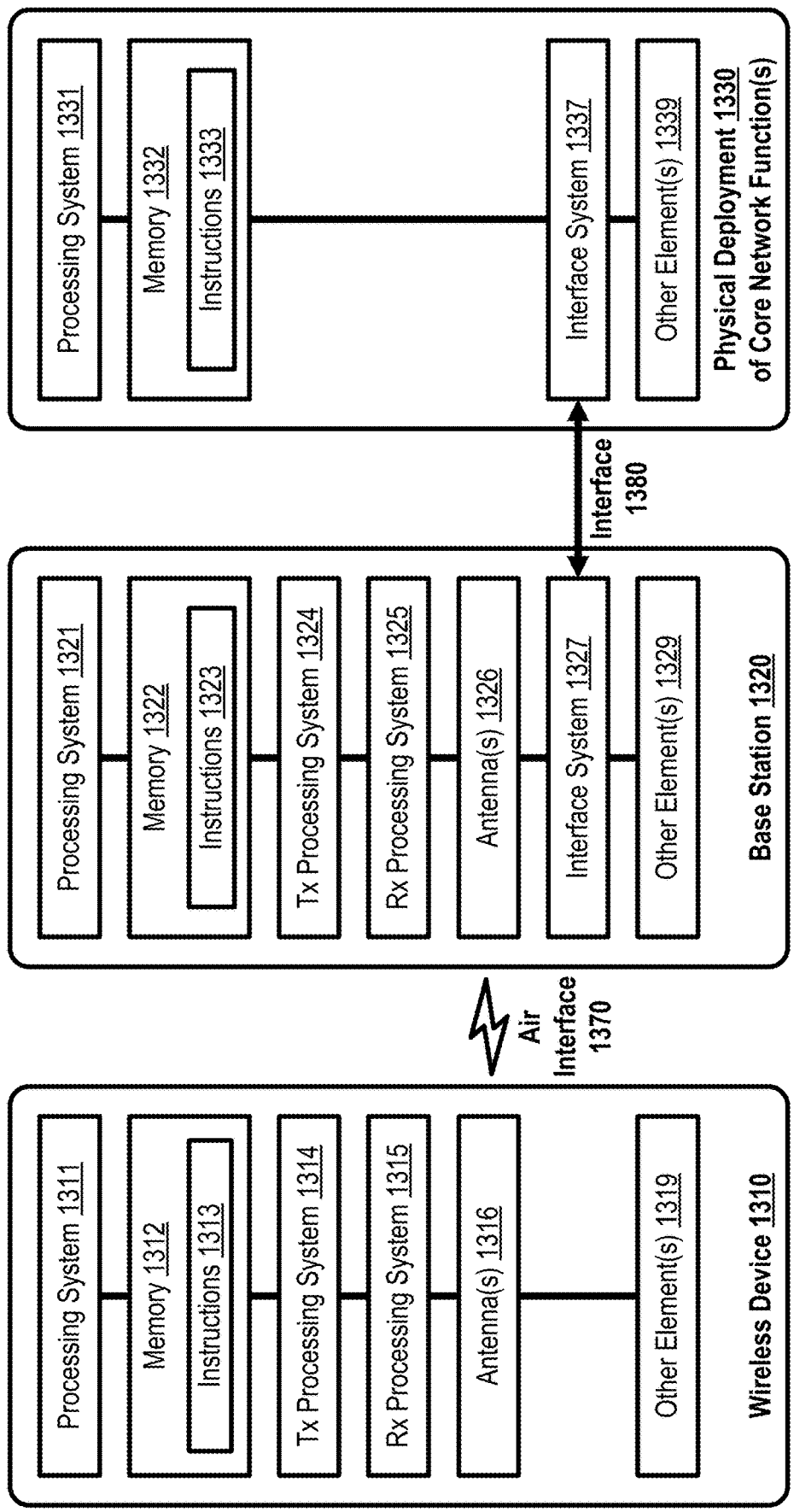
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAS, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

Figure 14A:
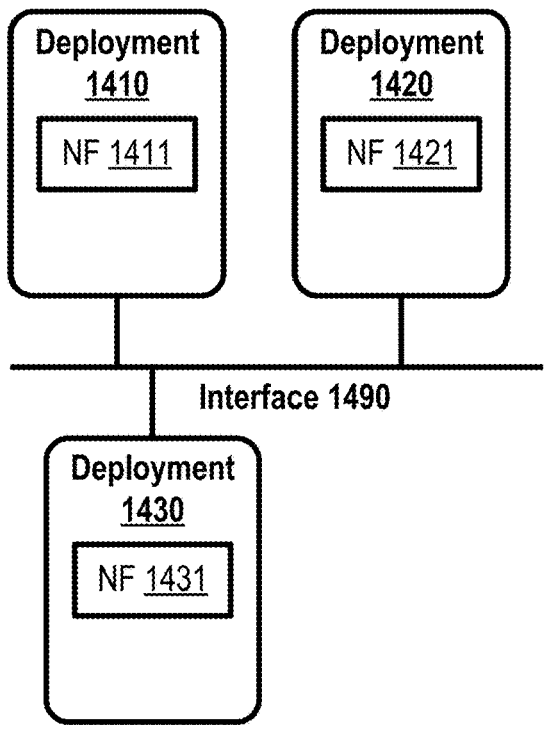
FIG. 14A, FIG. 14B, FIG. 14C, and FIG. 14D illustrate various examples of physical core network deployments, each having one or more network functions or portions thereof.

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

Figure 14B:
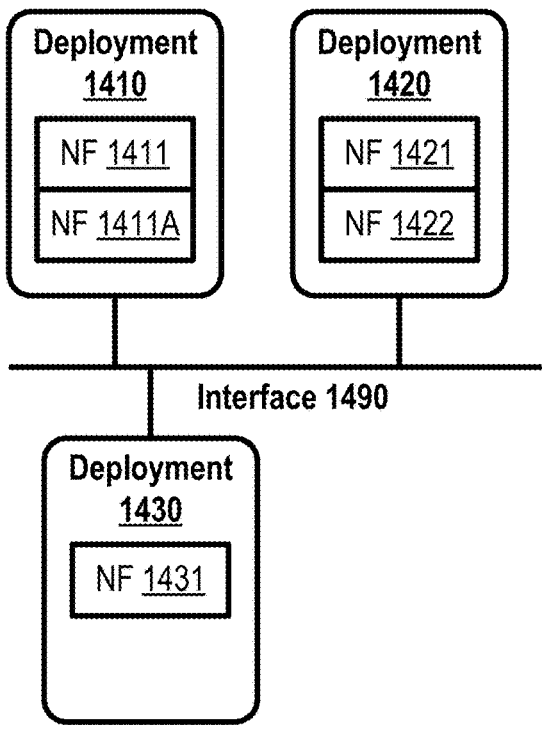

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFS 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

Figure 14C:
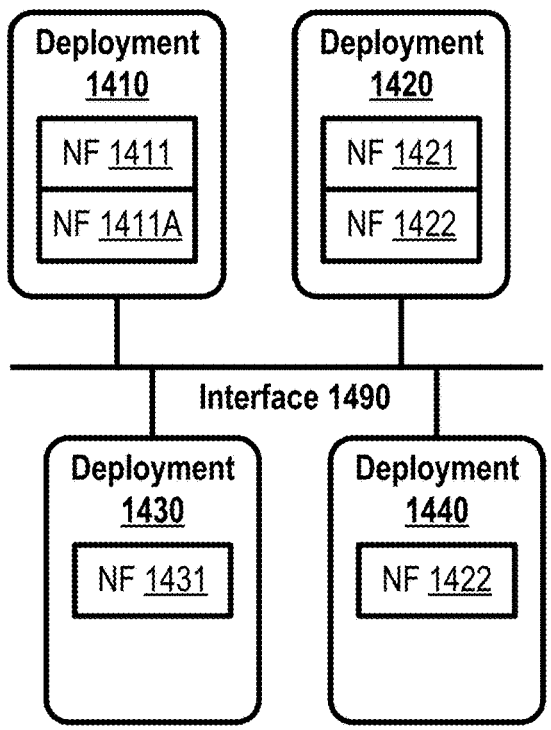

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

Figure 14D:
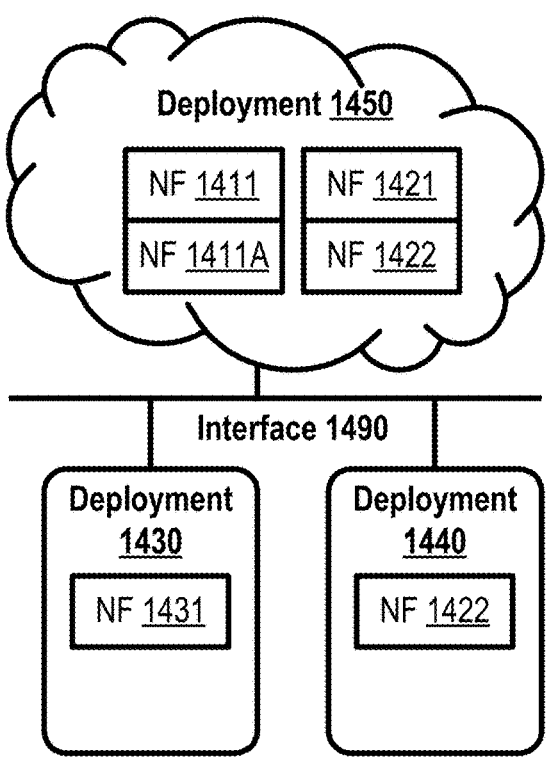

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

Figure 15A:
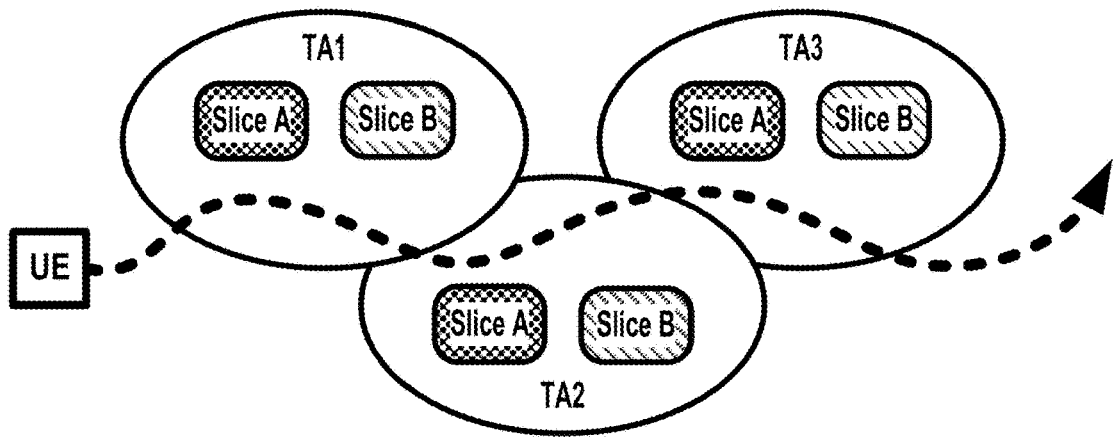
FIG. 15A, FIG. 15B, and FIG. 15C are diagrams of an aspect of an example embodiment of the present disclosure.
Figure 15B:
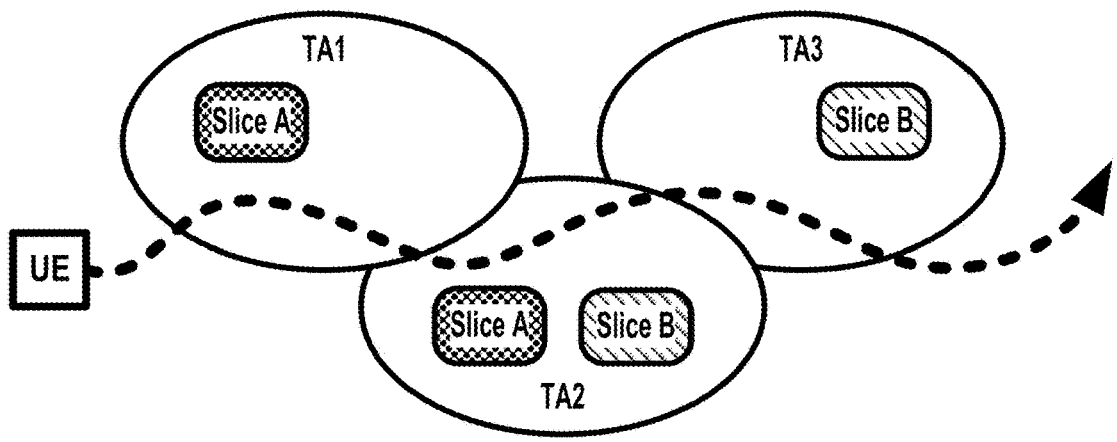
Figure 15C:
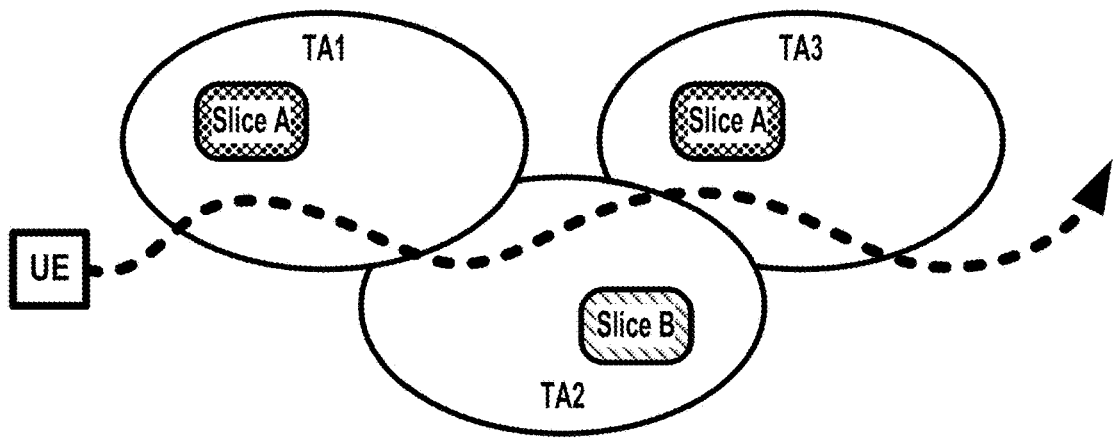

In example embodiments as depicted in FIG. 15A, FIG. 15B, FIG. 15C, different tracking areas may support different slices (e.g., different network slices, different network services, etc.) and/or different combinations of slices. In one example, a tracking area (TA) may correspond to the (combined) coverage areas of one or more cells of one or more base stations. In other example, a base station may cover one or more cells of one or more TAs. A TA may comprise one or more NG-RANs, one or more gNBs, and/or one or more ng-eNBs and/or the like. A NG-RAN (or a gNB, a ng-eNB, a base station) may comprise one or more TAs. A NG-RAN may comprise one or more gNBs, and/or one or more ng-eNBs, one or more N3IWFs and/or the like. A gNB may comprise one or more gNB-CU and/or one or more gNB-DUs. A gNB-CU may comprise a gNB-CU-CP and/or one or more gNB-CU-UPs.

FIG. 15A illustrates an example of TAs that are undifferentiated with respect to slice support. For example, all the TAs depicted in FIG. 15A (TA1, TA2, TA3) support the same combination of slices (slice A and slice B). When a wireless device (e.g., UE) enters a TA (e.g., TA1), the UE may send a registration request, in TA1 (e.g., via a base station associated with TA1, via a cell of TA1), to an access and mobility management function (e.g., AMF, etc.). The registration request may indicate a requested slice (e.g., slice A). The AMF may determine that TA1 supports the requested slice (slice A) and may determine to accept the registration. The AMF may determine a registration area of the UE. The registration area includes TA1 and may include other TAs. Support for the requested slice (slice A) may be one factor for determining the addition of other TAs to the registration area. For example, the AMF may add TA2 and TA3 to the registration area for the UE, based on TA2 and TA3 both supporting the requested slice (slice A). The AMF may send a registration accept to the UE. The registration accept may indicate the registration area. For example, the registration accept may comprise a TA list indicating the TAs in the registration area (e.g., TA1, TA2, and TA3). If the UE exits the registration area, it may need to perform the registration update procedure. The UE may be able to avoid registration update procedures for as long as it remains in the registration area.

FIG. 15B illustrates an example of TAs that are differentiated with respect to slice support. In particular, the TAs support different slices and/or combinations of slices. When the UE enters TA1, the UE may send a registration request, in TA1, to the AMF. The registration request may indicate a request for slice A. The AMF may determine that TA1 supports slice A and may determine to accept the registration. The AMF may determine that an adjacent TA also supports slice A (e.g., TA2), and that some other TAs do not support slice A (e.g., TA3). The AMF may send a registration accept to the UE indicating a registration area that is restricted to TAs which support slice A (TA1 and TA2).

FIG. 15C illustrates another example of TAs that are differentiated with respect to slice support. When the UE enters TA1, the UE may send a registration request, via TA1, to the AMF. The registration request may indicate a request for slice A. The AMF may determine that TA1 supports slice A and may determine to accept the registration. The AMF may determine that there are no adjacent TAs which support slice A. The AMF may send a registration accept to the wireless device indicating a registration area that is restricted to adjacent TAs which support slice A (TA1 only).

In existing technologies, the network may be substantially undifferentiated with respect to slice support. However, as new use cases emerge, it is possible that differentiation based on slice support increases. For example, as shown in FIG. 15A, from the perspective of slice support, one TA may be no more or less suitable than the others. This may enable the AMF to indicate a wide registration area (including TA1, TA2, TA3). However, there may be advantages to network differentiation, which may lead to the scenarios depicted in FIG. 15B and FIG. 15C. For example, a network operator may customize and/or fine-tune one or more network components of a first TA (e.g., base stations) to serve a particular network slice (e.g., slice A). As network components are increasingly customized to support a specific slice (e.g., slice A), they may become less suited to serve other slices (e.g., slice B). To compensate, the network operator may customize a different set of network components to serve slice B. In this way, slice support differentiation may proliferate within the network. Slice support differentiation may improve network service in many respects. But many existing mechanisms assume that TAs are undifferentiated. Existing approaches fail to address the unintended consequences of network differentiation with respect to slice support, as will be discussed in greater detail below.

Figure 16:
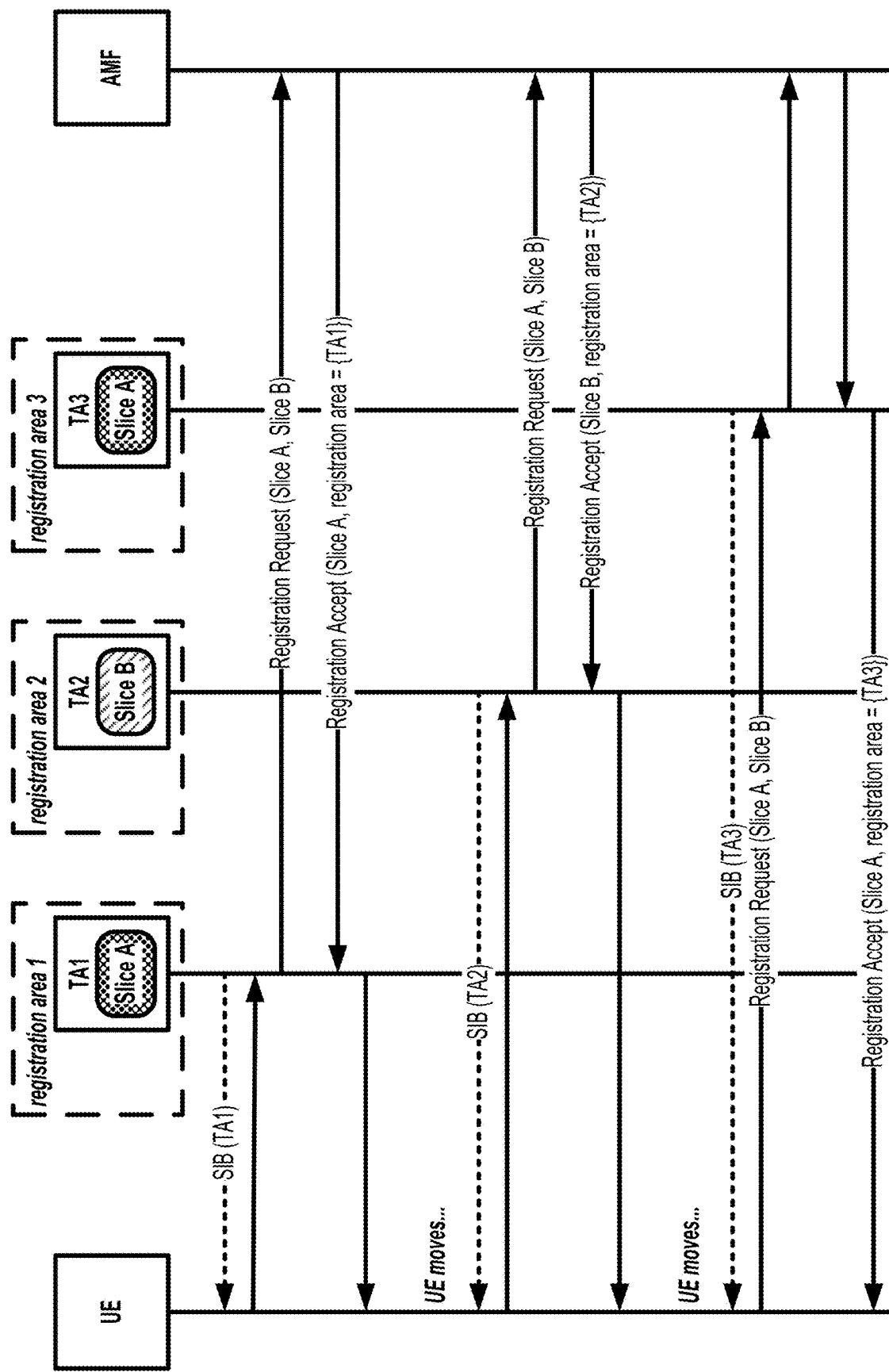
FIG. 16 is a diagram of an aspect of an example embodiment of the present disclosure.

FIG. 16 illustrates an example of wireless device registration update as the UE moves through several tracking areas (TA1, TA2, TA3). In FIG. 16, the TAs may have the same slice support characteristics as depicted in FIG. 15C. In particular, TA1 supports only slice A, TA2 supports only slice B, and TA3 supports only slice A. Due to the high level of slice differentiation among the TAs, they can not be added to the same registration area. As a result, every movement of the UE from one TA to another TA necessitates a registration update procedure. This causes high levels of power consumption and signaling overhead.

For example, when a wireless device (e.g., UE) moves into TA1, the UE may send a registration request to the network via TA1. In an example, the registration request may be based on reception of a system information block (SIB) received from a cell of a base station associated (supporting) with the TA1. The SIB may indicate that the base station and/or the cell is associated with the TA1.

The registration request may indicate that the UE requests a requested slices. A requested slices may be a list of slices that the UE wants to use. For example, the requested slices may comprise slice A and slice B. The registration request may be received by an access and mobility management function (e.g., AMF). The AMF may determine that one or more slices (e.g., slice A) of the requested slices is supported by TA1. The AMF may send a registration accept indicating that the slice A is allowed. The registration accept may also indicate a registration area (e.g., registration 1, first registration area) of the UE. The registration area may comprise a TA list. The TA list may include TA1, because the registration request is received via TA1 and/or because TA1 supports one or more slices of the requested slices. Because TA1 does not support slice B, the AMF may not allow the UE for slice B. The TA list may exclude TA2 because TA2 support different set of slices than TA1.

The UE may later move into TA2. Because the UE's registration area (registration area 1) does not include TA2, the UE may be forced to re-register (e.g., initiate/perform a registration update procedure). As shown in FIG. 16, a registration request may be sent to the AMF via TA2, and may indicate that the UE requests slice A and slice B. The AMF may send a registration accept indicating allowance of slice B. The registration accept may indicate a new registration area (registration area 2) of the UE. The new registration area (registration area 2) includes TA2, because the registration request was received via TA2 and because TA2 supports one or more slices of the requested slices (slice B). The tracking area list may exclude TA1 and TA3 because TA1 and TA3 do not support slice B.

The UE may later move into TA3. Because the UE's registration area (registration area 2) does not include TA3, the UE may be forced to re-register (e.g., initiate/perform a registration update procedure). As shown in FIG. 16, yet another registration request may be sent to the AMF via TA3, and may indicate that the UE requests slice A and slice B. The AMF may send a registration accept indicating slice A. The registration accept may indicate that the registration area (registration area 3) of the UE includes TA3, because the registration request was received via TA3 and because TA3 supports one or more slices of the requested slice. The tracking area list may exclude TA2 because TA2 supports different set of slices than TA3.

The example of FIG. 16 illustrates the challenges presented by a highly differentiated network. In existing, undifferentiated networks (e.g., analogous to FIG. 15A), a registration area may encompass several adjacent tracking areas, and a UE can move from TA1 to TA2 to TA3 without leaving the registration area. Increased slice differentiation may have benefits, but as FIG. 16 demonstrates, there are new issues which arise.

Figure 17:
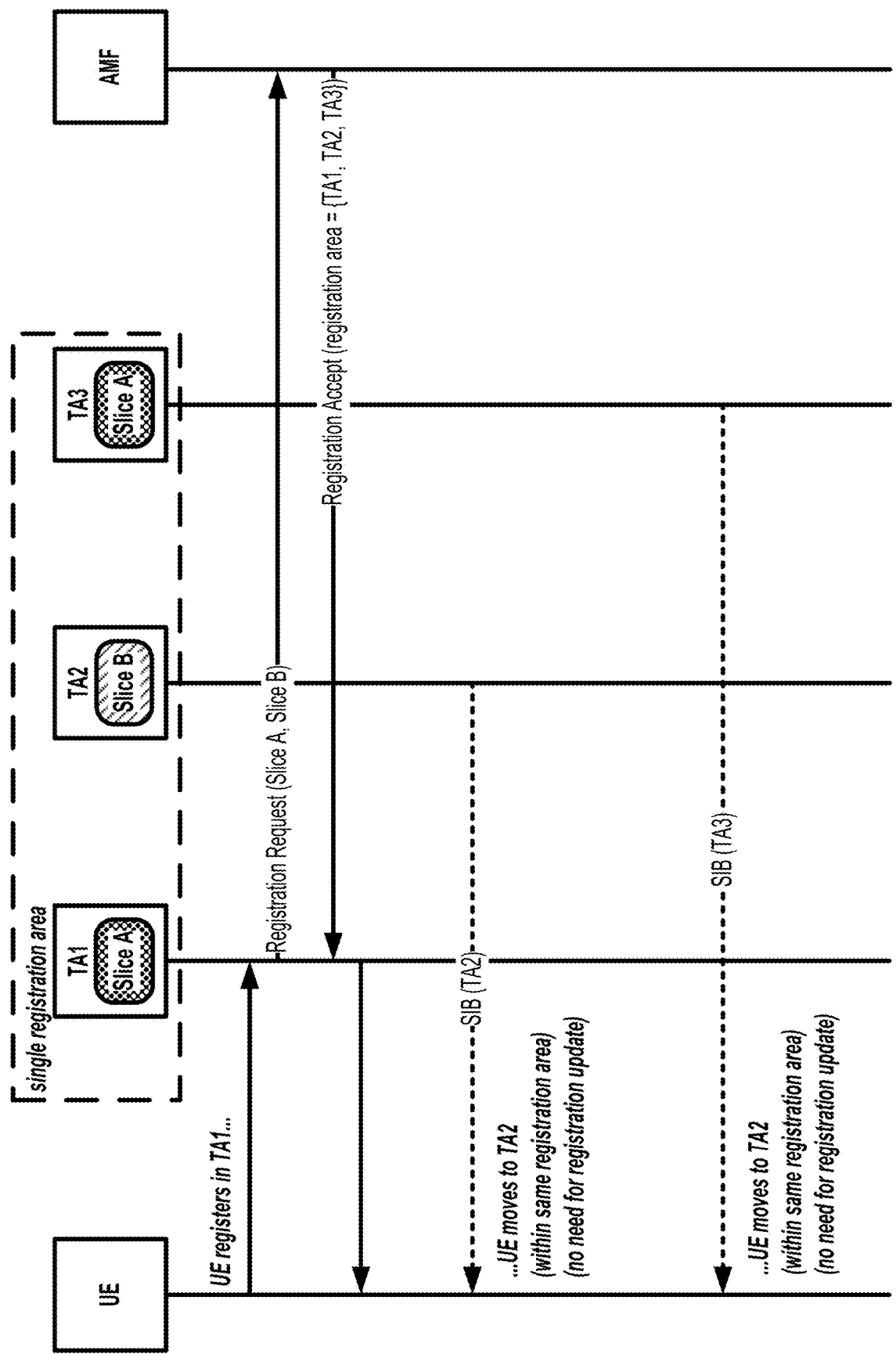
FIG. 17 is a diagram of an aspect of an example embodiment of the present disclosure.

FIG. 17 illustrates one possible method of addressing the problem of over-frequent registration updates. In particular, registration areas may be determined without necessarily considering slice support. For example, TA1, TA2, TA3 may be added to a single registration area, even though support of network slices by TA1, TA2, TA3 are not uniform. This approach reduces the number of registration updates because a UE which leaves TA1 and enters TA2 has not changed its registration area. However, this approach can cause problems with service interruption, as will be discussed in greater detail below.

Figure 18:
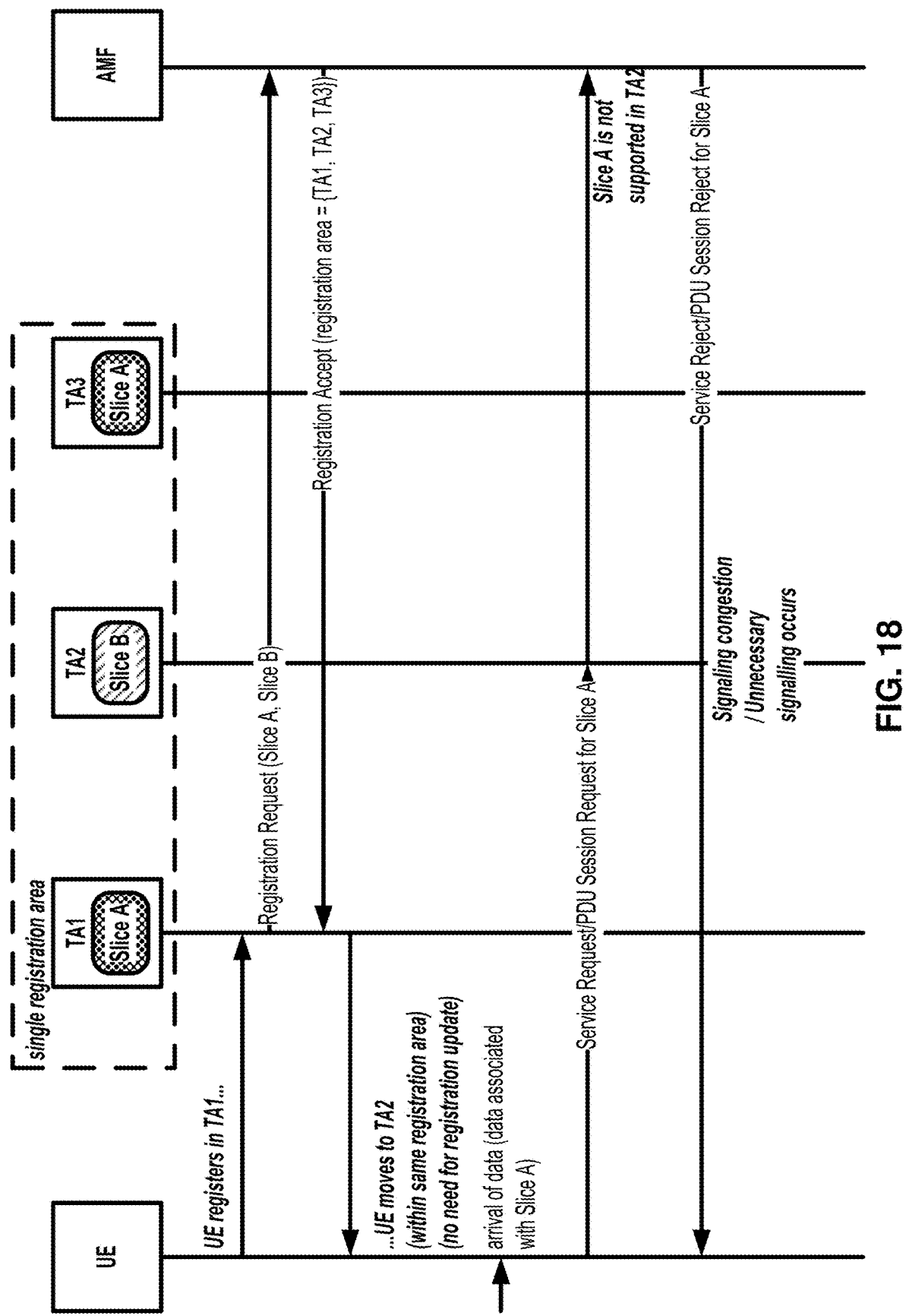
FIG. 18 is a diagram of an aspect of an example embodiment of the present disclosure.

In the example of FIG. 18, a wireless device (e.g., UE) registers in TA1. The UE sends a registration request message, requesting support for slice A and slice B. The access and mobility management function (e.g., AMF) accepts the registration request and sends a registration accept message. The registration accept message may indicate that allowed network slices for the UE comprises slice A and slice B, and that registration area for the UE comprises TA1, TA2 and TA3. The allowed network slices and/or the registration area may be determined, based on support for slice A and/or slice B within TA1, TA2 and TA3. The AMF indicates that the registration area corresponds to a tracking area list which includes TA1, TA2, and TA3.

In an example, the UE may later move to TA2. Because TA2 is in the UE's registration area (i.e., in the UE's TA list), there is no need for the UE to perform a registration update procedure. This helps to alleviate the problem of over-frequent registration update, but creates a new problem relating to service interruption.

In an example, an application associated with the slice A may generate one or more data packets. To deliver the one or more data packet, the UE in TA 2 may send a request message (e.g., service request message and/or a PDU session establishment request message) for the slice A. For example, based on that the slice A is allowed and based on that the UE is in a TA of the RA, the UE in TA2 may send the request message.

The AMF may receive the request message. However, based on that the request message is for slice A and/or based on that the request message is received from a cell of TA2 that does not support the slice A, the AMF may reject the request from the UE. For example, the AMF may send a response message (e.g., service reject, PDU session establishment reject) to the UE. Accordingly, the application cannot send or receive data and/or the request message from the UE causes signaling congestion, because slice A is not supported in TA2. As shown in the FIG. 16 and/or FIG. 18, differentiated support for network slices may cause frequent signaling procedure with impact on UE battery and may cause unnecessary signaling where a network slice for the data communication service cannot be provided.

Figure 19:
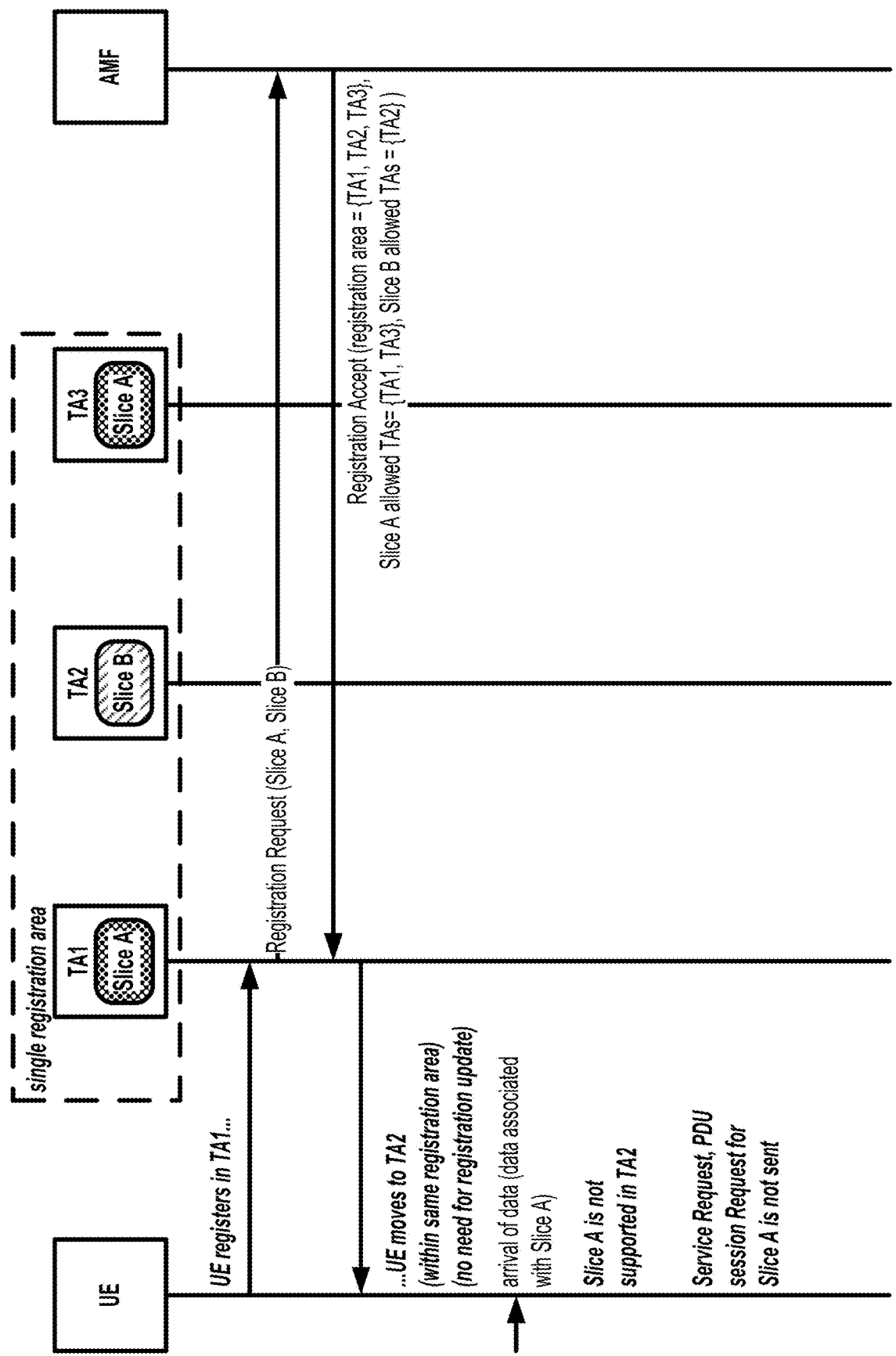
FIG. 19 is a diagram of an aspect of an example embodiment of the present disclosure.

FIG. 19 may depict one example embodiment. By receiving information of TAs where a network slice is allowed and/or rejected (e.g., not allowed) to a UE, the UE may be able to use a network slice at places where the network slice is available, while reducing signaling overhead.

In an example, a UE may send a registration request message while staying in TA1. The registration request message may comprise at least one of:

an identifier of the UE. This may identify the UE sending the registration request message and/or the like. For example, this may be a SUPI, Subscription Concealed Identifier (SUCI), 5G Globally Unique Temporary Identifier (5G-GUTI), TMSI, IMSI, IMEI, and/or the like a requested slices. This may indicate one or more network slices that the UE requests for registration. This may comprise one or more identifiers of the one or more network slices. For example, this may be one or more S-NSSAIs, one or more NSSAI and/or the like. This may indicate a list of the one or more requested network slices.

In an example, the UE may send the registration request message via a cell of the TA1. For example, the UE may send a RRC message comprising the registration request message to a NG-RAN serving the cell. The NG-RAN may receive the RRC message from the UE via the cell. The NG-RAN may send to an AMF, a N2 request message comprising the registration request message.

In an example, the AMF may receive the registration request message of the N2 request message. Based on the registration request message, the AMF may send a registration response message to the UE. For example, the registration response message may be at least one of a registration accept message, UE configuration update message, a registration reject message, a NAS message, and/or the like. The registration response may comprise at least one of:

A registration area (RA). This may indicate an area where the UE is registered. For example, this may comprise one or more identifiers of TAs. For example, this may be a list of TAs where the UE is registered. In any TAs of the RA, the UE may be allowed to use one or more network slices indicated by an allowed slices.

An allowed slices. This may be a list of one or more allowed network slices. This may comprise one or more identifiers of the one or more allowed network slices. This may indicate one or more network slices for which the UE is allowed to use in any TAs of the RA. For example, this may be a list of the one or more allowed network slices. For example, this may indicate one or more identifiers of the one or more allowed network slices for which the UE is allowed. For example, the UE may be allowed to use the one or more allowed network slices, in any/all TAs of the RA. For example, if a RA for the UE includes a TA A, TA B, and TA C and/or if slice Z is one of the one or more allowed network slices, the UE may be allowed to use slice Z in TA A, TA B, and TA C.

Partly slices. This may be partial slices, partially supported slices, partially rejected slices and/or the like. This may be a list of one or more network slices. This may be one or more identifier of one or more network slices that are supported in some part of the RA, that are not supported in entire TAs of the RA. This may comprise at least one of partly rejected slices and/or partly allowed slices.

Partly TA list. This may be partial TA list, partly allowed TA list, partly rejected TA list, and/or the like.

Partly rejected slices. This may be one or more partly rejected S-NSSAI, one or more partly rejected NSSAI, and/or the like. For example, this may indicate one or more network slices that are rejected (not allowed to use) in one or more TAs (e.g., second-type TAs) of the RA and/or that are allowed in other one or more TAs (e.g., first-type TAs) of the RA. For example, the partly rejected slices may not be allowed in the TA where the UE sends the registration request message. For example, this may indicate one or more network slices that are rejected (not allowed to use) in one or more TAs indicated by (based on) the partly rejected TA list. For example, this may indicate one or more network slices that are allowed to use in one or more TAs indicated by (based on) the partly rejected TA list. The AMF may send the partly rejected slices to the UE, to enable the UE to register/request one or more network slices of the partly rejected slices, when the UE moves to a TA supporting the one or more partly rejected slices.

Partly rejected TA list. This may indicate one or more TAs from the RA. This may be one or more identifiers of the one or more TAs from the RA. This may indicate at least one of one or more TAs where the partly rejected slices are supported and/or one or more TAs where the partly rejected (not allowed) slices are not supported. For example, if the partly rejected TA list indicates the one or more TAs (e.g., TA K1) where the partly rejected slices are supported, other one or more TAs (e.g., TA K2, TA K3) of the RA (e.g., TA K1, TA K2, TA K3) may be the one or more TAs where the partly rejected slice are not supported. For example, if the partly rejected TA list indicates the one or more TAs (TA K2, TA K3) where the partly rejected slices are rejected (e.g., not supported, not allowed), other one or more TAs (e.g., TA K1) of the RA (e.g., TA K1, TA K2, TA K3) may be the one or more TAs where the partly rejected slice are supported (allowed). For example, the one or more TAs of the partly rejected TA list may belong to the RA. In one example, the partly rejected TA list may indicate one or more first TAs for a first network slice and/or one or more second TAs for a second network slice. In one example, the partly rejected TA list may indicate one or more third TAs for both a third network slice and a fourth network slice. For example, the RA may comprise TA111, TA112 and TA 113. If the partly rejected TA list for slice K indicates that the TA112 supports the partly rejected slices (e.g., slice K), the slice K may not be supported (allowed) in TA 111, TA113. If the partly rejected TA list for slice K indicates that TA113 and TA111 do not support the partly rejected slices (e.g., slice K), the slice K may be supported in TA 112.

A partly allowed slices. This may be one or more partly accepted S-NSSAIs, a partly accepted NSSAI, and/or the like. This may be a list of one or more partly allowed (accepted) network slices. For example, this may indicate one or more network slices that are allowed in one or more first-type TAs of the RA, and/or that are not allowed in one or more second-type TAs of the RA.

A partly allowed TA list. This may indicate one or more TAs, may be one or more identifiers of the one or more TAs. This may indicate at least one of one or more TAs (e.g., first-type TAs) where the partly allowed slices are supported and/or one or more TAs (e.g., second-type TAs) where the partly allowed slices are not supported. For example, if the partly allowed TA list indicates the one or more TAs where the partly allowed slices are supported, other (or remaining) one or more TAs (e.g., second-type TAs) of the RA may be the one or more TAs where the partly allowed slices are not supported. For example, if the partly allowed TA list indicates the one or more TAs (e.g., second-type TAs) where the partly allowed slices are rejected (e.g., not supported, not allowed), other (or remaining) one or more TAs (e.g., first-type TAs) of the RA may be the one or more TAs where the partly allowed slice are supported (allowed). For example, the one or more TAs of the partly allowed TA list may belong to the RA. In one example, the partly allowed TA list may indicate one or more fifth TAs for a fifth network slice and/or one or more sixth TAs for a sixth network slice. In one example, the partly allowed TA list may indicate one or more seventh TAs for both a seventh network slice and an eighth network slice.

For example, the registration response message may indicate that the RA comprises TA1, TA2 and TA3, that partly slices (e.g., partly allowed slices) comprises the slice A and/or slice B, that the partly TA list (e.g., partly allowed TA list) for the slice B comprises TA2 (e.g., TA2 supports the slice B), and/or that the partly TA list (e.g., partly allowed TA list) for the slice A comprises TA1/TA3 (e.g., TA1/TA3 supports the slice A). For example, based on that the UE sends the registration request message from TA1, that the TA1 supports slice A, that the TA2 supports slice B, and/or that the TA 3 supports the slice A, the AMF may comprise the registration response as such.

In an example, the UE may receive the registration response message. Based on the registration response message, the UE in TA1 may establish a PDU session for the slice A. Based on the registration response message, the UE in TA1 may not establish a PDU session for the slice B. For example, based on that the partly slices comprises the slice B, based on that the UE is in one or more TAs (e.g., TA1) where the slice B is not supported, the UE in TA1 may not establish the PDU session for the slice B.

In an example, the UE may move from TA1 (supporting slice A) to TA2 (supporting slice B and not supporting slice B). Based on the partly slices and/or the partly TA list, the UE may determine that one or more slices (e.g., slice A) of the partly allowed slices is not supported in TA2. Based on that slice A is not supported in TA2, the UE A may not request services for the PDU session established for the slice A. This may reduce unnecessary signaling from the UE.

As shown in the example of FIG. 19, by using the partly slices and/or the partly TA list, the UE can determine whether/where a network slice is supported in a TA/RA, reducing unnecessary signaling.

Figure 20:
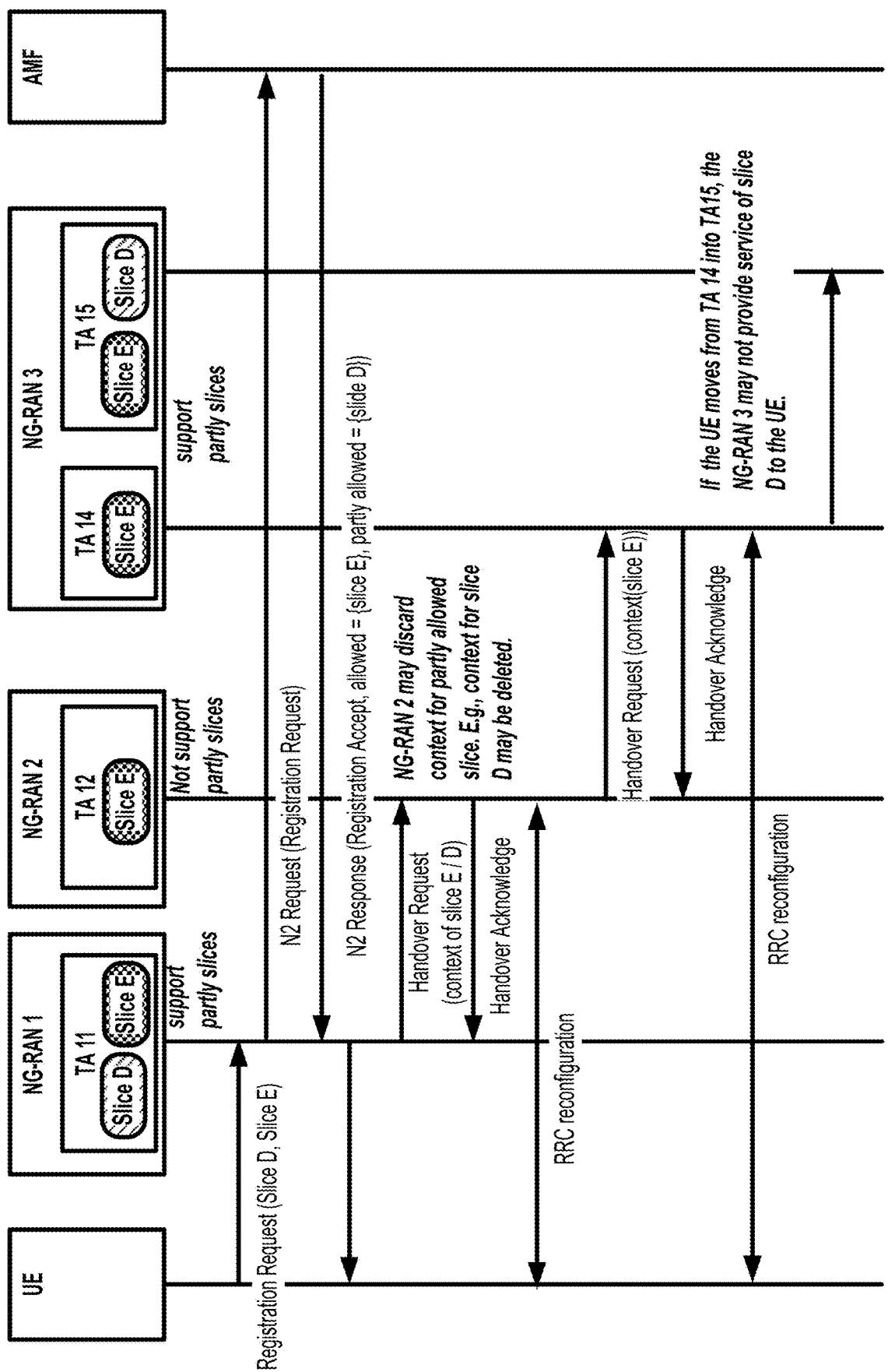
FIG. 20 is a diagram of an aspect of an example embodiment of the present disclosure.

FIG. 20 may show one example scenario. For example, different NG-RANs may support different TAs. For example, NG-RAN 1 may cover an area of TA11, and/or comprise one or more cells for TA11. For example, NG-RAN 2 may cover an area of TA12, and/or comprise one or more cells for TA12. For example, NG-RAN 3 may cover an area of TA14/TA15, and/or comprise one or more cells for TA14/TA15. For example, TA 11/12/14/15 may support slice E, and TA 11/15 may support slice D.

In an example, the NG-RAN 1 and/or the NG-RAN 3 may support a feature of partly slices, and/or the NG-RAN 2 may not support a feature of partly slices. For example, supporting the feature of partly slices may be that the NG-RAN can process/interpret information associated with a partly network slices. For example, not supporting the feature of partly slices may be that the NG-RAN cannot process/interpret the information associated with partly network slices, and/or cannot act based on the information associated with partly network slices.

In an example, the UE in TA 11 may send a registration request message requesting slice D and slice E, to the AMF via NG-RAN 1. Based on the registration request message, the AMF may send a registration accept message to the UE. For example, the registration accept message may comprise a RA, an allowed slices, a partly allowed (accepted) slices and/or a partly allowed (accepted) TA list. For example, the partly allowed slices may comprise slice D, and/or the allowed slices may comprise slice E.

In an example, the UE may receive the registration accept message. Based on that the TA 11 supports the slice D and/or the slice E, and/or that the slice D and slice E is allowed for the UE, the UE in TA 11 may establish a PDU session D for the slice D and a PDU session E for slice E. For example, the UE may send/receive a data over the PDU sessions.

In an example, the NG-RAN 1 may determine to handover the UE to a second cell of TA12. For example, based on that a first cell of TA11 to which the UE is connected gets weak (e.g., less than 10 dBm), and/or based on that the second cell of TA12 gets stronger (e.g., over 10 dBm), the NG-RAN 1 may determine to handover the UE. Based on the determination, the NG-RAN 1 may send a handover request message to the NG-RAN2. For example, the handover request message may comprise at least one of:

Target Cell Global ID. This may indicate an identifier of a target cell, to which the UE is handed over. For example, this may indicate the second cell.

Cause. This may indicate a reason of handover.

RRC context. This may indicate one or more configuration and parameters for the UE.

PDU session resources to be setup list. This may indicate information of one or more PDU sessions which are activated for the UE.

Mobility restriction list container. This may comprise one or more area information whether the UE is not allowed to use services.

For example, the handover request message sent from NG-RAN 1 to NG-RAN 2 may comprise information of the PDU session D and/or information of the PDU session E.

In an example, the NG-RAN 2 may receive the handover request message. For example, based on that the NG-RAN 2 does not support the slice D associated with the PDU session D, the NG-RAN 2 may discard the information of the PDU session D and/or may reject allocation of resources for the PDU session D. For example, based on that the NG-RAN 2 supports the slice E associated with the PDU session E, the NG-RAN 2 may keep/store the information of the PDU session E, and/or may allocate resources for the PDU session E. In response to the handover request message, the NG-RAN 2 may send a handover (request) acknowledgement message to the NG-RAN1. The handover acknowledgement message may comprise at least one of:

PDU session resources admitted list. This may indicate one or more PDU sessions which the NG-RAN2 accepts for the UE. The one or more PDU sessions may be handed-over to the NG-RAN2.

PDU session resources not admitted list. This may indicate one or more PDU sessions which the NG-RAN2 rejects for the UE. The one or more PDU sessions may not be handed-over to the NG-RAN2.

Target NG-RAN node to Source NG-RAN node transparent container. This may comprise a RRC message (e.g., RRC reconfiguration message) that the NG-RAN2 sends to the UE via the NG-RAN1.

For example, based on that slice D is not supported in TA 12, the NG-RAN 2 may determine that PDU session resources not admitted list comprises PDU session D. For example, based on that slice E is supported in TA 12, the NG-RAN 2 may determine that PDU session resources admitted list comprises PDU session E. For example, the handover acknowledge message may indicate that PDU session resources not admitted list comprises PDU session D, and/or that PDU session resources admitted list comprises PDU session E.

In an example, the NG-RAN 1 may receive the handover acknowledge message. The NG-RAN 1 may send the RRC message to the UE.

In an example, the UE may receive the RRC message from the NG-RAN1. Based on the RRC message, the UE may perform handover procedure and select the second cell of the NG-RAN2. After selecting the second cell of TA 12 of the NG-RAN2, the UE may send a RRC response message (e.g., RRC reconfiguration complete message).

In an example, the NG-RAN2 may receive the RRC response message from the UE. Based on receiving the RRC response message, the NG-RAN2 may determine that the UE is in the second cell, that the UE successfully completed handover, and/or the like. For example, the NG-RAN 2 may send one or more data packets for the one or more PDU sessions (e.g., PDU session E) that are active/kept in the NG-RAN 2. For example, the NG-RAN 2 may allocate radio resources for the PDU session E. For example, because the NG-RAN 2 does not have information of the PDU session D, the NG-RAN 2 may not allocate radio resources for the PDU session D.

In an example, the NG-RAN 2 may determine to handover the UE to a third cell of TA14. For example, based on that the second cell of TA12 to which the UE is connected gets weak (e.g., less than 5 dBm), and/or based on that the third cell of TA14 gets stronger (e.g., over 6 dBm), the NG-RAN 2 may determine to handover the UE. Based on the determination, the NG-RAN 2 may send a second handover request message to the NG-RAN 3 that manages the third cell. For example, the second handover request message may comprise at least one of:

Target Cell Global ID.

Cause.

PDU session resources to be setup list.

RRC context.

Mobility restriction list container.

For example, the second handover request message sent from NG-RAN 2 to NG-RAN 3 may comprise information of the PDU session E and/or may not comprise the information of the PDU session D. For example, because the NG-RAN 2 does not have context information for the PDU session D, the NG-RAN 2 may not be able to send to the NG-RAN 3, any information associated with the PDU session D.

In an example, the NG-RAN 3 may receive the second handover request message. For example, based on that the NG-RAN 3 supports the slice E associated with the PDU session E, the NG-RAN 3 may keep/store the information of the PDU session E, and/or may allocate resources for the PDU session E. For example, based on that the second handover request message does not comprise information associated with the PDU session D, the NG-RAN 3 may not allocate resources for the PDU session D. In response to the second handover request message, the NG-RAN 3 may send a second handover acknowledgement message to the NG- RAN 2. The second handover acknowledgement message may comprise at least one of:

PDU session resources admitted list. This may indicate one or more PDU sessions which the NG-RAN 3 accepts for the UE. The one or more PDU sessions may be handed-over to the NG-RAN 3.

PDU session resources not admitted list. This may indicate one or more PDU sessions which the NG-RAN 3 rejects for the UE. The one or more PDU sessions may not be handed-over to the NG-RAN 3.

Target NG-RAN node to Source NG-RAN node transparent container. This may comprise a second RRC message (e.g., second RRC reconfiguration message) that the NG-RAN 3 sends to the UE via the NG-RAN 2.

For example, based on that slice E is supported in TA 14, the NG-RAN 3 may determine that PDU session resources admitted list comprises information (e.g., identifier for the PDU session E) associated with the PDU session E. For example, the second handover acknowledge message may indicate that PDU session resources admitted list comprises PDU session E.

In an example, the NG-RAN 2 may receive the second handover acknowledge message. The NG-RAN 2 may send the second RRC message to the UE.

In an example, the UE may receive the second RRC message from the NG-RAN 2 via the TA12. Based on the second RRC message, the UE may perform handover procedure and select the third cell of the NG-RAN 3. After selecting the third cell of the NG-RAN 3, the UE may send a second RRC response message (e.g., RRC reconfiguration complete message).

In an example, the NG-RAN 3 may receive the second RRC response message from the UE. Based on receiving the second RRC response message, the NG-RAN 3 may determine that the UE is in the third cell, that the UE successfully completed handover, and/or the like. For example, the NG-RAN 3 may send one or more data packets for the one or more PDU sessions that are active/kept in the NG-RAN 3. For example, the NG-RAN 3 may allocate radio resources for the PDU session E. For example, because the NG-RAN 3 does not have information of the PDU session D, the NG-RAN 3 may not allocate radio resources for the PDU session D.

In an example, the NG-RAN 3 may determine to handover the UE from the third cell of TA 14 to a fourth cell of the TA15. Because the NG-RAN 3 has the context information for the PDU session E, the NG-RAN 3 may setup resources for the PDU session E in one or more cells of TA15. Because the NG-RAN 3 does not have the context information for the PDU session D, the NG-RAN 3 may not setup resources for the PDU session D in TA15. As depicted in the example of FIG. 20, during mobility (change of a cell, a TA, a NG-RAN) of a UE, context information (e.g., network slices, PDU sessions) of the UE may be discarded. This may cause degradation of service experience to a user and/or may cause inefficient operation, because the UE is not provided with data communication service for a network slice (e.g., Slice D, PDU session D) in areas (e.g., TA 15) where the network slice is supported.

Example embodiments of the present disclosure improve system efficiency by enhancement in operation of a network and/or a UE. In an example, a core network may provide information associated with partly slices to a NG-RAN, one or more NG-RANs may exchange capability information regarding support of feature of partly slices, and/or may select a target cell based on the information associated with the partly slices. This may reduce a service interruption time for UE to access a network slice, may assist a NG-RAN to determine a target cell.

In the specification, support of partly slices may be support of partly rejected slices and/or support of partly allowed slices. For example, support of partly slices may be support of the feature of partly slices. For example, that a node (a UE, a NG-RAN, a network, an AMF, and/or the like) supports a feature of partly slices may be that the node supports a feature of partly rejected slices and/or a feature of partly allowed slices.

In the specification, support of partly (partially) rejected slices may be support of a feature of partly rejected slices. Whether a node supports the feature of partly rejected slices may mean whether the node (e.g., a UE, a NG-RAN, a core network node) can process/send/receive/handle/interpret information related to partly rejected slices, can support functionalities (e.g., processing, sending, receiving, handling, acting) associated with partly rejected slices, and/or can act based on the information related to partly rejected slices. For example, the information related to the partly rejected slices may be one or more identifiers of the one or more partly rejected slices, the partly rejected slice TAs, and/or the like. For example, acting based on the information related to partly rejected slices may be, e.g., sending a registration request message for a partly rejected slice in TAs where the partly rejected slice is supported, not sending a request for the partly rejected slice in TA where the partly rejected slice is not supported, and/or the like. For example, a capability indicator for the feature of the partly rejected slices may indicate whether a node supports the feature of the partly rejected slices. For example, the capability indicator for the partly rejected slices may indicate that the node supports a feature of the partly rejected slices (functionalities) and/or that the node does not support a feature of the partly rejected slices (functionalities). For example, if a node does not send the capability indicator for the partly rejected slices, this may indicate that the node does not support the feature of the partly rejected slices (functionalities). For example, the feature of the partly rejected slices (functionalities) may be e.g., sending/receiving information associated with the partly rejected slices, performing registration based on the information associated with the partly rejected slices, and/or determining a target cell for handover based on whether the cell (or associated TA, NG-RAN) supports the feature of partly rejected slices.

In the specification, support of partly allowed (accepted) slices may be support of a feature of partly allowed slices. Whether a node supports the feature of partly allowed slices may mean whether a node (e.g., a UE, a NG-RAN, a core network node) can process/send/receive/handle/interpret information related to partly allowed slices, can support functionalities (e.g., processing, sending, receiving, handling, acting) associated with partly accepted slices, and/or can act based on the information related to partly accepted slices. The support of partly allowed slices may be a support of a feature of partly allowed slices. The support of partly allowed slices may be a support of a feature of partly allowed slices functionalities. For example, the information related to the partly accepted slices may be the partly allowed slices, the partly allowed slice TAs. For example, acting based on the information related to partly allowed slices may be sending a request message (e.g., a service request, a registration request, a PDU session request message) in a TA of the partly allowed slice TAs where the partly allowed slice is supported, not sending a request message (e.g., a service request, a registration request, a PDU session request message) in TAs where the partly allowed slice is not supported, and/or the like. For example, a capability indicator for the partly allowed slices may indicate whether a node supports a feature of the partly allowed slices. For example, that a node supports the feature of the partly accepted slices may be that the node supports the feature of partly accepted slices functionalities. For example, the capability indicator for the partly allowed slices may indicate that the node supports a feature of the partly allowed slices (functionalities) and/or that the node does not support a feature of the partly allowed slices (functionalities). For example, if a node does not send the capability indicator for the feature of the partly allowed slices, this may indicate that the node does not support the feature of the partly allowed slices (functionalities). For example, the feature of the partly allowed slices (functionalities) may be e.g., sending/receiving information associated with the partly allowed slices, performing actions (e.g., registration, resource allocation, determining, selecting a node, and/or the like) based on the information associated with the partly rejected slices.

In the specification, the term "NG-RAN" may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like. In the specification, a gNB may be interpreted as a base station. In the specification, a gNB-CU may be interpreted as a base station central unit. In the specification, a gNB-DU may be interpreted as a base station distributed unit.

In the specification, the term "core network" node may be interpreted as a core network device, which may comprise at least one of an AMF, a SMF, a NSSF, a UPF, a NRF a UDM, a PCF, a SoR-AF, an AF, an DDNMF, an MB-SMF, an MB-UPF and/or the like. A term of core network may be interpreted as a core network node. In the specification, a term of an access node may be interpreted as a base station, which may comprise a NG-RAN, and/or the like.

In the specification, the term "network node" may be interpreted as a core network node, an access node, a NG-RAN, a UE, and/or the like. A network may comprise one or more network nodes.

Figure 21:
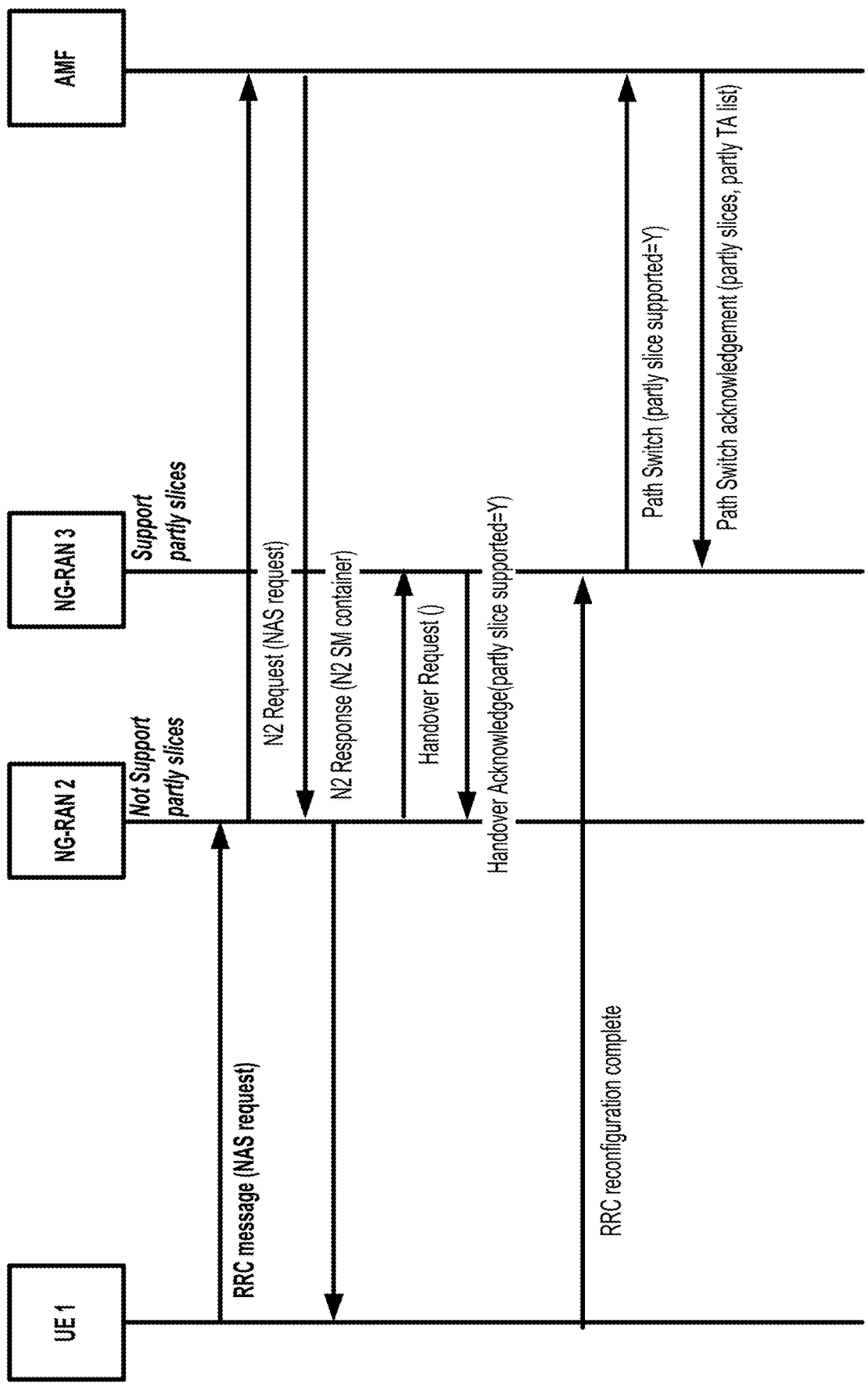
FIG. 21 is a diagram of an aspect of an example embodiment of the present disclosure.

FIG. 21 may depict one example embodiment of the present disclosure. In an example, a UE may be handed over between one or more NG-RANs. Delivering information associated with a partly slices, the UE may be served with one or more network slices of the partly slices. For brevity, redundant details will be omitted.

In an example, the UE may be in a second cell of NG-RAN 2. The NG-RAN 2 may not support the feature of partly slices. For a data exchange for one or more application, the UE may send a RRC request message (e.g., RRC Setup Request, UL Information Transfer, and/or the like) to the NG-RAN 2 via the second cell. For example, the RRC request message may comprise a NAS message. For example, the NAS message may be a PDU session establishment request, a PDU session modification request, a service request and/or the like. The NAS message may indicate that the UE requests activation of one or more PDU sessions, that the UE requests establishment of one or more PDU sessions, and/or the like.

In an example, the NG-RAN 2 may receive the RRC request message from the UE. The NG-RAN 2 may send to an AMF, a N2 request message. For example, the N2 request message may comprise the NAS message received from the UE. Based on that the NG-RAN 2 does not support the feature of partly slices, the N2 request message may not comprise an indication that the NG-RAN 2 supports the feature of partly slices.

In an example, the AMF may receive the N2 request message from the NG-RAN 2. In response to the NAS message of the N2 request message, the AMF may send a N2 response message to the NG-RAN 2. For example, the N2 response message may comprise a N2 SM container. For example, the N2 SM container may comprise information for one or more PDU sessions activated for the UE.

In an example, the NG-RAN 2 may receive the N2 response message. Based on the N2 SM container of the N2 response message, the NG-RAN 2 may establish one or more radio bearers for the UE, to serve the one or more PDU sessions.

In an example, the NG-RAN 2 may determine to hand over the UE to a third cell of the NG-RAN 3. For example, based on that signal quality of the third cell of the NG-RAN 3 is better than the signal quality of the second cell of the NG-RAN 2, the NG-RAN 2 may determine to handover the UE from the second cell to the third cell, and/or handover the UE to the NG-RAN 3. Based on the determination, the NG-RAN 2 may send a handover request message to the NG-RAN 3. For example, the handover request message may comprise at least one of:

Source NG-RAN node UE XnAP ID reference. This may uniquely identify a UE over the Xn interface within the NG-RAN node.

Cause. This may indicate the reason for a particular event. For example, this may indicate that the handover is desired.

Target cell global ID. This may indicate a target cell to which the UE is handed over. For example, this may indicate the third cell.

UE Context Information. This may be information associated with the UE.

UE Context Reference at the S-NG-RAN node. This may indicate a specific context stored in a NG-RAN. For example, this may indicate the UE context that is stored in a source NG-RAN (e.g., the NG-RAN 2).

Capability indicator for partly slices. This may indicate whether the source NG-RAN (e.g., the NG-RAN 2) supports the feature of partly slices. If the source NG-RAN does not support the feature of partly slices, the source NG-RAN may set this to 'not supported', and/or may not send this indicator. For example, based on that the NG-RAN does not support the feature of the partly slices, the NG-RAN may not include this into the handover request message.

For example, the UE Context Information may comprise at least one of:

NG-C UE associated signalling reference.

PDU Session Resources To Be Setup List. This may comprise one or more PDU session resources to be setup Items. Each of the one or more PDU session resources to be setup Items may comprise at least one of an identifier of a PDU session, S-NSSAI (a network slice associated with the PDU session), information of one or more QoS flows for the PDU session, and/or the like.

RRC context

Mobility restriction list

5GC mobility restriction list container

In an example, the NG-RAN 3 may receive the handover request message from the NG-RAN 2. For example, the NG-RAN 3 may support the feature of the partly slices. Based on the handover request message, the NG-RAN 3 may store the UE context information of the handover request message and/or the NG-RAN 3 may allocate resources for the one or more PDU sessions indicated by the handover request message. In response to receiving the handover request message, the NG-RAN 3 may send a handover request acknowledge message. For example, the handover request acknowledge message may comprise at least one of:

- Source NG-RAN node UE XnAP ID. This may identify the UE at the source NG-RAN (e.g., NG-RAN 2).
- Target NG-RAN node UE XnAP ID. This may identify the UE at the target NG-RAN (e.g., NG-RAN 3).
- PDU Session Resources Admitted List. This may be information associated with the one or more PDU sessions that the target NG-RAN (e.g., NG-RAN 3) accepts for handover. For example, for each of the one or more PDU sessions, this may comprise at least one of an identifier of the PDU session, QoS flow information, DRB information and/or the like.
- PDU Session Resources Not Admitted List. This may be information associated with the one or more PDU sessions that the target NG-RAN (e.g., NG-RAN 3) rejects for handover. For example, for each of the one or more PDU sessions, this may comprise at least one of an identifier of the PDU session, cause and/or the like.
- Target NG-RAN node To Source NG-RAN node Transparent Container. This may be a message to be delivered to the UE via the source NG-RAN (e.g., NG-RAN 2). This may comprise at least one of Handover Command and/or RRC reconfiguration message. This may comprise information of at least a target cell, and/or one or more radio bearer information.
- Capability indicator for partly slices. This may indicate whether the target NG-RAN (e.g., the NG-RAN 3) supports the feature of partly slices. If the target NG-RAN supports the feature of partly slices, the target NG-RAN may set this to 'supported'. If the target NG-RAN does not support the feature of partly slices, the target NG-RAN may set this to 'not supported', and/or may not send this indicator. For example, based on that the NG-RAN 3 supports the feature of the partly slices, the NG-RAN 3 may set this to 'supported'.

In an example, the NG-RAN 2 may receive the handover request acknowledge message. The NG-RAN 2 may send the RRC message (e.g., in Target NG-RAN node To Source NG-RAN node Transparent Container) of the handover request acknowledge message, to the UE.

In an example, the UE may receive the RRC message and/or may perform handover procedure. For example, the UE may select and/or connects to the third cell indicated by the RRC message. In response to selecting/connecting to the third cell, the UE may send a RRC response message, to the NG-RAN 3 via the third cell. For example, the RRC response message may be a RRC reconfiguration complete message.

In an example, the NG-RAN 3 may receive the RRC response message sent by the UE via the third cell. Based on that the NG-RAN 3 receives the RRC response message from the UE, the NG-RAN 3 may determine that the UE is in the third cell and/or the NG-RAN 3 may send a path switch request message to the AMF. For example, the path switch request message may indicate to the AMF that a serving NG-RAN for the UE has changed, that the serving NG-RAN for the UE is NG-RAN 3, that some NG-U DL tunnel termination points need to be transferred, that the UE changes a location, that a handover is performed for the UE, and/or the like. For example, the path switch request message may comprise at least one of:

- RAN UE NGAP ID. This may identify the UE association over the NG interface (e.g., between an access network and a core network) within the NG-RAN.
- AMF UE NGAP ID. This may uniquely identify the UE association over the NG interface.
- User Location Information. This may indicate current location of the UE.
- UE security capabilities. This may indicate capability of the UE for security handling.
- PDU session resources to be switched in downlink list. This may indicate one or more PDU sessions to be switched from a source NG-RAN to a target NG-RAN. This may comprise at least one or more identifiers of one or more PDU sessions.
- Capability indicator for partly slices. This may indicate whether the NG-RAN (e.g., the target NG-RAN, the NG-RAN 3) supports the feature of partly slices. If the NG-RAN supports the feature of partly slices, the NG-RAN may set this to 'supported'. If the NG-RAN does not support the feature of partly slices, the NG-RAN may set this to 'not supported', and/or may not send this indicator. For example, based on that the NG-RAN 3 supports the feature of the partly slices, the NG-RAN 3 may set this to 'supported'.
- PDU session resource failed to setup list. This may indicate one or more PDU sessions which are not transferred from the source NG-RAN to the target NG-RAN. This may comprise at least one or more identifiers of one or more PDU sessions and/or the capability indicator for partly slices.

In an example, the AMF may receive the path switch request. In response to the path switch request, the AMF may send to the NG-RAN 3, the path switch request acknowledge message. The path switch request acknowledge message may comprise at least one of:

- AMF UE NGAP ID
- RAN UE NGAP ID
- Security context. This may indicate one or more parameters for security between the UE and the network.
- PDU session resource switched list. This may indicate one or more PDU sessions which are switched from a source NG-RAN to a target NG-RAN (e.g., NG-RAN3).
- PDU session resource released list. This may indicate one or more PDU sessions released.
- Allowed slices. This may be an allowed NSSAI.
- Core Network Assistance Information for RRC INACTIVE. This may be one or more parameters that assist the NG-RAN for configuration of UE for RRC inactive state.
- CN Assisted RAN Parameters Tuning. This may be one or more parameters to assist a NG-RAN.
- Information associated with the partly slices. This may comprise at least the partly slices (e.g., partly allowed slices, and/or partly rejected slices) and/or the partly TA list.

For example, based on the capability indicator for partly slices of the path switch request message, the AMF may include the information associated with the partly slices into the path switch request acknowledge message. For example, if the capability indicator for partly slices of the path switch request message is set to 'supported', the AMF may include the information associated with the partly slices into the path switch request acknowledge message. For example, if the capability indicator for partly slices of the path switch request message is set to 'not supported' and/or if the path switch request message does not comprise the capability indicator for partly slices of, the AMF may not include the information associated with the partly slices into the path switch request acknowledge message.

In an example, the NG-RAN 3 may receive the path switch request acknowledge message. Based on the path switch request acknowledge message, the NG-RAN may store information associated with the UE, may update configuration for the UE. For example, if the path switch request acknowledge message comprises information associated with the partly slices, the NG-RAN 3 may determine one or more targets cells (or, base stations, NG-RANs, TAs, and/or networks) that may support one or more network slices from the one or more network slices indicated by the partly slices (e.g., partly allowed slices). For example, the NG-RAN 3 may request the UE to measure the one or more cells. For example, the NG-RAN 3 may request one or more NG-RANs supporting the one or more network slices (of partly allowed slices), to allocate resources for the UE. For example, the NG-RAN 3 may configure (e.g., via RRC messages) the UE with the one or more cells supporting the one or more network slices indicated by the partly slices (e.g., partly allowed slices). Accordingly, the time that the UE is served with the network slices (that the UE needs to use) can be increased, reducing service interruption.

Figure 22:
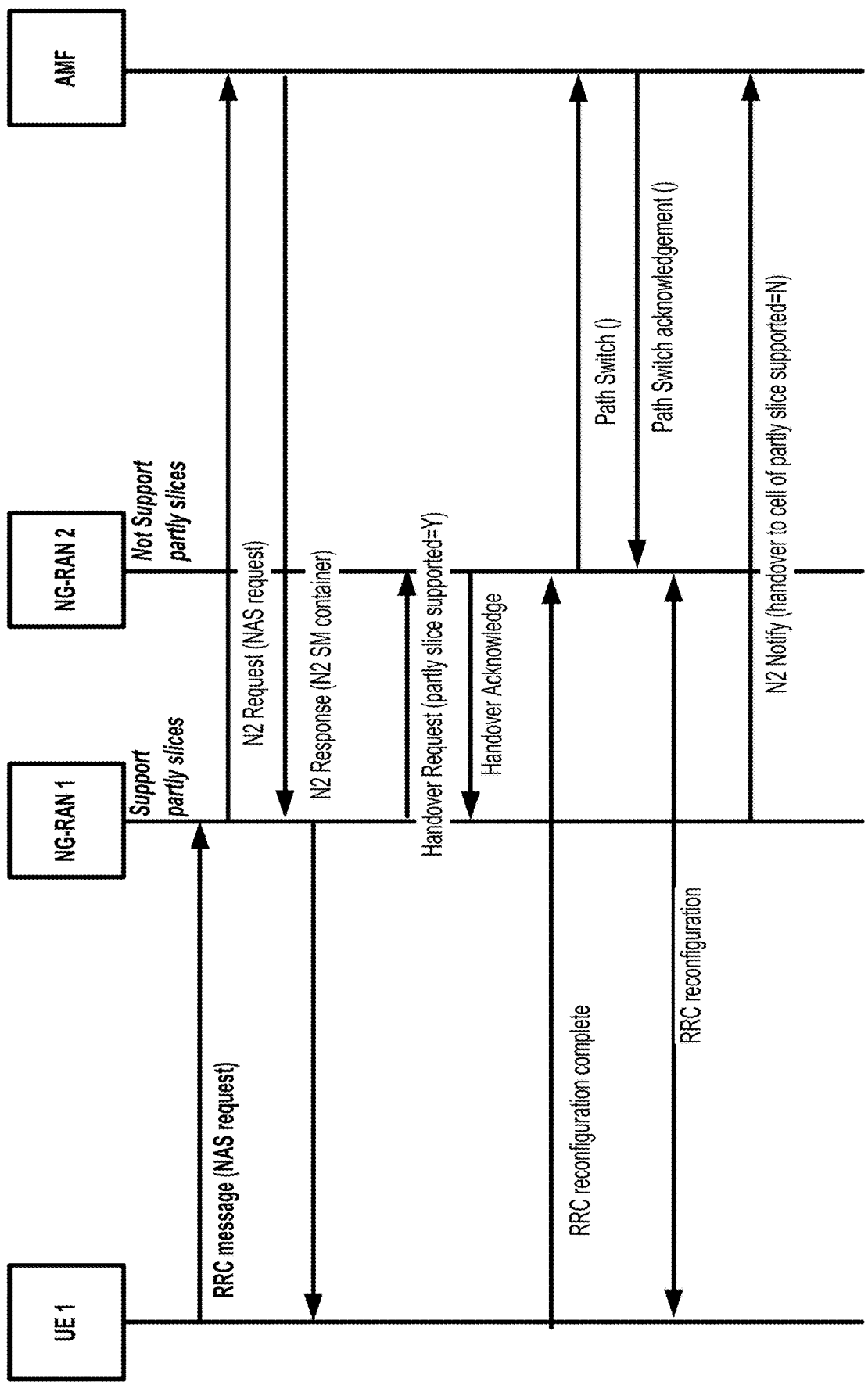
FIG. 22 is a diagram of an aspect of an example embodiment of the present disclosure.

FIG. 22 may depict one example embodiment of the present disclosure. In an example, a UE may be handed over between one or more NG-RANs. Based on information exchange between NG-RANs, a source NG-RAN may determine whether the target NG-RAN can provide one or more network slices. For brevity, redundant details will be omitted.

In an example, the UE may be in a first cell of NG-RAN 1. The NG-RAN 1 may support the feature of partly slices. For a data exchange for one or more application, the UE may send a RRC request message (e.g., RRC Setup Request, UL Information Transfer, and/or the like) to the NG-RAN 1 via the first cell. For example, the RRC request message may comprise a NAS message. For example, the NAS message may be a PDU session establishment request, a PDU session modification request, a service request and/or the like. The NAS message may indicate that the UE requests activation of one or more PDU sessions, that the UE requests establishment of one or more PDU sessions, and/or the like.

In an example, the NG-RAN 1 may receive the RRC request message from the UE. The NG-RAN 1 may send to an AMF, a N2 request message. For example, the N2 request message may comprise the NAS message received from the UE. Based on that the NG-RAN 1 supports the feature of partly slices, the N2 request message may comprise an indication that the NG-RAN 1 supports the feature of partly slices.

In an example, the AMF may receive the N2 request message from the NG-RAN 1. In response to the NAS message of the N2 request message, the AMF may send a N2 response message to the NG-RAN 1. For example, the N2 response message may comprise a N2 SM container. For example, the N2 SM container may comprise information for one or more PDU sessions activated for the UE.

In an example, the NG-RAN 1 may receive the N2 response message. Based on the N2 SM container of the N2 response message, the NG-RAN 1 may establish one or more radio bearers for the UE.

In an example, the NG-RAN 1 may determine to hand over the UE to a second cell of the NG-RAN2. Based on the determination, the NG-RAN 1 may send a handover request message to the NG-RAN 2. For example, the handover request message may comprise at least one of:
   Source NG-RAN node UE XnAP ID reference.
   Cause. This may indicate the reason for a particular event.
   Target cell global ID. This may indicate a target cell to which the UE is handed over. For example, this may indicate the second cell.
   UE Context Information.
   UE Context Reference at the S-NG-RAN node. This may indicate a specific context stored in a NG-RAN. For example, this may indicate the UE context that is stored in a source NG-RAN (e.g., the NG-RAN 1).
   Capability indicator for partly slices. This may indicate whether the source NG-RAN (e.g., the NG-RAN 1) supports the feature of partly slices. For example, based on that the NG-RAN 1 supports the feature of the partly slices, the NG-RAN 1 may set this to 'supported'.

In an example, the NG-RAN 2 may receive the handover request message from the NG-RAN 1. For example, the NG-RAN 2 may not support the feature of the partly slices. Because the NG-RAN 2 does not support the feature of the partly slices, the NG-RAN 2 may reject handover of one or more PDU sessions that are not supported by the second cell and/or by the NG-RAN 2.

Based on the handover request message, the NG-RAN 2 may store the UE context information of the handover request message and/or the NG-RAN 2 may allocate resources for the one or more PDU sessions indicated by the handover request message. In response to receiving the handover request message, the NG-RAN 2 may send a handover request acknowledge message, to the NG-RAN 1. For example, the handover request acknowledge message may comprise at least one of:
   Source NG-RAN node UE XnAP ID.
   Target NG-RAN node UE XnAP ID.
   PDU Session Resources Admitted List.
   PDU Session Resources Not Admitted List. Because the NG-RAN 2 does not support the feature of the partly slices, one or more PDU sessions that are associated with the partly network slices which is not supported in the second cell may be included in the PDU session resources not admitted list.
   Target NG-RAN node To Source NG-RAN node Transparent Container.
   Capability indicator for partly slices. This may indicate whether the target NG-RAN (e.g., the NG-RAN 2) supports the feature of partly slices. If the target NG-RAN does not support the feature of partly slices, the target NG-RAN may set this to 'not supported', and/or may not send this indicator. For example, based on that the NG-RAN 2 does not support the feature of the partly slices, the NG-RAN 2 may not include this field into the handover request acknowledge message.

In an example, the NG-RAN 1 may receive the handover request acknowledge message. The NG-RAN 1 may send the RRC message (e.g., in Target NG-RAN node To Source NG-RAN node Transparent Container) of the handover request acknowledge message, to the UE.

In an example, the UE may receive the RRC message and/or may perform handover procedure. For example, the UE may select and/or connects to the second cell indicated by the RRC message. In response to selecting/connecting to the second cell, the UE may send a RRC response message, to the NG-RAN 2 via the second cell. For example, the RRC response message may be a RRC reconfiguration complete message.

In an example, the NG-RAN 2 may receive the RRC response message sent by the UE via the third cell. Based on that the NG-RAN 2 receives the RRC response message from the UE, the NG-RAN 2 may determine that the UE is in the second cell and/or the NG-RAN 2 may send a path switch request message to the AMF. For example, the path switch request message may comprise at least one of:

RAN UE NGAP ID.
AMF UE NGAP ID.
User Location Information.
UE security capabilities.
PDU session resources to be switched in downlink list.
Capability indicator for partly slices. If the NG-RAN 2 does not support the feature of partly slices, the NG-RAN may set this to 'not supported', and/or may not send this indicator.
PDU session resource failed to setup list.

In an example, the AMF may receive the path switch request. In response to the path switch request, the AMF may send to the NG-RAN 2, the path switch request acknowledge message. The path switch request acknowledge message may comprise at least one of:

AMF UE NGAP ID
RAN UE NGAP ID
Security context.
PDU session resource switched list.
PDU session resource released list.
Allowed slices.
Core Network Assistance Information for RRC INACTIVE.
CN Assisted RAN Parameters Tuning.
Information associated with the partly slices.

For example, based on the capability indicator for partly slices of the path switch request message, the AMF may determine whether to include the information associated with the partly slices into the path switch request acknowledge message. For example, if the capability indicator for partly slices of the path switch request message is set to 'supported', the AMF may include the information associated with the partly slices into the path switch request acknowledge message. For example, if the capability indicator for partly slices of the path switch request message is set to 'not supported' and/or if the path switch request message does not comprise the capability indicator for partly slices of, the AMF may not include the information associated with the partly slices into the path switch request acknowledge message. For example, based on that the NG-RAN 2 does not indicate support for the feature of partly slices, the AMF may determine not to include the information associated with the partly slices into the path switch request acknowledge message.

In an example, the NG-RAN 2 may receive the path switch request acknowledge message. Based on the path switch request acknowledge message, the NG-RAN may store information associated with the UE, may update configuration for the UE.

In an example, based on the handover request acknowledge message indicating that the NG-RAN 2 does not support the feature of partly slices, the NG-RAN 1 may send a N2 notify message to the AMF. For example, the N2 notify message may indicate that the UE is handed over to a cell (or, NG-RAN, a network, TA) which does not support the feature of the partly network slice. Based on the N2 notify message, the AMF may determine to update configuration for the UE. For example, the AMF may update the RA for the UE, the allowed slices for the UE, the rejected slices for the UE, the partly slices, the partly TA list and/or the like.

Based on the update, the AMF may send a UE configuration update message indicating the updated information (e.g., updated RA, updated allowed slices, updated rejected slices, updated partly slices, updated partly TA list, and/or the like).

In an example, based on the path switch request message, the AMF may determine that the NG-RAN 2 does not support the feature of the partly network slices. Based on that the NG-RAN 2 does not support the feature, the AMF may determine to update configuration for the UE. For example, the AMF may update the RA for the UE, the allowed slices for the UE, the rejected slices for the UE, the partly slices, the partly TA list and/or the like. Based on the update, the AMF may send a UE configuration update message indicating the updated information (e.g., updated RA, updated allowed slices, updated rejected slices, updated partly slices, updated partly TA list, and/or the like). Based on the update, the AMF may send to the NG-RAN 2, a N2 message indicating the updated information (e.g., updated RA, updated allowed slices, updated rejected slices, updated partly slices, updated partly TA list, and/or the like). For example, the NG-RAN 2 may deliver the updated information to the UE.

Figure 23:
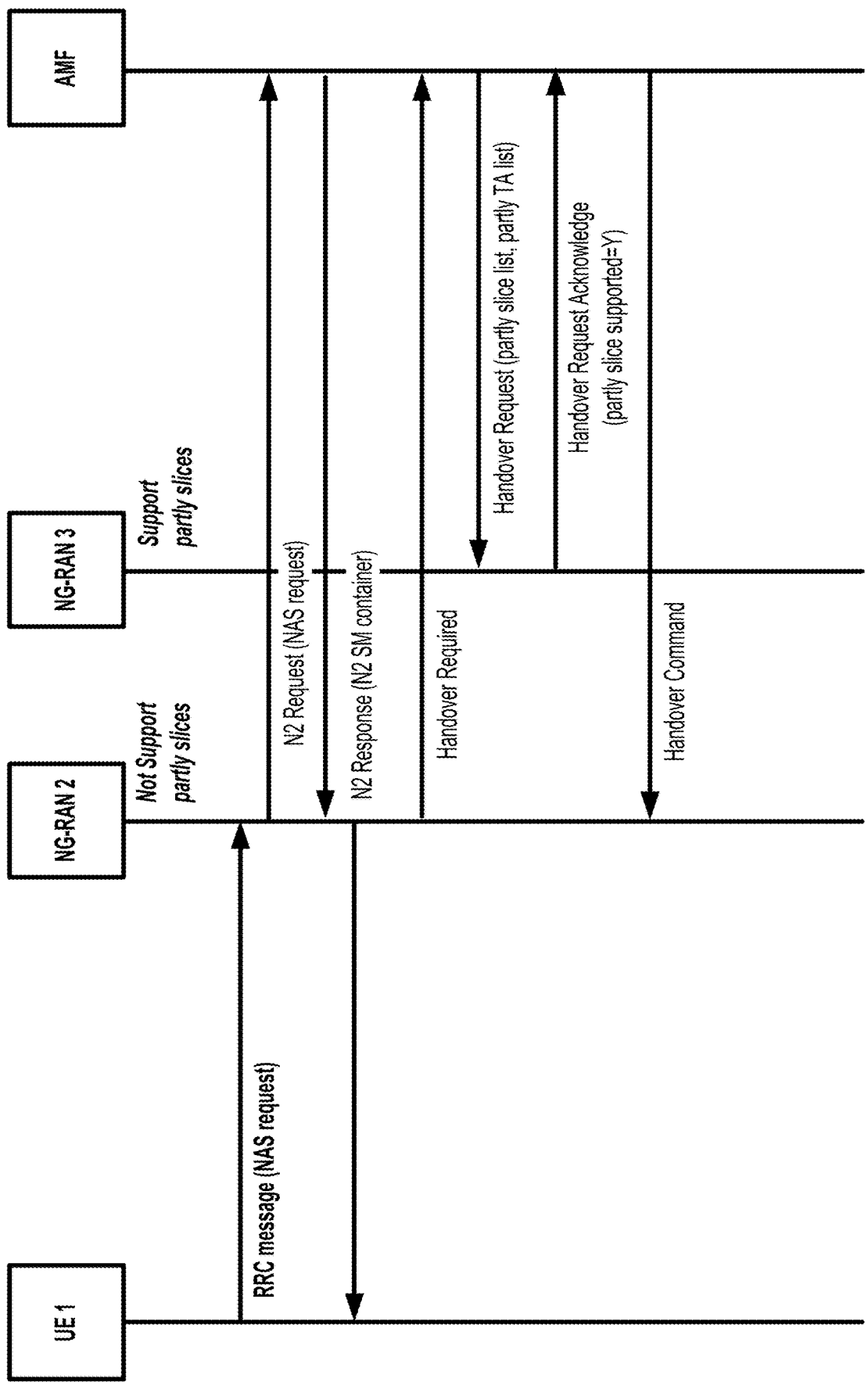
FIG. 23 is a diagram of an aspect of an example embodiment of the present disclosure.

FIG. 23 may depict one example embodiment of the present disclosure. In an example, similar to FIG. 21, a UE may be handed over between one or more NG-RANs. Delivering information associated with a partly slices, the UE may be served with one or more network slices of the partly slices. For brevity, redundant details will be omitted.

In an example, the UE may be in the second cell of NG-RAN 2. The NG-RAN 2 may not support the feature of partly slices. For a data exchange for one or more application, the UE may send the RRC request message to the NG-RAN 2 via the second cell.

In an example, the NG-RAN 2 may receive the RRC request message from the UE. The NG-RAN 2 may send to the AMF, the N2 request message.

In an example, the AMF may receive the N2 request message from the NG-RAN 2. In response to the NAS message of the N2 request message, the AMF may send the N2 response message to the NG-RAN 2.

In an example, the NG-RAN 2 may receive the N2 response message. Based on the N2 SM container of the N2 response message, the NG-RAN 2 may establish one or more radio bearers for the UE.

In an example, the NG-RAN 2 may determine to hand over the UE to the third cell of the NG-RAN3. Based on the determination, the NG-RAN 2 may send a handover required message to the AMF. For example, the handover required message may comprise at least one of:

AMF UE NGAP ID.
RAN UE NGAP ID.
Handover type. This may indicate whether the handover is from 5G to EPS, or EPS to 5GS, and/or the like.
Cause. This may indicate the reason for a particular event. For example, this may indicate that the handover is desired.
Target ID. This may indicate a target cell, NG-RAN, and/or TA of the handover. For example, this may indicate the third cell, the TA of the third cell, the NG-RAN3, and/or the like.
PDU session resource List. This may indicate one or more PDU session for which the handover applies. E.g., this may indicate one or more PDU sessions which the source NG-RAN (e.g., NG-RAN 2) wants to hand over to the target NG-RAN (NG-RAN 3).

Source to target transparent container. This may be Source NG-RAN Node to Target NG-RAN Node Transparent Container.

Capability indicator for partly slices. This may indicate whether the source NG-RAN (e.g., the NG-RAN 2) supports the feature of partly slices. If the source NG-RAN does not support the feature of partly slices, the source NG-RAN may set this to 'not supported', and/or may not send this indicator. For example, based on that the NG-RAN 2 support the feature of the partly slices, the NG-RAN 2 may set this to 'supported'.

In an example, the AMF may receive the handover required message. Based on the handover required message, the AMF may send a handover request message to the NG-RAN 3. For example, based on that target ID of the handover required message indicates the NG-RAN 3, the AMF may send the handover request message to the NG-RAN 3. For example, the handover request message may comprise at least one of:

AMF UE NGAP ID
Handover type
Cause
Core network assistance information
UE security capabilities
PDU session resource setup list. This may indicate one or more information associated with one or more PDU session to be handed over from the source NG-RAN to the target NG-RAN.
Allowed slices
Partly slices
Source to target transparent container
Mobility restriction list In an example, the NG-RAN 3 may receive the handover request message from the AMF. Based on the handover request message, the NG-RAN 3 may store information delivered by the handover request message. In response to the handover request message, the NG-RAN 3 may send a handover request acknowledge message to the AMF. For example, the handover request acknowledge message may comprise:

RAN UE NGAP ID.
AMF UE NGAP ID.
PDU session resource admitted list
PDU session resource failed to setup list. This may indicate one or more PDU sessions which the target NG-RAN (e.g., NG-RAN 3) fails to establish, and/or rejects to hand over.
Target to source transparent container
Capability indicator for partly slices. If the NG-RAN 3 supports the feature of partly slices, the NG-RAN 3 may set this to 'supported'.

In an example, the AMF may receive the handover request acknowledge message from the NG-RAN 3. For example, based on that the handover request acknowledge message comprises the indication that the feature of partly slices is supported, the AMF may determine that the NG-RAN 3 supports the feature of partly slices and/or may continue to use configuration for the allowed slices, the rejected slices, the partly slices, the partly TA lists and/or the like.

In an example, if the AMF receives a handover request acknowledge message and if the handover request acknowledge message does not comprise an indication that the feature of partly slices is supported, the AMF may determine to update configurations for the UE. For example, the AMF may update configuration for the allowed slices, the rejected slices, the partly slices, the partly TA lists and/or the like. For example, the AMF may discard/delete/remove/update one or more network slices from the partly slices and/or the AMF may discard/delete/remove/update one or more TAs from the partly TA lists. For example, the AMF may determine not to use the partly TA lists and/or the partly slices. For example, based on the determination, the AMF may send a message to the UE (or the NG-RAN) to remove/disable the use of the partly slices and/or the partly TA list.

Figure 24:
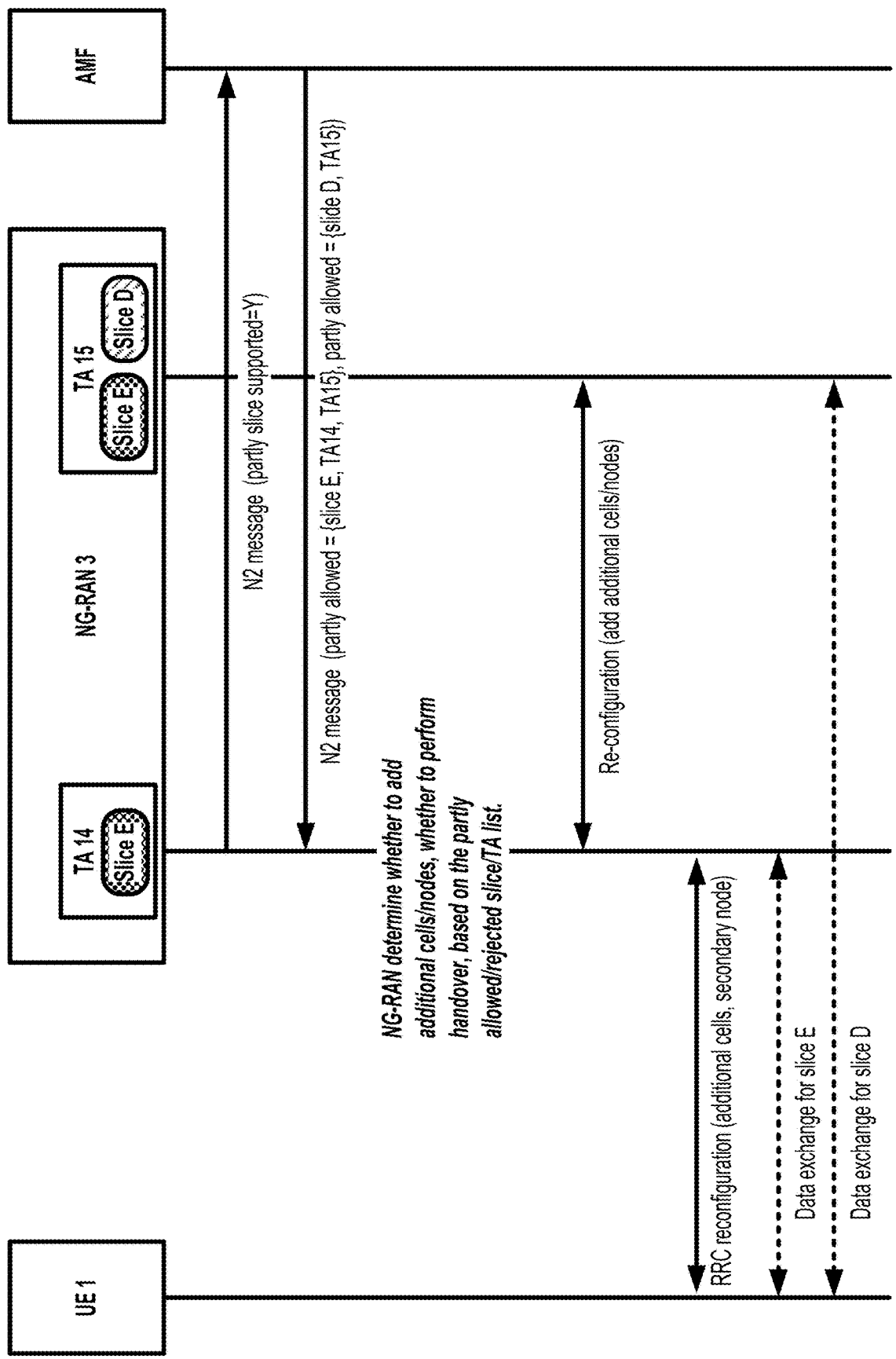
FIG. 24 is a diagram of an aspect of an example embodiment of the present disclosure.

FIG. 24 may depict one example embodiment of the present disclosure. In an example, a NG-RAN (e.g., NG-RAN 3 as in the example of FIG. 21 or FIG. 23) may have information (e.g., partly slices, partly TA list) of UE. Based on the information, the UE may be served with one or more network slices that the UE requests, reducing interruption time. For brevity, redundant details will be omitted.

In an example, for the UE in TA14 (which support slice E, not slice D), the NG-RAN 3 may send a N2 message to the AMF. For example, the N2 message may be the path switch request (as shown in FIG. 21), the handover request acknowledgement message (as shown in the FIG. 23), the N2 request message (as depicted in FIG. 21), and/or the like. The N2 message may comprise the capability indicator indicating whether the NG-RAN 3 supports the feature of the partly slices. For example, the capability indicator may indicate that the NG-RAN 3 supports the feature of the partly slices.

In an example, the AMF may receive the N2 message from the NG-RAN 3. Based on that the capability indicator of the N2 message indicates that the NG-RAN 3 supports the feature of the partly slices, the AMF may send a N2 response message to the NG-RAN3. The N2 response message may comprise at least one of the information of the partly slices and/or the information of partly TA list, the allowed slices, the RA, and/or the like. For example, the information of the partly slices may indicate that the partly allowed slices comprises at least the slice E and/or slice D. For example, the partly TA list for the slice E may comprise the TA 14 (e.g., TA14 supports slice E) and/or the TA 15 (e.g., TA15 supports slice E). For example, the partly TA list for the slice D may comprise the TA 15 (e.g., TA15 supports slice D).

In an example, the NG-RAN 3 may receive the N2 response message. Based on the N2 response message, the NG-RAN 3 may determine whether to handover the UE to other cell (or NG-RAN, TA, and/or the like), whether to add additional resources for the UE or not. For example, based on the partly slices (e.g., slice D) and/or partly TA lists (e.g., TA 15) for the partly slices (e.g., slide D), the NG-RAN may determine to add the resources of the TA 15 for the UE (e.g., in addition to the resource of TA 14), and/or the NG-RAN may determine to handover the UE from the third cell (of the TA 14) to a fourth cell (of the TA15). In other example, if the NG-RAN 3 does not receive information of the partly slices and/or information of the partly TA list, the NG-RAN 3 may not consider the handover and/or addition of the resources.

In an example, based on the determination to add the resources of the TA 15 for the UE, and/or the determination to handover the UE from the third cell to the fourth cell, the NG-RAN 3 may perform a resource reconfiguration procedure. For example, the resource reconfiguration procedure may comprise sending a request message to a NG-RAN 4, sending a request message to a gNB-DU (e.g., of NG-RAN 3), and/or the like. For example, sending a request message to a NG-RAN 4 may comprise sending a handover request message to the NG-RAN 4, and/or sending S-Node Addition (reconfiguration) Request to the NG-RAN 4. For example, sending a request message to the gNB-DU may comprise sending a UE Context Setup (modification) Request message (from gNB-CU of the NG-RAN 3) to the gNB-DU (of the NG-RAN 3), and/or the like.

In an example, based on the sending the request message to the NG-RAN 4, based on the sending a request message to the gNB-DU, and/or the like, the NG-RAN 3 may receive a response message. For example, the response message may indicate successful resources allocation and/or accepting the handover request for the UE.

In an example, the NG-RAN 3 may perform RRC reconfiguration with the UE. For example, the RRC reconfiguration may comprising sending updated configuration to the UE and/or receiving acknowledgment from the UE. For example, the updated configuration may comprise indication of handover, a measurement configuration, and/or addition of resources. For example, the addition of resources may be associated with the partly network slices and/or one or more PDU session associated with the partly network slices (e.g., the partly allowed network slices). For example, the addition of resource may indicate adding one or more serving cells (e.g., cells supporting one or more partly slices, and/or cells providing one or more PDU session for the one or more partly slices) for the UE. For example, the measurement configuration may be associated with measurement of one or more cells associated with the partly slices (e.g., one or more cells supporting the partly slices). For example, the updated configuration may comprise one or more radio resources for the Slice E and/or one or more resources for the slice D.

In an example, based on the updated configuration, the UE and the network may exchange one or more data packets for the one or more PDU session for the partly slices. This may reduce the time when the UE is not served with a network slice in area where the network slice can be provided to the UE.

Figure 25:
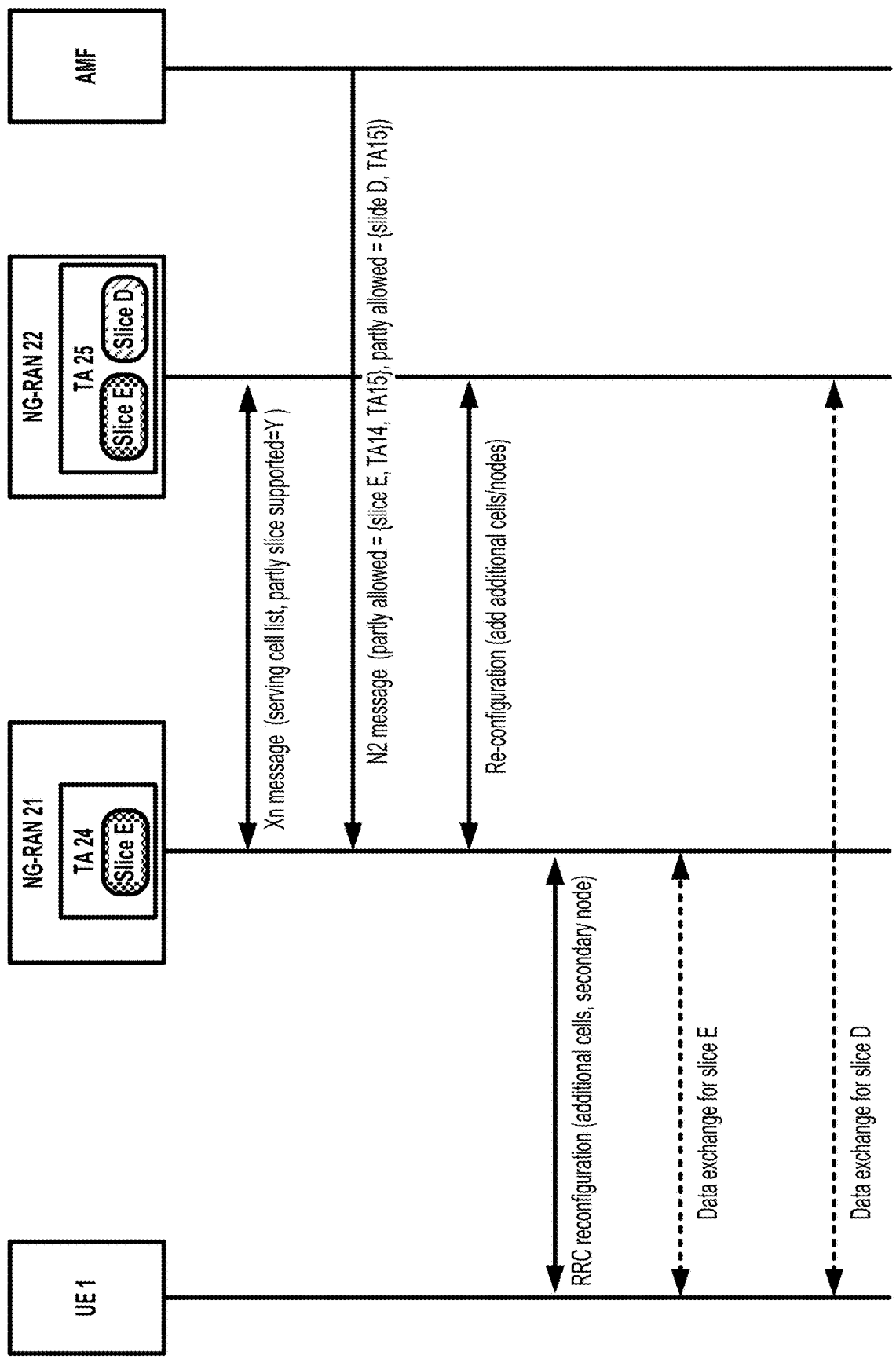
FIG. 25 is a diagram of an aspect of an example embodiment of the present disclosure.

FIG. 25 may depict one example embodiment of the present disclosure. In an example, a NG-RAN (e.g., NG-RAN 21) may exchange information of partly slices with other NG-RAN (e.g., NG-RAN 22). Based on the information exchange, the NG-RAN can determine whether the other NG-RAN can handle the party slices, whether the other NG-RAN can be a target NG-RAN. For brevity, redundant details will be omitted.

In an example, the NG-RAN 21 (which supports the TA 24, and/or one or more cells of the TA24) may be powered on, may be instructed to be operational and/or may be re-started. The NG-RAN 21 may establish relations with other neighboring NG-RANs (e.g., the NG-RAN 22). For example, by establishing relations with other neighboring NG-RANs, the NG-RAN 21 may be able to gather information of neighboring cells supported by the other neighboring NG-RANs.

In an example, the NG-RAN 21 may send a Xn Setup request (or Xn configuration update, and/or the like) message to the NG-RAN 22. The Xn setup request message may comprise at least one of:
  Information of serving cells. This may indicate one or more cells supported/handled by the NG-RAN 21. For each of the serving cell, this may indicate an identifier of the cell, one or more TAs supported by the cell, one or more network slices supported the cell, and/or the like. For example, this may indicate that the NG-RAN 21 comprises one or more cells of TA 24, and/or that the TA 24 supports the slice E.
  a capability indicator for the feature of the partly slices. This may indicate whether the NG-RAN 21 supports the feature of the partly slices.
  an identifier of the NG-RAN. This may indicate the identifier of the NG-RAN 21.

In an example, the NG-RAN 22 may receive the Xn setup request message. In response to the Xn setup request message, the NG-RAN 22 may send Xn Setup response (or, Xn configuration update response) message.

For example, the Xn setup response message may comprise at least one of:
  Information of serving cells. This may indicate one or more cells supported/handled by the NG-RAN 22. For example, this may indicate that the NG-RAN 22 comprises one or more cells of TA 25, and/or that the TA 25 supports the slice E and/or the slice D.
  a capability indicator for the feature of the partly slices. This may indicate whether the NG-RAN 22 supports the feature of the partly slices.
  an identifier of the NG-RAN. This may indicate the identifier of the NG-RAN 22.

In an example, the NG-RAN 21 may receive the Xn setup response message. Based on the Xn setup response message, the NG-RAN 21 may determine whether the NG-RAN 22 supports the feature of the partly slices. For example, if the Xn Setup response message indicates that the NG-RAN 22 supports the feature of the partly slices, the NG-RAN 21 may determine that the NG-RAN 22 supports the feature of the partly slices.

In an example, the NG-RAN 21 may receive a N2 message for a UE. For example, the N2 message may comprise information that the partly allowed slices for the UE comprises a slice E and slice D, that the allowed TA list for the slice E comprises the TA 25 and the TA 24, and/or that the allowed TA list for the slice D comprises the TA 25. For example, based on the N2 message, the NG-RAN 21 may allocate radio resources for the UE via a cell 24 of the TA 24. For example, based on that the NG-RAN 22 supports the slice D, and/or based on that the partly allowed slices for the UE comprises the slice D, the NG-RAN 21 may determine to add resources (e.g., a cell 25 of the TA 25) of the TA 25 served by NG-RAN 22.

In an example, based on the determination to add the resource of the TA 25, the NG-RAN 21 may send a second Xn request message to the NG-RAN 22. For example, the second Xn request may be S-Node addition request. For example, the S-Node addition request may comprise at least one of:
  M-NG-RAN node UE XnAP ID. This may identify the UE in a M-NG-RAN (e.g., NG-RAN 21).
  S-NG-RAN node Security Key. This may indicate a security context that may be used in the S-NG-RAN (e.g., NG-RAN 22)
  Mobility Restriction List.
  PDU Session Resources To Be Added List. This may indicate information of one or more PDU sessions which needs to be setup by the S-NG-RAN. For example, this may indicate one or more PDU sessions for the slice D.
  S-NG-RAN node UE XnAP ID. This may identify the UE in a S-NG-RAN (e.g., NG-RAN 22).

In an example, the NG-RAN 22 may receive the second Xn request message from the NG-RAN 21. Based on the second Xn request message, the NG-RAN 22 may send a second Xn response message to the NG-RAN 21. For example, the second Xn response message may be a S-Node addition request acknowledge message. For example, the second Xn response message may comprise at least one of:
  M-NG-RAN node UE XnAP ID.
  S-NG-RAN node UE XnAP ID. This may identify the UE in a S-NG-RAN PDU Session Resources To Be Admitted To be added list. This may indicate one or more PDU sessions that the S-NG-RAN accepts for establishment/setup. This may comprise one or more identifiers of the one or more PDU sessions. For example, this may indicate that the one or more PDU sessions for the slice D is accepted.

PDU Session Resources Not Admitted list. This may indicate one or more PDU sessions that the S-NG-RAN rejects (not accept) for establishment/setup. This may comprise one or more identifiers of the one or more PDU sessions.

In an example, the NG-RAN 21 may receive the second Xn response message. Based on the second Xn request message, the NG-RAN 21 may determine that the one or more PDU sessions for the slice D is accepted. Based on that the one or more PDU sessions is accepted, the NG-RAN 21 may determine to update configuration of the UE. For example, to add the resources of the one or more PDU sessions for the slice D, the NG-RAN may send a RRC reconfiguration message to the UE. For example, the RRC reconfiguration message may indicate the one or more cells of the NG-RAN 22, one or more bearers via the one or more cells, and/or information of a secondary NG-RAN (or cells, TAs.). For example, the resource allocated to the UE via the NG-RAN 22 may be used to support dual connectivity.

In an example, the UE may receive the RRC reconfiguration message. Based on the configuration, the UE may send/receive data associated with the slice E with the NG-RAN 21. For example, the UE may send/receive data associated with the slice D with the NG-RAN 22.

As shown above, based on exchange of information with neighboring NG-RANs, and/or based on the partly slices, even when a NG-RAN (or a cell, a TA) does not support one or more network slices that a UE requires, the NG-RAN can add resources from a neighboring NG-RANs (or cells, TAs) that support the one or more network slices.

Figure 26:
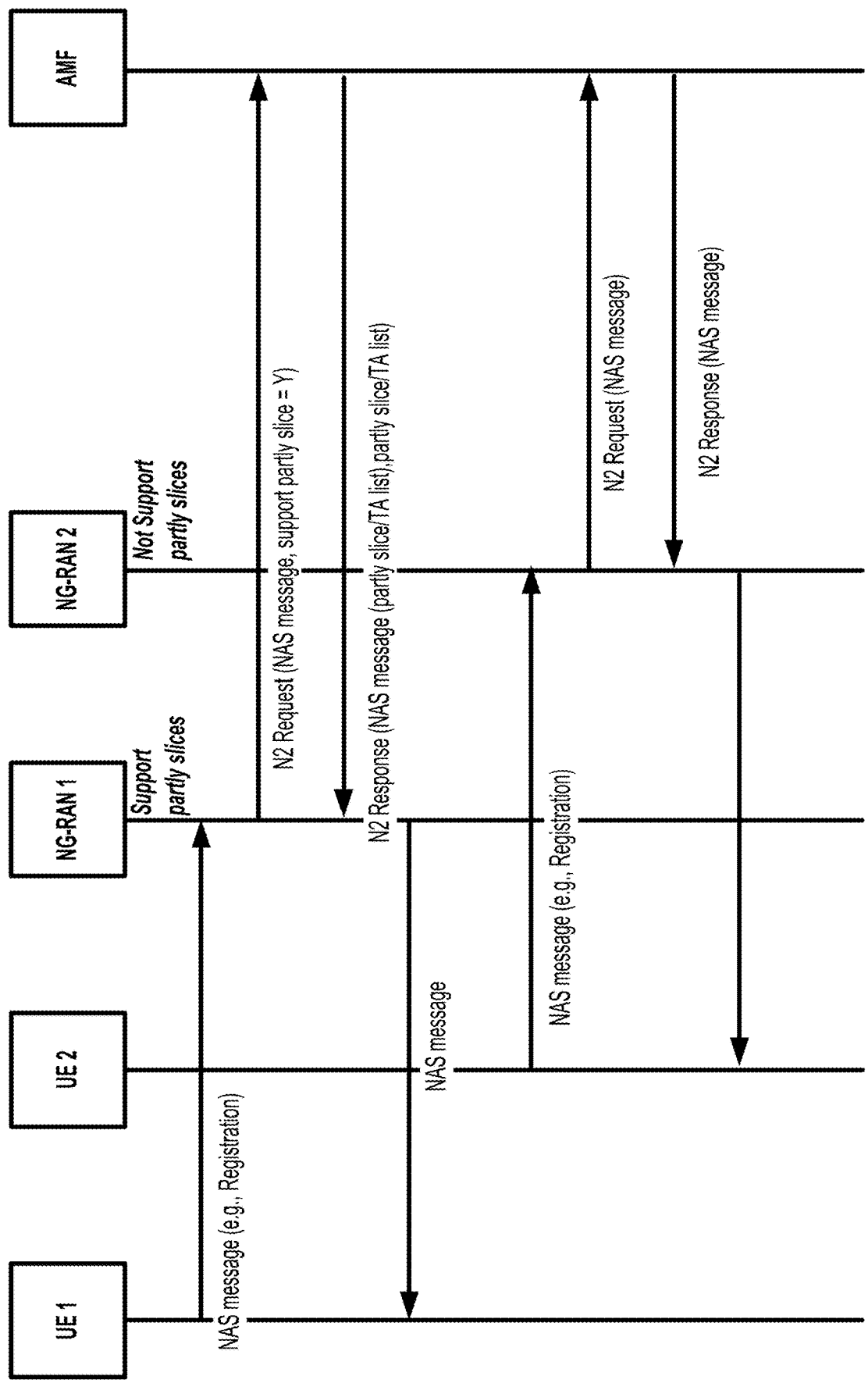
FIG. 26 is a diagram of an aspect of an example embodiment of the present disclosure.

FIG. 26 may depict one example embodiment of the present disclosure. In an example, a NG-RAN (e.g., NG-RAN 1) may exchange information of partly slices with a core network node (e.g., AMF). Based on the information exchange, the AMF can determine whether the NG-RAN can handle the party slices, whether to send information associated with the partly slices. For brevity, redundant details will be omitted.

In an example, the NG-RAN 1 may be powered on, may be instructed to be operational and/or may be re-started. The NG-RAN 1 may establish relations with one or more core network nodes (e.g., AMFs). For example, by establishing relations with the one or more core network nodes, the NG-RAN 1 may be able to exchange data and/or signalling messages with the one or more core network nodes.

In an example, the NG-RAN 1 may send a NG Setup request (or RAN configuration update, and/or the like) message to the AMF. The NG setup request message may comprise at least one of:

Global RAN Node ID. This may globally identify a NG-RAN (or gNB)

RAN Node Name. This may indicate a name assigned to the NG-RAN (or gNB).

Supported TA list. This may indicate one or more TAs served by the NG-RAN (or gNB). For example, this may be one or more TAI, one or more TAC, one or more identifiers of one or more network slices supported by the one or more TAs.

The capability indicator for the feature of the partly slices. This may indicate whether the NG-RAN supports the feature of the partly slices.

In an example, the AMF may receive the NG Setup request message from the NG-RAN 1. Based on the NG Setup request message, the AMF may store information of the NG-RAN 1. For example, based on that the capability indicator for the partly slices indicates 'supported', the AMF may determine that the NG-RAN 1 supports the feature of the partly slices.

In another example, alternatively and additionally, the NG-RAN 1 may receive a RRC message comprising the NAS message from a UE 1. The NAS message may be the registration request message, and/or PDU session establishment request message, and/or the like. Based on receiving the NAS message, the NG-RAN 1 may send a N2 request message. For example, the N2 request message may comprise the NAS message and/or the capability indicator for the feature of partly slices. Based on receiving the N2 request message comprising the capability indicator for the feature of partly slices, the AMF may determine whether the NG-RAN 1 supports the feature of partly slices or not.

In an example, the AMF may send to the NG-RAN 1, a N2 response message. The N2 response message may be a NG setup response message (or, RAN configuration update acknowledgement message, and/or the like), an Initial UE context Setup message, a Path switch request acknowledge message and/or the like. For example, based on that the NG-RAN 1 supports the feature of the partly slices, the N2 response message may comprise information associated with partly slices. For example, the information of partly slices may comprise the partly slices and/or the partly TA list.

In another example, alternatively and additionally, a NG-RAN 2 may receive a RRC message comprising the NAS message from a UE 2. The NAS message may be the registration request message, and/or PDU session establishment request message, and/or the like. Based on receiving the NAS message, the NG-RAN 2 may send a N2 request message. For example, the N2 request message may comprise the NAS message. Based on receiving the N2 request message not comprising the capability indicator for the feature of partly slices, and/or based on receiving the N2 request message comprising the capability indicator for the feature of partly slices set to 'not supported', the AMF may determine that the NG-RAN 2 does not support the feature of partly slices.

In an example, the AMF may send to the NG-RAN 2, a N2 response message. The N2 response message may be a NG setup response message (or, RAN configuration update acknowledgement message, and/or the like), an Initial UE context Setup message, a Path switch request acknowledge message and/or the like For example, based on that the NG-RAN 2 does not support the feature of the partly slices, the N2 response message may not comprise information associated with partly slices.

Figure 27:
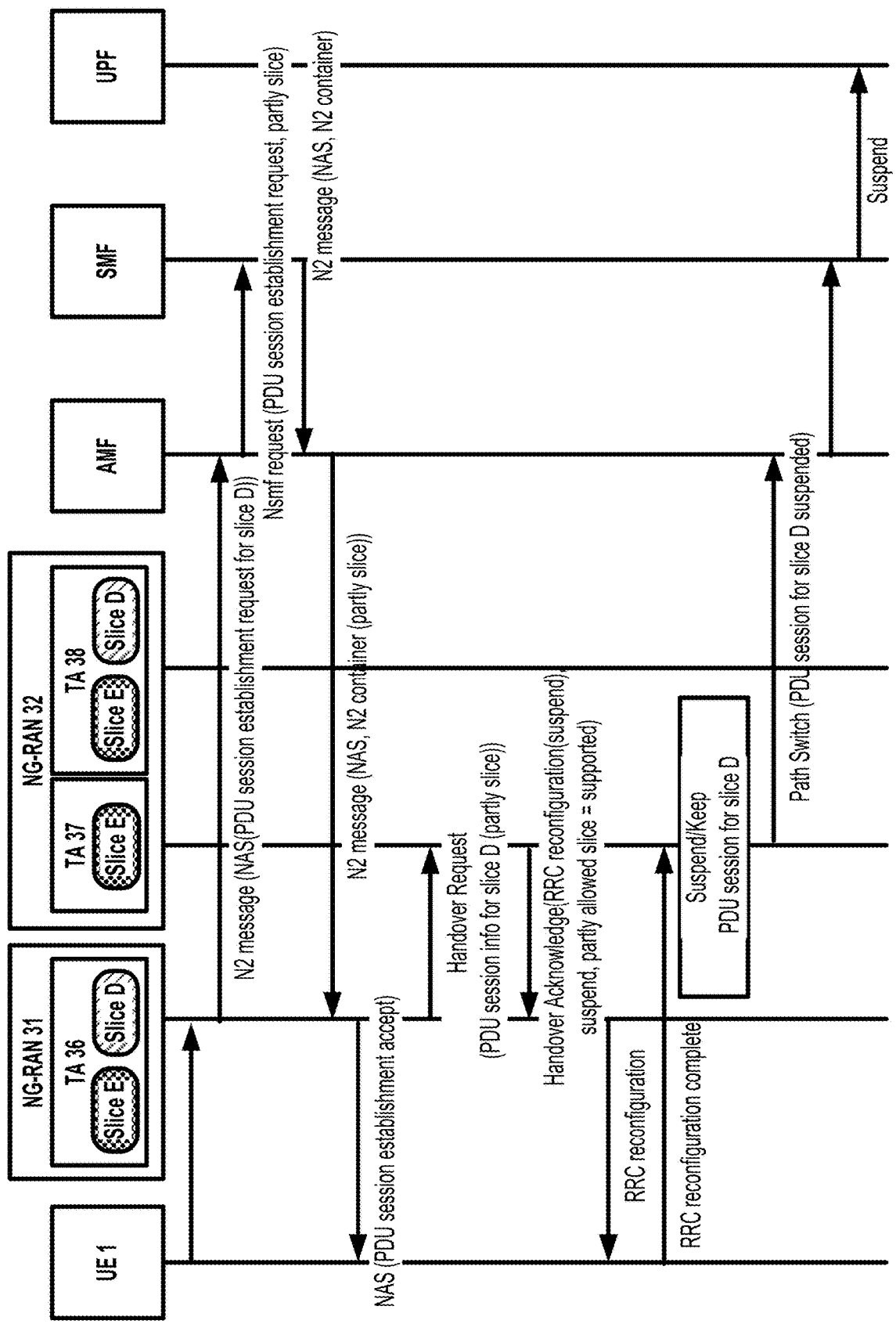
FIG. 27 is a diagram of an aspect of an example embodiment of the present disclosure.

FIG. 27 may depict one example embodiment of the present disclosure. In an example, a UE may be handed over between one or more NG-RANs. Delivering information associated with a partly slices, a NG-RAN of the one or more NG-RANs may be able to activate a PDU session when a network slice for the PDU session is available. For brevity, redundant details will be omitted.

In an example, the one or more NG-RAN may comprise a NG-RAN 31 and/or a NG-RAN 32. For example, the NG-RAN 31 may comprise a TA 36 and/or the NG-RAN 32 may comprise a TA 37 and/or a TA 38. For example, the TA 36 and/or the TA 38 may provide slice D. For example, the TA 36, the TA 37 and/or the TA 38 may provide slice E. For example, the NG-RAN 31 and/or the NG-RAN 32 may support the feature of the partly slices.

In an example, the UE may be in a cell (e.g., cell 36) of NG-RAN 31. In the cell 36, the UE may determine to establish one or more PDU sessions for the one or more network slices and/or to activate the one or more PDU sessions. For example, based on the determination, the UE may send a NAS message to a core network node. To send the NAS message, the UE may send a RRC message to the NG-RAN 31. For example, the RRC message may comprise the NAS message. For example, the NAS message may request establishment of a PDU session E for the network slice E, establishment of a PDU session D for the network slice D, activation of the PDU session D, and/or activation of the PDU session E. For example, the NAS message may be a service request message and/or a PDU session establishment request message.

In an example, the NG-RAN 31 may receive the RRC message. Based on receiving the NAS message via the RRC message, the NG-RAN 31 may send a N2 request message to the AMF. For example, the N2 request message may comprise the NAS message.

In an example, the AMF may receive the N2 request message. Based on the NAS message of the N2 request message, the AMF may determine to activate the one or more PDU sessions. For example, if the AMF receives the service request message requesting activation of the PDU session E and/or the PDU session D, the AMF may determine to activate the PDU session E and/or the PDU session D. For example, if the AMF receives the PDU session establishment request message requesting the PDU session D and/or the PDU session E, the AMF may determine to request establishment of the PDU session D and/or the PDU session E. In response to receiving the NAS message, the AMF may send a Nsmf request message to the SMF to establish/activate PDU session E and/or the PDU session D. For example, the Nsmf request message may comprise at least one of:
  the NAS message.
  a PDU session identifier. This may indicate the PDU Session.
  information of a network slice associated with the PDU session.
  indication of whether the network slice associated with the PDU session is partly supported in a RA of the UE.

In an example, the SMF may receive the Nsmf request message. Based on the Nsmf request message, the SMF may establish/activate the PDU session associated with the Nsmf request message. In response to the Nsmf request message, the SMF may send a Nsmf response message to the AMF. The Nsmf response message may comprise a N1 SM container and/or a N2 SM container. For example, the N1 SM container may comprise a NAS response message. For example, the NAS response message may be a PDU session establishment accept message indicating establishment of the PDU session (e.g., the PDU session D, and/or the PDU session E). For example, the N2 SM container may indicate information of resources for a data delivery between the NG-RAN and UPF, and/or QoS information of the PDU session.

In an example, the AMF may receive the Nsmf response message. Based on the Nsmf response message, the AMF may send a N2 response message to the NG-RAN 31. For example, the N2 response message may comprise the NAS message, the N1 SM container, the N2 SM container, and/or the like.

In an example, the NG-RAN 31 may receive the N2 response message. Based on the N2 SM container of the N2 response message, the NG-RAN 31 may allocate resources for the PDU session (e.g., PDU session D and/or the PDU session E). For example, the N2 response message may comprise the partly slices and/or the partly TA list. For example, based on the N2 response message, the NG-RAN 31 may determine whether a PDU session of one or more PDU sessions established for the UE is associated with the partly slices and/or the partly TA list. For example, the N2 response message may indicate that the PDU session D is associated with the network slice D, and/or that the network slice D is one of one or more network slices indicated by the partly (accepted) slices. Based on the N1 SM container of the N2 response message, the NG-RAN 31 may send a RRC response message to the UE. For example, the RRC response message may comprise the NAS message of the N1 SM container. For example, the NAS message may indicate to the UE that the PDU session D is activated, that the PDU session E is activated, that PDU session D is established, and/or that the PDU session E is established.

In an example, via the established/activated PDU session D and/or via the established/activated PDU session E, the UE and the network may exchange data for the network slice D and/or the networks slice E.

In an example, the NG-RAN 31 may determine to hand over the UE from the cell 36 to a cell (e.g., cell 37) of the NG-RAN 32. To hand over the UE to cell 37 of the NG-RAN 32, the NG-RAN 31 may send a handover request message to the NG-RAN 32. For example, the handover request message may comprise at least one of:
  Source NG-RAN node UE XnAP ID reference. This may uniquely identify a UE over the Xn interface within the NG-RAN 31.
  Cause. This may indicate the reason for a particular event. For example, this may indicate that the handover is desired.
  Target cell global ID. This may indicate a target cell to which the UE is handed over. For example, this may indicate the cell 37.
  UE Context Information. This may be information associated with the UE.
  UE Context Reference at the S-NG-RAN node. This may indicate a specific context stored in a NG-RAN. For example, this may indicate the UE context that is stored in a source NG-RAN (e.g., the NG-RAN 31).
  Capability indicator for partly slices. For example, this may indicate that the NG-RAN 31 supports the feature of partly slices.
  the partly slices
  the partly TA list.
  For example, the UE Context Information may comprise at least one of:
  NG-C UE associated signalling reference
  PDU Session Resources To Be Setup List. This may comprise one or more PDU session resources to be setup Items. Each of the one or more PDU session resources to be setup Items may comprise at least one of an identifier of a PDU session, S-NSSAI (a network slice associated with the PDU session), information of one or more QoS flows for the PDU session, indication of whether a network slice associated with the PDU session is a network of the partly slices and/or the like. For example, this may indicate the PDU session D, and/or the network slice D, and/or that the network slice D for the PDU session D is partly supported in the RA for the UE. For example, this may indicate the PDU session E.

RRC context

Mobility restriction list

5GC mobility restriction list container

In an example, the NG-RAN 32 may receive the handover request message from the NG-RAN 2. Based on the handover request message, the NG-RAN 32 may store the UE context information of the handover request message and/or the NG-RAN 32 may allocate resources for the one or more PDU sessions indicated by the handover request message. For example, based on that the handover request comprises the PDU session E, based on that the target cell is the cell 37 (of TA 37), that the cell 37 supports the slice E, the NG-RAN 32 may determine to allocate resources the PDU session E of the slice E. For example, based on that the handover request comprises the PDU session D, based on that the target cell is the cell 37 (of TA 37), and/or that the cell 37 does not support the slice D, the NG-RAN 32 may determine to not allocate resources for the slice D. For example, based on that the handover request comprises the PDU session D, based on that the target cell is the cell 37 (of TA 37), that the cell 37 does not support the slice D, that the network slice D for the PDU session D is associated the partly slices, the NG-RAN 32 may determine to suspend the PDU session D, to keep/store the context of the PDU session D.

In response to receiving the handover request message, the NG-RAN 32 may send a handover request acknowledge message. For example, the handover request acknowledge message may comprise at least one of:

Source NG-RAN node UE XnAP ID. This may identify the UE at the source NG-RAN (e.g., NG-RAN 31).

Target NG-RAN node UE XnAP ID. This may identify the UE at the target NG-RAN (e.g., NG-RAN 32).

PDU Session Resources Admitted List. This may be information associated with the one or more PDU sessions that the target NG-RAN (e.g., NG-RAN 32) accepts for handover. For example, for each PDU session of the one or more PDU sessions, this may comprise at least one of an identifier of the PDU session, QoS flow information, DRB information and/or the like. For example, alternatively and/or additionally, this may indicate that the PDU session D is admitted, this may indicate that no resources are allocated for the PDU session D, and/or this may indicate a cause indicating that the PDU session D is suspended.

PDU Session Resources Not Admitted List. This may be information associated with the one or more PDU sessions that the target NG-RAN (e.g., NG-RAN 32) rejects for handover. For example, for each PDU session, this may comprise at least one of an identifier of the PDU session, cause and/or the like. For example, alternatively and/or additionally, this may indicate that the PDU session D is not admitted, this may indicate a cause indicating that the PDU session D is suspended.

PDU Session Resources suspended List. This may be information associated with the one or more PDU sessions that the target NG-RAN (e.g., NG-RAN 32) suspends for handover. For example, for each PDU session, this may comprise at least one of an identifier of the PDU session, cause and/or the like. For example, this may indicate that the PDU session D is suspended. For example, the context information of one or more PDU sessions of this list may be kept at the target NG-RAN, and/or the target NG-RAN may not allocate resources (e.g., radio bearer) for the one or more PDU sessions of this list.

Target NG-RAN node To Source NG-RAN node Transparent Container.

Capability indicator for the feature of partly slices.

In an example, the NG-RAN 31 may receive the handover request acknowledge message. The NG-RAN 31 may send the RRC message (e.g., in the Target NG-RAN node To Source NG-RAN node Transparent Container) of the handover request acknowledge message, to the UE.

In an example, the UE may receive the RRC message and/or may perform handover procedure. For example, the UE may select and/or connects to the third cell indicated by the RRC message. In response to selecting/connecting to the cell 37, the UE may send a RRC response message, to the NG-RAN 32 via the cell 37. For example, the RRC response message may be a RRC reconfiguration complete message.

In an example, the NG-RAN 32 may receive the RRC response message sent by the UE via the third cell. Based on that the NG-RAN 32 receives the RRC response message from the UE, and/or based on that the PDU session D is suspended, the NG-RAN 32 may determine that the UE is in the cell 37 and/or the NG-RAN 32 may send a path switch request message to the AMF. In an example, the NG-RAN 32 may suspend the PDU session D. For example, based on that the PDU session D is not supported in the cell 37, and/or based on that the network slice D for the PDU session D is not supported in the cell 37, and/or based on that the UE supports the feature of the partly slices, and/or that the NG-RAN 37 supports the feature of the partly slices and/or that the AMF sends to the NG-RAN 37 the information associated with the partly slices, the NG-RAN 32 may suspend the PDU session D and/or may not release the PDU session D.

For example, the path switch request message may indicate to the AMF that a serving NG-RAN for the UE has changed, that the serving NG-RAN for the UE is NG-RAN 32, that some NG-U DL tunnel termination points need to be transferred, that the UE changes a location, that a handover is performed for the UE, that one or more PDU sessions (e.g., PDU session D) is suspended, that one or more PDU sessions are suspended due to the partly slices (or the partly TA list) and/or the like. For example, the path switch request message may comprise at least one of:

RAN UE NGAP ID.

AMF UE NGAP ID.

User Location Information.

UE security capabilities.

PDU session resources to be switched in downlink list. This may indicate one or more PDU sessions to be switched from a source NG-RAN to a target NG-RAN. This may comprise at least one or more identifiers of one or more PDU sessions. For example, this may indicate the PDU session E and/or the PDU session D. For example, this may indicate one or more PDU sessions that are switched and/or that are suspended.

PDU session resources to be suspended in downlink list. This may indicate one or more PDU sessions to be switched from a source NG-RAN to a target NG-RAN. This may indicate that the one or more PDU sessions are suspended because of partly slices. This may comprise at least one or more identifiers of one or more PDU sessions.

Capability indicator for partly slices.

PDU session resource failed to setup list.

In an example, the AMF may receive the path switch request. For example, based on the path switch request, and/or based on that one or more PDU sessions are suspended, the AMF may send an indication to the SMF. For example, based on that the PDU session D is suspended, the AMF may send to the SMF, the indication that the PDU session D is suspended, that the UE moves to an area where the network slice for the PDU session D is not supported, and/or that the PDU session D is suspended due to the partly slice (or partly slice TA) and/or the like.

In an example, the SMF may receive the indication from the AMF. Based on the indication, the SMF may send to a UPF, a request to suspend data delivery for the PDU session D to the NG-RAN. For example, based on the request, the UPF may not deliver one or more packets for the UE, and/or for the PDU session (e.g., PDU session D).

The example of FIG. 27 may reduce unnecessary removal/release of a PDU session (e.g., the PDU session D). For example, based on the information of partly slices, a NG-RAN, SMF, and/or UPF may suspend data exchange for the PDU session and may reduce release of the PDU session.

Figure 28:
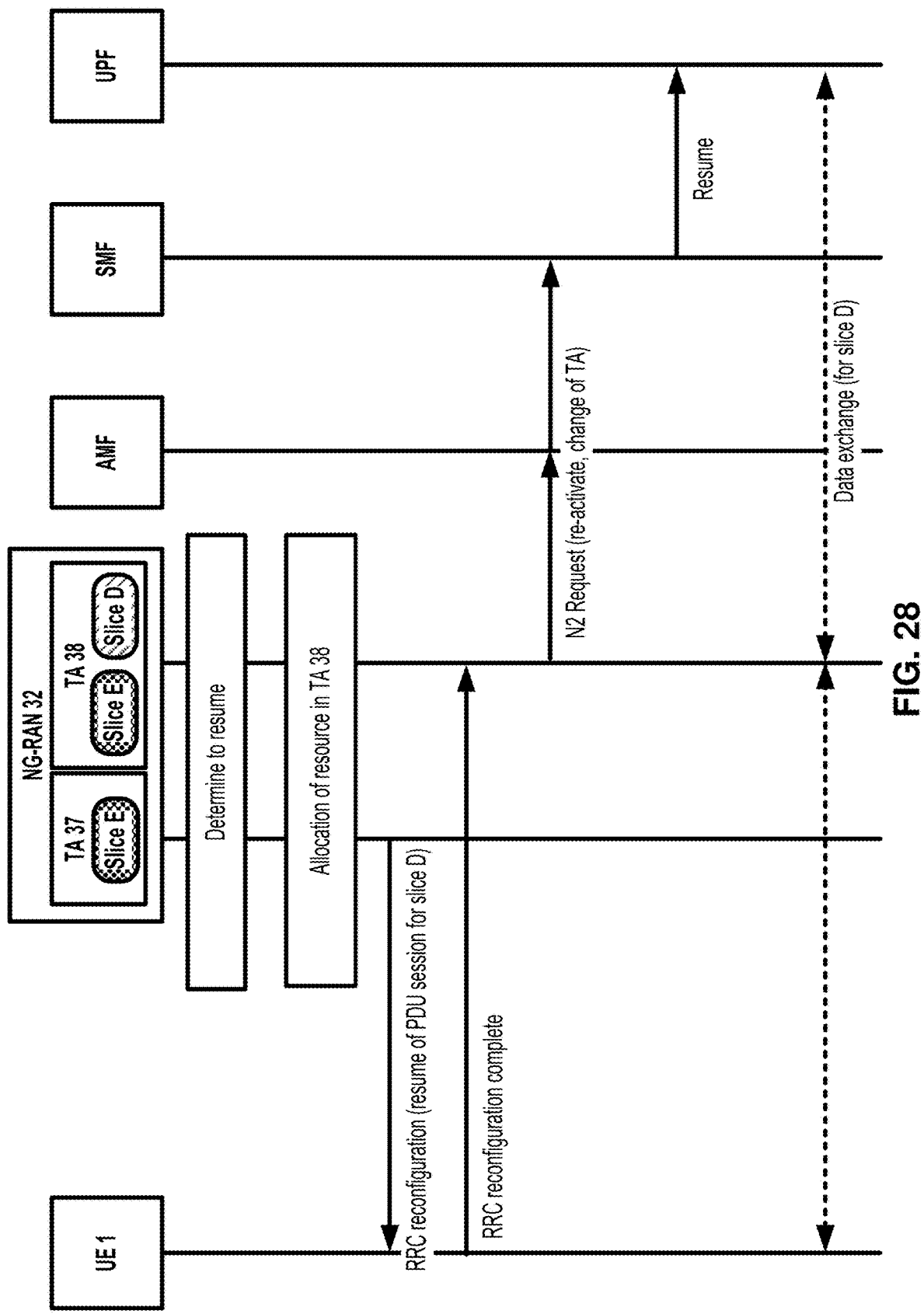
FIG. 28 is a diagram of an aspect of an example embodiment of the present disclosure.

FIG. 28 may depict one example embodiment of the present disclosure. In an example, based on the information associated with the partly slices, a NG-RAN may suspend a PDU session (as shown in the example of FIG. 27). In an example of FIG. 28, based on the information associated the information associated with the partly slices, the NG-RAN may reactivate a PDU session. For brevity, redundant details will be omitted.

In an example, the NG-RAN may suspend the PDU session D, based on the information associated with partly slices. For example, based on that the TA 37 does not support the slice D, based on that the UE has an established PDU session (e.g., PDU session D) for the slice D, and/or based on that the UE is partly allowed to use the slice D, the NG-RAN 32 may suspend the PDU session D and/or may keep the context for the PDU session D.

In an example, the NG-RAN 32 may determine to handover the UE from the cell 37 of the TA 37 to a cell (e.g., cell 38) of the TA 38. In an example, based on that the PDU session D is suspended, that the slice D of the PDU session D is one of one or more network slices indicated by the partly slices, and/or that the TA 38 supports the slice D, the NG-RAN 32 may determine to resume/re-activate/activate the PDU session D in the cell 38 of the TA 38. Based on the determination, the NG-RAN 32 may allocate a resource for the PDU session D in the cell 38. To indicate a handover and/or to allocate resources in the cell 38, the NG-RAN 32 may send a RRC message (e.g., RRC reconfiguration) to the UE. For example, the RRC message may indicate that the UE is allocated with the resources in the cell 38, that the UE needs to connect the cell 38, that the PDU D is activated/re-activated/resumed in the cell 38, and/or that the slice D is allowed in the cell 38.

In an example, the UE may receive the RRC message. Based on the RRC message, the UE may use the resources allocated in the cell 38, may activate/resume the PDU session D, may activate the slice D, and/or may select the cell 38. In response to the RRC message, the UE may send a RRC reconfiguration complete message to the NG-RAN 32, to indicate completion of handover to the cell 38 and/or completion of configuration update.

In an example, the NG-RAN 32 may receive the RRC reconfiguration complete message from the UE. Based on receiving the RRC reconfiguration complete message, the NG-RAN 32 may determine that the UE is able to use the resources of the cell 38, and/or that the PDU session D is re-activated/resumed. Based on the determination, the NG-RAN 32 may send a N2 request message to the AMF. For example, the N2 request may indicate that the PDU session D is reactivated/resumed, that the UE is in area where the slice D is supported, and/or the like.

In an example, the AMF may receive the N2 request. For example, based on the N2 request, and/or based on that one or more PDU sessions (e.g., PDU session D) are reactivated/resumed, the AMF may send an indication to the SMF. For example, based on that the PDU session D is reactivated/resumed and/or based on that the UE is in area where the slice D associated with the PDU session D is supported, the AMF may send to the SMF, the indication that the PDU session D is reactivated/resumed, that the UE moves to an area where the network slice for the PDU session D is supported, and/or that the PDU session D is resumed due to the partly slice (or partly slice TA) and/or the like.

In an example, the SMF may receive the indication from the AMF. Based on the indication, the SMF may send to a UPF, a request to resume data delivery for the PDU session D to the NG-RAN. For example, based on the request, the UPF may deliver one or more packets for the UE, and/or for the PDU session (e.g., PDU session D).

The example of FIG. 28 may reduce service interruption and/or signaling overhead for the PDU session D. For example, based on the information of partly slices, a NG-RAN, SMF, and/or UPF may resume data exchange for the PDU session when the UE moves into area where the slice D is supported.

Figure 29:
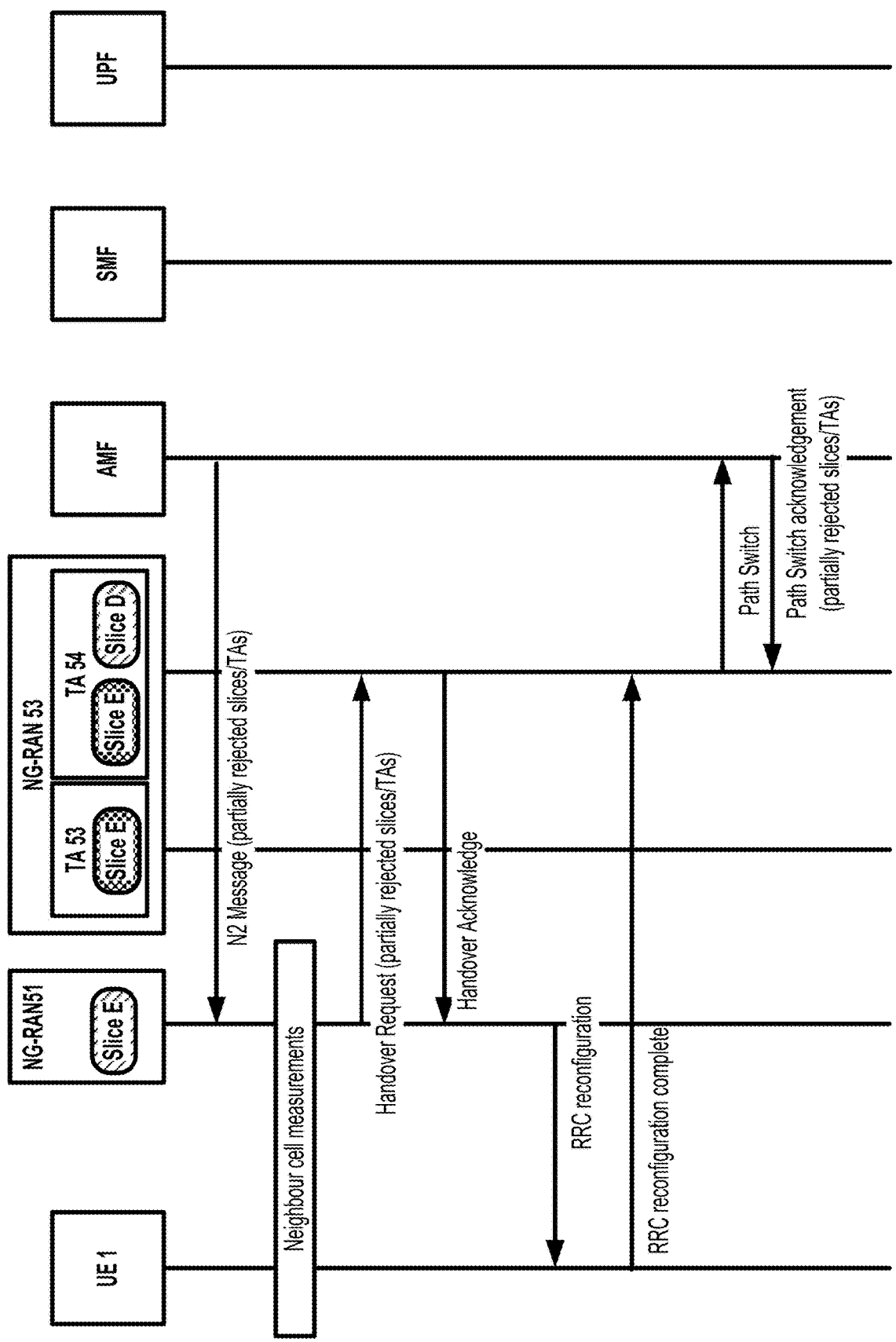
FIG. 29 is a diagram of an aspect of an example embodiment of the present disclosure.

FIG. 29 may depict one example embodiment of the present disclosure. In an example, a NG-RAN may receive information of partly slices. Based on the information of partly slices, the NG-RAN may determine where a UE needs to be handed over, reducing interruption time. For brevity, redundant details will be omitted.

In an example, the UE may be in a cell (e.g., cell 51) of NG-RAN 51. The NG-RAN 51 may support the feature of partly slices. For the UE, the NG-RAN 51 may receive from an AMF, a N2 message. The N2 message may comprise information of partly slices (e.g., the partly rejected slices, the partly rejected TA lists). For example, the N2 message may indicate that the allowed slices for the UE comprises the Slice E, that the partly rejected slices for the UE comprises the Slice D, and/or that the partly rejected TA list comprises the TA 54 (e.g., TA 54 is allowed for the slice D).

In an example, the NG-RAN 51 may receive the N2 message from the AMF. For example, the NG-RAN 51 may not support the slice D. Based on that the N2 message, the NG-RAN 51 may determine to handover the UE to other cells/TAs/NG-RANs. For example, based on that the partly rejected slices comprises the slice D, that the cell 51 (or NG-RAN 51) does not support the slice D, that the TA 54 (of NG-RAN 53) supports the partly rejected slices (e.g., the slice D), and/or that the TA 54 (of NG-RAN 53) supports the allowed slices (e.g., slice E), the NG-RAN 51 may determine to handover the UE to a cell of TA 54 (or of NG-RAN 53).

In an example, the NG-RAN 51 may send a handover request to the NG-RAN 53. For example, the handover request may indicate the partly slices, the partly TA list, and/or the like. Based on the handover request, the NG-RAN 53 may reply with handover acknowledge.

In an example, the NG-RAN 53 may send a path switch request message to the AMF. In response to the path switch request, the AMF may send the path switch request acknowledgement message. For example, the path switch request acknowledgement message may comprise information associated with the partly slices (e.g., partly rejected slices, partly rejected TA list). Based on the information associated with partly slices, the NG-RAN 53 may determine cell reselection priority for the UE, and/or a target cell.

Figure 30:
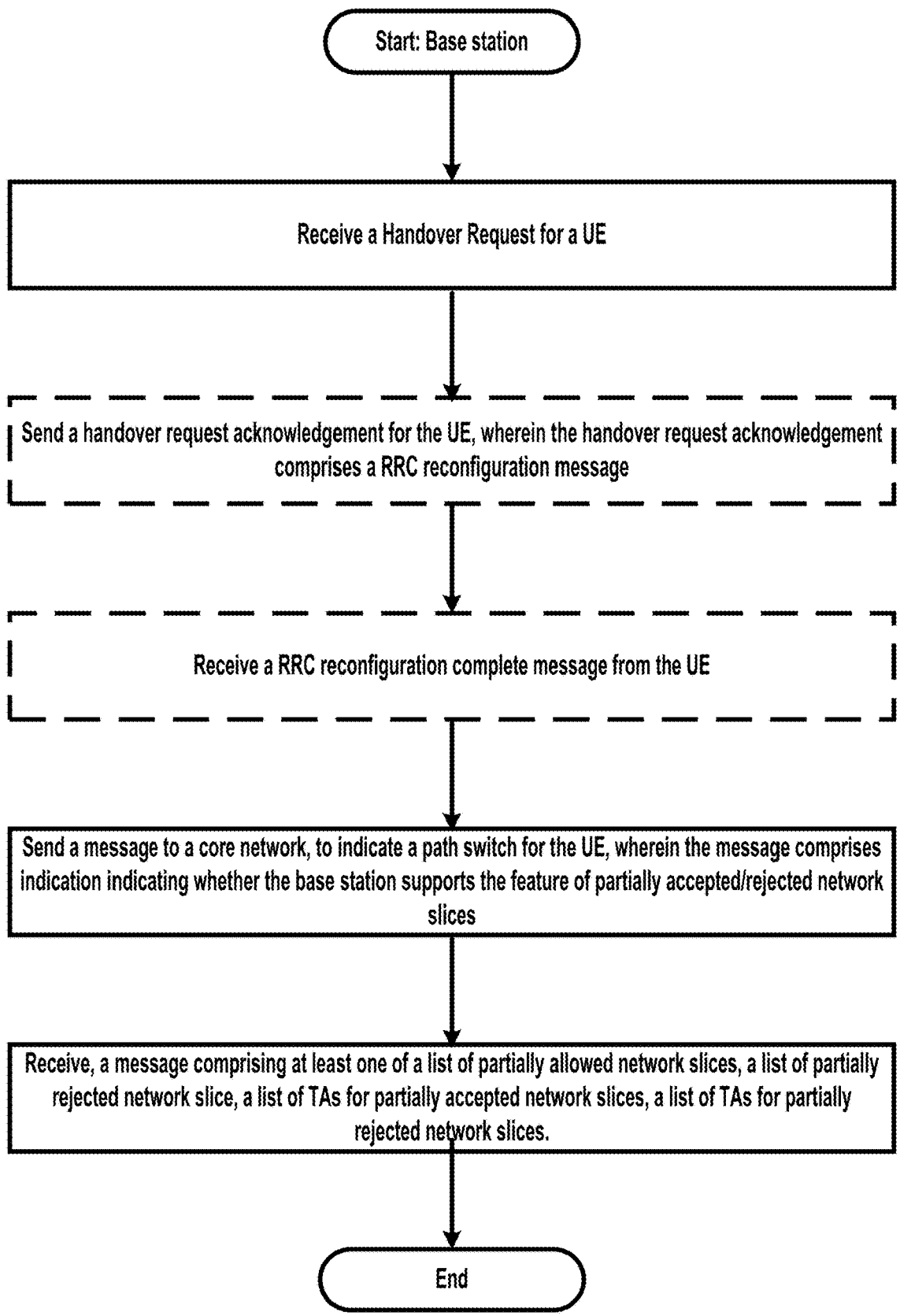
FIG. 30 is a diagram of an aspect of an example embodiment of the present disclosure.

FIG. 30 may depict one example embodiment of the present disclosure.

In an example, a NG-RAN (a first NG-RAN, a base station) may receive a handover request for a UE, from a second NG-RAN. The NG-RAN may send a handover request acknowledgement message to the second NG-RAN. For example, the handover request acknowledgement message may comprise a RRC reconfiguration message.

In an example, the NG-RAN may receive a RRC reconfiguration complete message from the UE. Based on receiving the RRC reconfiguration complete message, the NG-RAN may send a request message (a Path switch message) to a core network node (e.g., AMF). For example, the message may comprise indication of whether the NG-RAN supports the feature of partly slices (e.g., partly accepted slices, partly rejected slices).

In an example, the NG-RAN may receive a response message (e.g., path switch request acknowledgement) from the core network node. For example, the NG-RAN may receive the response message in response to sending the request message. The response message may comprise at least one of partly slices (e.g., partly allowed slices and/or partly rejected slices) and/or partly TA lists (e.g., partly rejected TA lists, partly allowed TA list, a list of TAs supporting a network slice for each network slice, a list of TAs not supporting a network slice for each network slice, and/or the like)

In an example, based on the partly slices and/or based on the partly TA lists, the NG-RAN may handover the UE to one or more cells serving a TA of the partly TA lists and/or may configure resources of the one or more cells.

Figure 31:
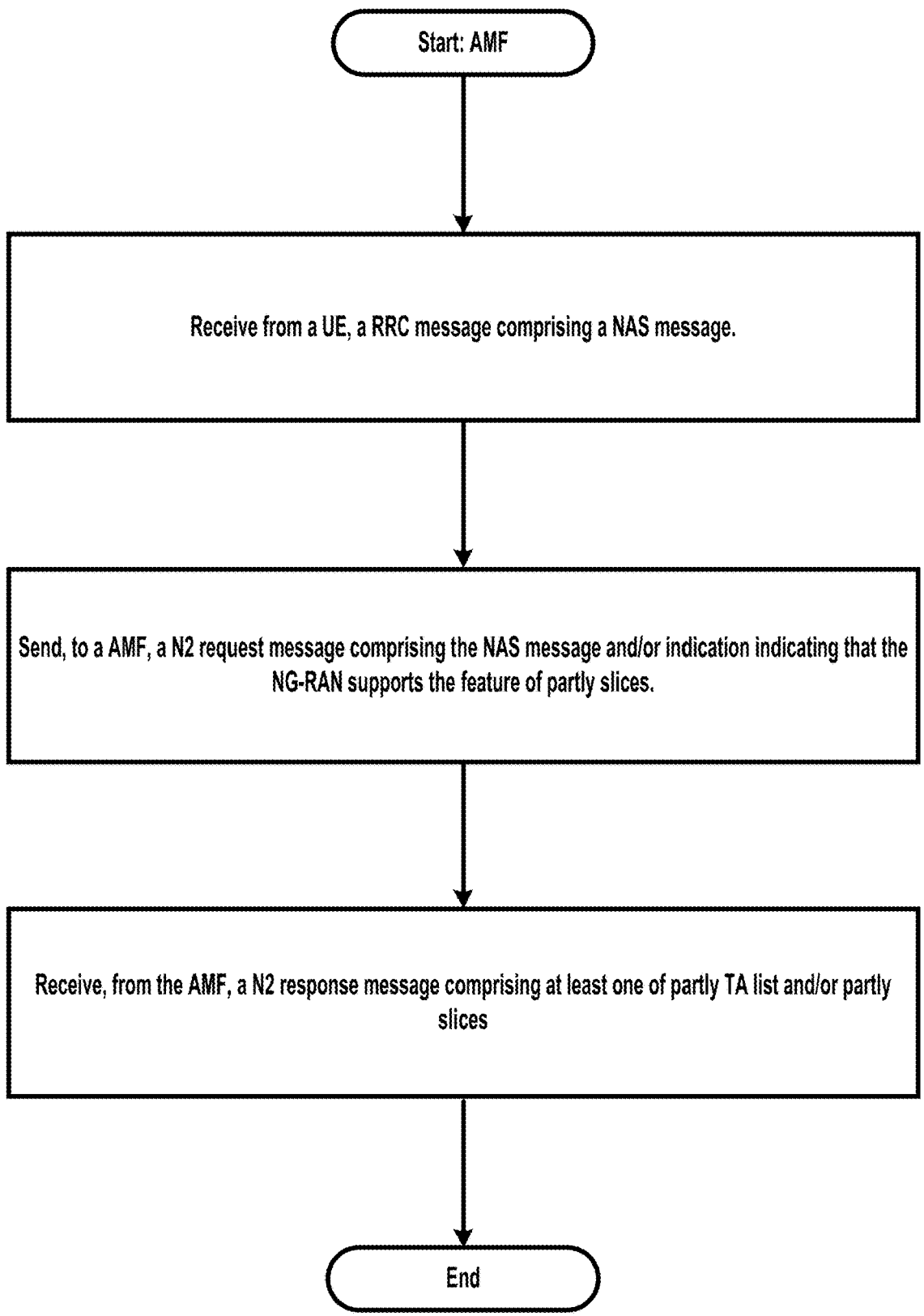
FIG. 31 is a diagram of an aspect of an example embodiment of the present disclosure.

FIG. 31 may depict one example embodiment of the present disclosure.

In an example, a NG-RAN may receive from a UE, a RRC message. For example, the RRC message may comprise a NAS message. In response to receiving the RRC message, the NG-RAN may send a N2 request message to an AMF. For example, the N2 request message may comprise the NAS message and/or an indication indicating whether the NG-RAN supports the feature of partly slices. In response to sending the N2 request message, the NG-RAN may receive a N2 response message. For example, the N2 response message may comprise at least one of a partly slices and/or a partly TA list.

In an example, based on the partly slices and/or based on the partly TA lists, the NG-RAN may handover the UE to one or more cells serving a TA of the partly TA lists and/or may configure resources of the one or more cells.

In an example, a second NG-RAN may receive from a first NG-RAN, a first handover request message for a UE. For example, the first handover request message may comprise at least one of:
 an identifier of the UE;
 an information of one or more protocol data unit (PDU) sessions of the UE;
 a configuration information for one or more partly allowed slices of the UE;
 a configuration information for one or more partly rejected slices of the UE;
 information of whether the UE supports the feature of partly slices;
 information of whether the first NG-RAN supports the feature of partly slices;
 information of whether a PDU session of the one or more PDU session is for a network slice of the one or more partly allowed slices;
 information of whether a PDU session of the one or more PDU session is for a network slice of the one or more partly rejected slices.
 an indication of adding a secondary base station supporting a network slice of the partly allowed slices (e.g., adding secondary node);
 an indication of change to a NG-RAN supporting the feature of the partly slices. (e.g., handover).

For example, in response to receiving the first handover request message, the first NG-RAN may send a first handover response message to the first NG-RAN. The first handover response message may comprise a RRC reconfiguration message. For example, the RRC reconfiguration message may comprise information a cell (target cell) of the second NG-RAN.

In an example, the second NG-RAN may receive a RRC reconfiguration complete message, from the UE. For example, the second NG-RAN may receive the RRC reconfiguration complete message, in response to sending the RRC reconfiguration message to the UE via the first NG-RAN.

In an example, the one or more network slices of the partly slices may be determined by an AMF. For example, the UE may send a request for one or more network slices (e.g., requested slices). Based on the one or more network slices requested by the UE, based on whether a current TA of the UE supports the one or more network slices, and/or based on the supported network slices of adjacent TAs of the current TA, the AMF may determine the partly slices. For example, based on the determination of the partly slices, the AMF may deliver to NG-RAN, the information of the partly slices.

In an example, based on the first handover request message, the second NG-RAN may determine to suspend one or more PDU sessions (of the one or more PDU sessions indicated by the first handover request message). For example, for each PDU session (of the one or more PDU sessions indicated by the first handover request message), the second NG-RAN may determine whether a network slice associated with the PDU session is supported in the target cell of the second NG-RAN. If the network slice associated with the PDU session is not supported in the target cell and/or if the network slice associated with the PDU session is one of network slices indicated by the partly slices, the second NG-RAN may suspend the PDU session.

In an example, that the second NG-RAN suspends the PDU session may be at least one of that:
 that data for the PDU session is not sent to (received from) the UE.
 that a radio resource for the PDU session is not allocated to the UE.
 radio bearers (or logical channels) for the PDU session are configured and radio resources (e.g., time/frequency resources) are not allocated.
 that a context information for the PDU session is kept at the second base station.

In an example, the second NG-RAN, may send to a core network node (e.g., AMF), a path switch request message for the UE. For example, the second NG-RAN may determine to send the path switch request message, in response to receiving the RRC reconfiguration complete message. For example, the path switch request message may comprise at least one of a capability indication (indicator) indicating whether the second NG-RAN supports the feature of partly slices. For example, if the second NG-RAN supports the feature of partly slices, the second NG-RAN may send the capability indication indicating that the second NG-RAN supports the feature of partly slices. For example, that the second NG-RAN supports the feature of the partly network slices may be that the second base station supports at least one of
- that the second NG-RAN is capable at least one of handling, processing, sending, receiving, parsing, or interpreting the information associated with partly slices.
- that the second NG-RAN is capable of at least one of acting, behaving, determining, based on the information associated with partly slices.

For example, the path switch request message may comprise an indication whether a PDU session is suspended or not.

For example, the partly (partial, partially supported in RA, partially rejected in RA) slices may comprise at least one of a partly allowed slices and/or a partly rejected slices. For example, the capability indication may comprise at least one of an indication that the second NG-RAN supports the feature of partly rejected slices or an indication that the second NG-RAN supports the feature of partly accepted slices.

In an example, the second NG-RAN may receive from the core network node, a path switch response message. For example, the path switch response (e.g., path switch request acknowledge) message may comprise information associated with partly slices. For example, the path switch response message may comprise, for each network slice of the partly slices, a list of a first TAs where the network slice is allowed, and/or a list of a second TAs where the network slice is not allowed. For example, the list of first TAs may indicate one or more TAs where the UE is allowed to use the network slice. For example, the list of second TAs may indicate one or more TAs where the UE is not allowed to use the network slice. For example, a registration area (RA) for the UE may comprise the one or more first TAs and the one or more second TAs. For example, the one or more first TAs may not comprise one or more TAs which are not in the RA. For example, the one or more second TAs may not comprise one or more TAs which are not in the RA. For example, the path switch response message may comprise one or more identifiers of the one or more first TAs and/or one or more identifiers of the one or more second TAs.

For example, the information associated with the partly slices may comprise the partly TA list and/or the partly slices. For example, the information associated with the partly slices may indicate that a network slice for the UE is allowed in one or more first tracking areas (TAs) of the registration area (RA) and/or not allowed in one or more second TAs of the RA.

In an example, the second NG-RAN may send to a third NG-RAN supporting the one or more first TAs, a second handover request message. For example, the second NG-RAN may select the third NG-RAN, based on that the third NG-RAN supports the feature of the partly slices and/or the one or more first TAs. For example, the second NG-RAN may determine that the third NG-RAN supports the one or more first TAs, based on Xn message (e.g., XN setup request, Xn setup accept message) received from the third NG-RAN. For example, if a cell of the third NG-RAN broadcast a TA (e.g., TAC, TAI), the third NG-RAN may support the TA.

In an example, a NG-RAN may receive from a UE, a RRC resource reconfiguration complete message. In response to receiving the RRC resource reconfiguration complete message, the NG-RAN may send to a core network node (e.g., AMF), a N2 request message. For example, the N2 request message may indicate a path switch of the UE to the NG-RAN. In response to sending the N2 request message, the NG-RAN may receive from the core network node, a N2 response message. The N2 response message may indicate one or more network slices of the partly allowed network slices. For example, the N2 response message may comprise one or more identifiers of the one or more network slices.

In an example, a second NG-RAN may receive from a first NG-RAN, a Xn request message (e.g., Xn Setup, Handover request, and/or the like). In response to the Xn request message, the second NG-RAN sends to the first NG-RAN, a Xn response message comprising indication that the second base station supports the feature of partially supported slices (e.g., partly slices, partly allowed slices, partly rejected slices)

In an example, a second NG-RAN may send to a first NG-RAN, a Xn request message comprising indication that the second base station supports the feature of partially supported slices (e.g., partly slices, partly allowed slices, partly rejected slices). In response to the Xn request message, the second NG-RAN may receive from the first NG-RAN, a Xn response message.

In an example, a second NG-RAN may receive from a first NG-RAN, a Xn request message comprising information of one or more cells (or one or more TAs associated with the one or more cells) of the second NG-RAN and information indicating whether the one or more cells (or the second NG-RAN) supports a feature of partially slices (e.g., partly allowed slices, partly rejected slices). The second NG-RAN may send to the first NG-RAN, in response to the Xn request message, a Xn response message.

In an example, a second NG-RAN may receive from a first NG-RAN, a handover request message. Based on the handover request message, the second NG-RAN may determine that a network slice associated with a suspended protocol data unit (PDU) session is supported in the second NG-RAN. Based on the determination, the second NG-RAN may send to at least one of a SMF and/or a UE, an indication that the PDU session is resumed. For example, the second NG-RAN may send to the UE, a configuration message for the PDU session.

The invention claimed is:

1. A method comprising:
receiving, by a second base station (BS) and in response to sending a path switch request message, a path switch acknowledge message comprising one or more identifiers of one or more partially allowed network slices for a wireless device, wherein the one or more partially allowed network slices are not supported in one or more tracking area (TAs) of a registration area (RA) of the wireless device;
determining, by the second BS and based on a third BS supporting the one or more partially allowed network slices, a handover of the wireless device to the third BS; and
sending, by the second BS to the third BS, and based on the determining, a handover request message comprising the one or more identifiers.

2. The method of claim 1, wherein the second BS receives the path switch acknowledge message from a core network node.

3. The method of claim 1, wherein the RA of the wireless device further comprises one or more second TAs where the one or more partially allowed network slices are supported.

4. The method of claim 1, further comprising sending by the second BS to a core network node, a capability indication indicating support for the one or more partially allowed network slices.

5. The method of claim 1, further comprising receiving by the second BS from the third BS, an indication indicating support for the one or more partially allowed network slices.

6. The method of claim 1, wherein the path switch acknowledge message further comprises at least one of:
the one or more TAs of the RA;
one or more allowed network slices of the wireless device, wherein the one or more allowed network slices are supported in the RA;
a protocol data unit (PDU) session associated with the one or more partially allowed network slices; or
an indication of an activation or deactivation of the PDU session.

7. The method of claim 6, wherein the path switch request message comprises at least one of:
a first indication indicating activation of the PDU session; or
a second indication indicating suspension of the PDU session.

8. The method of claim 1, wherein the handover request message comprises a capability indicator indicating support for the one or more partially allowed network slices.

9. A second base station (BS), comprising one or more processors and memory storing instructions that, when executed by the one or more processors, cause the second base station to:
receive, in response to sending a path switch request message, a path switch acknowledge message comprising one or more identifiers of one or more partially allowed network slices for a wireless device, wherein the one or more partially allowed network slices are not supported in one or more tracking area (TAs) of a registration area (RA) of the wireless device;
determine, based on a third BS supporting the one or more partially allowed network slices, a handover of the wireless device to the third BS; and
send, to the third BS, and based on the determining, a handover request message comprising the one or more identifiers.

10. The second BS of claim 9, wherein the second BS receives the path switch acknowledge message from a core network node.

11. The second BS of claim 9, wherein the RA of the wireless device further comprises one or more second TAs where the one or more partially allowed network slices are supported.

12. The second BS of claim 9, wherein the operations further cause the second BS to send, to a core network node, a capability indication indicating support for the one or more partially allowed network slices.

13. The second BS of claim 9, wherein the operations further cause the second BS to receive, from the third BS, an indication indicating support for the one or more partially allowed network slices.

14. The second BS of claim 9, wherein the path switch acknowledge message further comprises at least one of:
the one or more TAs of the RA;
one or more allowed network slices of the wireless device, wherein the one or more allowed network slices are supported in the RA;
a protocol data unit (PDU) session associated with the one or more partially allowed network slices; or
an indication of an activation or deactivation of the PDU session.

15. The second BS of claim 14, wherein the path switch request message comprises at least one of:
a first indication indicating activation of the PDU session; or
a second indication indicating suspension of the PDU session.

16. The second BS of claim 9, wherein the handover request message comprises a capability indicator indicating support for the one or more partially allowed network slices.

17. A wireless device comprising one or more processors and memory storing instructions that, when executed by the one or more processors, cause the wireless device to:
receive:
one or more system information blocks comprising one or more identifiers of one or more tracking area (TAs) of a registration area (RA) of the wireless device; and
one or more non-access stratum (NAS) messages comprising one or more slice identifiers of one or more partially allowed network slices for the wireless device;
receive, from a first base station (BS), a first radio resource control (RRC) message indicating handover to a second cell of a second BS;
send, to the second BS, a second RRC message indicating completion of the handover;
receive, from the second BS, a third RRC message indicating a second handover to a third cell of a third BS supporting the one or more partially allowed network slices, wherein:
the one or more slice identifiers of the one or more partially allowed network slices are indicated by a path switch acknowledge message; and
the one or more partially allowed network slices are unsupported in the one or more TAs of the RA; and
send, to the third BS, a fourth RRC message indicating completion of the second handover.

18. The wireless device of claim 17, wherein the second BS receives the path switch acknowledge message from a core network node.

19. The wireless device of claim 17, wherein the RA of the wireless device further comprises one or more second TAs where the one or more partially allowed network slices are supported.

20. The wireless device of claim 17, wherein the path switch acknowledge message further comprises at least one of:
the one or more TAs of the RA;
one or more allowed network slices of the wireless device, wherein the one or more allowed network slices are supported in the RA;
a protocol data unit (PDU) session associated with the one or more partially allowed network slices; or
an indication of an activation or deactivation of the PDU session.

* * * * *